US009741081B2

(12) United States Patent
Alboszta et al.

(10) Patent No.: US 9,741,081 B2
(45) Date of Patent: Aug. 22, 2017

(54) PERTURBING A SUBJECT'S CONTEXTUALIZATION OF A PROPOSITION ABOUT AN ITEM CONSIDERED IN A QUANTUM REPRESENTATION BY ALTERING THE ITEM

(71) Applicant: Invent.ly LLC, Woodside, CA (US)

(72) Inventors: Marek Alboszta, Montara, CA (US); Stephen J. Brown, Woodside, CA (US)

(73) Assignee: INVENT.LY LLC, Woodside, CA (US)

( * ) Notice: Subject to any disclaimer, the term of this patent is extended or adjusted under 35 U.S.C. 154(b) by 422 days.

(21) Appl. No.: 14/583,712

(22) Filed: Dec. 28, 2014

(65) Prior Publication Data
US 2016/0180241 A1 Jun. 23, 2016

Related U.S. Application Data

(63) Continuation-in-part of application No. 14/582,056, filed on Dec. 23, 2014.

(51) Int. Cl.
G06Q 50/00 (2012.01)
H04L 29/08 (2006.01)
G06N 7/00 (2006.01)

(52) U.S. Cl.
CPC ............. *G06Q 50/01* (2013.01); *H04L 67/10* (2013.01); *G06N 7/005* (2013.01); *H04L 67/22* (2013.01)

(58) Field of Classification Search
CPC ........ G06Q 50/01; G06N 7/005; H04L 67/10; H04L 67/22
See application file for complete search history.

(56) References Cited

U.S. PATENT DOCUMENTS 7,653,646 B2 1/2010 Horn et al.
7,664,627 B2 2/2010 Mitsuyoshi
(Continued)

OTHER PUBLICATIONS

Abramsky, et al., "Introduction to Categories and Categorical Logic", arXiv:1102.1313v1 [math.CT], New Structures for Physics, B. Coecke (ed). Lecture Notes in Physics vol. 813, pp. 3-94, Springer-Verlag 2011.
(Continued)

*Primary Examiner* — Arvin Eskandarnia
*Assistant Examiner* — Gil H. Lee
(74) *Attorney, Agent, or Firm* — Marek Alboszta

(57) ABSTRACT

The present invention concerns methods and apparatus for detecting perturbations to previously established and known contextualizations practiced or exhibited by subjects when confronted by certain propositions about original items. The subjects are understood to be any sentient beings, e.g., human beings that use the known contextualizations modulo the propositions and also exhibit known measurable indications in response to these propositions. Measurable indications can take on the form of responses, actions, behaviors or any measurable aspects that can be collected from the subjects in response to the propositions. The perturbation to the contextualization that is adopted by the subjects is due to altering the original item to generate an altered item and placing the altered item at the center of the proposition that was previously apprehended by the subjects to be about the original item.

17 Claims, 16 Drawing Sheets

(56) References Cited

U.S. PATENT DOCUMENTS

| | | | |
|---|---|---|---|
| 8,226,417 | B2 | 7/2012 | Mitsuyoshi |
| 8,639,702 | B2 | 1/2014 | Davis, III |
| 8,744,197 | B2 | 6/2014 | Fertik et al. |
| 2010/0119141 | A1 | 5/2010 | Weinstein et al. |
| 2012/0071333 | A1 | 3/2012 | Kauffman et al. |
| 2013/0226839 | A1* | 8/2013 | Archambeau ........ G06N 99/005 706/12 |
| 2015/0019640 | A1* | 1/2015 | Li ...................... G06Q 30/0269 709/204 |
| 2016/0042371 | A1* | 2/2016 | Klemm .............. G06Q 30/0203 705/7.32 |

OTHER PUBLICATIONS

Abramsky, et al., "Logical Bell Inequalities", arXiv:1203.1352v6 [quant-ph], Jun. 20, 2012, Digital Object Identifier: 10.1103/PhysRevA.85.062114.

Adali, et al., Predicting Personality with Social Behavior, Aug. 2012, pp. 1-8, Department of Computer Science Rensselaer Polytechnic Institute, Troy, New York.

Aerts, et al., Do We Think and Communicate in Quantum Ways? On the Presence of Quantum Structures in Language, Faculty of Applied Physics and Mathematics, 2005, pp. 1-20, Leo Apostel Centre, Free University of Brussels.

Aerts, et al., "Concepts and Their Dynamics: A Quantum-Theoretic Modeling of Human Thought", Topics in Cognitive Sciences, 2013, pp. 1-36, Cognitive Science Society Inc., Digital Object Identifier: 10.1111/tops.12042.

Aimeur, et al., Quantum Clustering Alogrithms, Proceedings of the 24th Intl. Conference on Machine Learning, 2007, pp. 1-8, ACM, New York, NY, USA.

Alboszta, Marek, A Coherent Emergence of Consensus-Driven Reality, Physics Lectures by Marek Alboszta, 2009, pp. 1-61, Hosted by Entropy Consciousness Institute, http://entropy-consciousness.org, San Francisco, CA, USA.

Atmanspacher, et al., Weak Quantum Theory: Complementarity and Entanglement in Physics and Beyond, Foundations of Physics, 2002, 32, pp. 379-406, Institut fur Grenzgebiete der Psychologie and Psychohygiene.

Bachrach, et al., Personality and Patterns of Facebook Usage, Jun. 2012, pp. 1-9, Microsoft Research.

Blutner, et al., Two qubits for C.G. Jung's theory of personality, Cognitive Systems Research, 2010, pp. 243-259, Elsevier, ILLC, University of Amsterdam, Germany.

Blutner, et al., Two Qubits for C.G. Jung's Theory of Personality, Cognitive Systems Research, Elsevier, vol. 11, 2010, pp. 243-259, http://www.illc.uva.nl/Research/Publications/Reports/PP-2009-03.text.pdf.

Blutner, R., Concepts and Bounded Rationality: An Application of Niestegge's Approach to Conditional Quantum Probabilities, 2009, pp. 1-9, Universiteit van Amsterdam, ILLC, Nieuwe Doelenstraat 15, 1012 CP Amsterdam, The Netherlands.

Bohm, Quantum Theory, 1951, pp. 169-172, Dover Publications.

Brandenburger, et al., "An Impossibility Theorem on Belief in Games", Studia Logica, vol. 84, Issue: 2, pp. 211-240, 2006, Digital Object Identifier: 10.1007/s11225-006-9011-z.

Bruza et al., Is There Something Quantum-Like About the Human Mental Lexicon?, NIH Public Access Author Manuscript, Oct. 2009, pp. 1-40, National Institutes of Health.

Busemeyer, et al., "Quantum dynamics of human decision-making", Journal of Mathematical Psychology, 2006, 50, pp. 220-241; Indiana University, USA.

Caves, et al., Quantum Probabilities as Bayesian Probabilities, arXiv:quant-ph/0106133, Nov. 2001, pp. 1-6, Phys. Rev. A 65, 022305 , Cornell University Libarary, USA.

Celli, Mining User Personality in Twitter, Sep. 2011, pp. 1-5, CLIC-CIMeC, University of Trento Italy.

Celli, Unsupervised Personality Recognition for Social Network Sites, The Sixth International Conference on Digital Society, 2012, pp. 1-4, University of Trento, Italy.

Chittaranjan, et al., Who's Who with Big-Five: Analyzing and Classifying Personality Traits with Smartphones, Jun. 2012, pp. 1-8, Idiap Research Institute, Switzerland.

Cohen-Tannoudji, et al., Quantum Mechanics, John Wiley & Sons, 1977.

Dirac, The Principles of Quantum Mechanics, Oxford University Press, 4th Edition, 1958.

Franco, R. Quantum mechanics and rational ignorance, Arxiv preprint physics/0702163, 2007, Dipartimento di Fisica and U.d.R. I.N.F.M., Politecnico di Torino C.so Duca degli Abruzzi 24,I-10129 Torino, Italia.

Gabora,et al., Toward an ecological theory of concepts, Ecological Psychology, 2008, pp. 84-116, Department of Psychology, University of British Columbia.

Garman, "A Heuristic Review of Quantum Neural Networks", Dissertation, Imperial College London, Dept. of Physics, Oct. 6, 2011.

Glanville, "A (Cybernetic) Musing: Design and Cybernetics", Vius, N. 3, São Carlos: Nomads.usp, 2010.

Globus, "Quantum Consciousness is Cybernetic", Psyche, 2(12), Aug. 1995.

Hu, et al., A Generalized Quantum-Inspired Decision Making Model for Intelligent Agent, The Scientific World Journal, Mar. 2014, pp. 1-9, vol. 2014, Article ID 240983, http://dx.doi.org/10.1155/2014/240983.

Khrennikov, Quantum-like formalism for cognitive measurements, BioSystems, 2003, vol. 70, pp. 211-233; International Center for Mathematical Modeling in Physics and Cognitive Sciences, MSI, University of Vaxjo, S-35195, Sweden.

Klusch, M., Toward quantum computational agents, In: Nickles, M., Rovatsos, M. and Weiss, G., eds. Agents and Computational Autonomy: Potential, Risks, and Solutions. 2004, vol. 2969. , pp. 170-186. (Lecture Notes in Computer Science).

Komisin, et al., Identifying Pesonality Types Using Document Classification Methods, Proceedings of the 25th International Florida Artificial Intelligene Research Society Conference, pp. 1-6, University of North Carolina, 2012, USA.

Lefebvre, "An Algebraic Model of Ethical Cognition", Journal of Mathematical Psychology, vol. 22, No. 2, Oct. 1980, Academic Press, New York.

Lefebvre, "Modelling of Quantum-Mechanical Phenomena With the Help of the Algebraic Model of Ethical Cognition", Mathematical Modelling, vol. 4, pp. 361-366, 1983, Pergamon Press, USA.

Markovikj, et al., Mining Facebook Data for Predictive Personality Modeling, 2013, pp. 1-4, Faculty of Computer Science and Engineering, Ss Cyril and Methodius University.

Mielnik, Geometry of Quantum States, Institue of Theoretical Physics, Warsaw University, 1968, pp. 1-26, ul. Hoza 69, Warsaw, Poland.

Pask, "Conversation Theory: Applications in Education and Epistemology", Elsevier Scientific Publishing Company, 1976, Amsterdam, The Netherlands.

Pothos, et al., A quantum probability explanation for violations of 'rational' decision theory, Proceedings of the Royal Society B: Biological Sciences, 2009, pp. 276, rspb.royalsocietypublishing.org.

Preskill, Quantum Information and Computation, Lecture Notes Ph219/CS219, Chapters 2&3, California Institute of Technology, 2013.

Schwartz, et al., Personality, Gender, and Age in the Language of Social Media: The Open-Vocabulary Approach, Sep. 2013, pp. 1-16.

Srednicki, M., Quantum Field Theory, 2006, http://www.physics,ucsb.edu/~mark/qft.html, pp. 1-616, University of California, Santa Barbara, USA.

Summers, Thought and the Uncertainty Principle, Sep. 28, 2013, pp. 3-6, http://www.jasonsummers.org/thought-and-the-uncertainty-principle/.

Trueblood, et al., A Quantum Probability Model of Causal Reasoning, Hypothesis and Theory Article, May 2012, pp. 1-13, Frontiers in Psychology I Cognitive Science, www.frontiersin.org, USA.

(56) References Cited

OTHER PUBLICATIONS

Trueblood, et al., Quantum Probability Theory as a Common Framework for Reasoning and Similarity, Opinion Article, Apr. 2014, pp. 1-4, Frontiers in Psychology | Cognitive Science, www.frontiersin.org, USA.

Verhoeven, Ensemble Methods for Personality Recognition, AAAI Technical Report WS-13-01, 2000, pp. 35-38, CLiPS, University of Antwerp, Antwerp, Belgium.

Wang, et al., "Context effects produced by question orders reveal quantum nature of human judgments", PNAS, vol. 111, Issue: 26, pp. 9431-6, 2014, Digital Object Identifier: 10.1073/pnas.1407756111.

Wang, et al., "A Quantum Question Order Model Supported by Empirical Tests of an A Priori and Precise Prediction", Topics in Cognitive Sciences, 5, pp. 689-710, 2013, Digital Object Identifier: 10.1111/tops.12040.

Yepez, "Lecture Notes: Qubit Representations and Rotations", Lecture Notes, Department of Physics and Astronomy, University of Hawaii at Manoa, Phys 711, Topics in Particles & Fields, Lecture 1, v.03, Spring 2013, Jan. 9, 2013, Honolulu.

Zurek, "Decoherence and the Transition from Quantum to Classical—Revisited", Los Alamos Science, vol. 27, Publisher: Springer, pp. 2-25, 2002, Digital Object Identifier: 10.1063/1.881293.

\* cited by examiner

PERTURBING A SUBJECT'S CONTEXTUALIZATION OF A PROPOSITION ABOUT AN ITEM CONSIDERED IN A QUANTUM REPRESENTATION BY ALTERING THE ITEM

RELATED APPLICATIONS

This application is a Continuation-In-Part of U.S. patent application Ser. No. 14/582,056 entitled "Biasing effects on the contextualization of a proposition by like-minded subjects considered in a quantum representation", filed on Dec. 23, 2014 and incorporated herein in its entirety. Furthermore, this application is related to U.S. patent application Ser. No. 14/182,281 entitled "Method and Apparatus for Predicting Subject Responses to a Proposition based on a Quantum Representation of the Subject's Internal State and of the Proposition", filed on Feb. 17, 2014, and to U.S. patent application Ser. No. 14/224,041 entitled "Method and Apparatus for Predicting Joint Quantum States of Subjects modulo an Underlying Proposition based on a Quantum Representation", filed on Mar. 24, 2014, and to U.S. patent application Ser. No. 14/324,127 entitled "Quantum State Dynamics in a Community of Subjects assigned Quantum States modulo a Proposition perceived in a Social Value Context", filed on Jul. 4, 2014, and to U.S. patent application Ser. No. 14/504,435 entitled "Renormalization-Related Deployment of Quantum Representations for Tracking Measurable Indications Generated by Test Subjects while Contextualizing Propositions", filed on Oct. 2, 2014, and to U.S. patent application Ser. No. 14/555,478 entitled "Marketing to a Community of Subjects assigned Quantum States modulo a Proposition perceived in a Social Value Context", filed on Nov. 26, 2014. All enumerated five related applications are incorporated herein by reference in their entirety.

FIELD OF THE INVENTION

The present invention relates to a method and an apparatus for perturbing and detecting the perturbation effects on a contextualization selected by a subject in apprehending an underlying proposition about the item, where the perturbation effects are due to injection of ambiguity into the contextualization by altering the item, the method and apparatus being applicable in conjunction with a quantum representation of the subject and the contextualization of the proposition.

BACKGROUND OF THE INVENTION

1. Preliminary Overview

Fundamental and new insights into the workings of nature at micro-scale were captured by quantum mechanics over a century ago. The realizations derived from these insights have forced several drastic revisions to our picture of reality at that scale. A particularly difficult to accept adjustment in thinking had to do with quantum's inherently statistical rather than predictive description of events.

Many centuries of progress in the western world were rooted in logical and positivist extensions of the ideas of materialism. This paradigm suggested that the underpinnings of reality involve elements that are separable and interact in deterministic ways. Short of such classical triumph, one might have at least presumed that reality is explainable in terms of distinguishable elements that are stable, coherent and consistent. These expectations biased the human mind against theories of nature that did not offer simple, certain and perpetually applicable rules for categorizing and quantifying things.

Quantum mechanics flagrantly violated these expectations. Moreover, reality sided with quantum mechanics by supporting all of its predictions with experimentally verifiable facts. This unceremonious breaking of western premises and of the classical worldview presented scientists and modern thinkers with a conundrum of epic proportions.

As often happens in such situations, western culture at large chose the coping mechanism of avoidance and/or denial. In other words, for the most part it kept marching on without worrying about the implications of quantum theory on human lives and endeavors. The few that paid attention to the sound of death knells for cherished notions such as the western concepts of ontology and epistemology, determinism, realism and causality found some solace in three principles. The application of these principles helped to convince them to sequester any conceivable effects of the novel and "weird" ideas in the domain of the very small.

First was the correspondence principle, which requires that quantum mechanics reduce to classical physics at macro-scale. Second was decoherence, the accepted mechanism for explaining the emergence of classical order at macro-scale. Third were the tools officially devised by the Copenhagen Interpretation, and more specifically the classical measurement apparatus deemed fundamental to performing any legitimate quantum measurements and explaining the experiment. (It should be remarked, however, that even the biggest proponent of using the classical-sized measurement apparatus, Niels Bohr, did not preclude the possibility of treating large-scale systems quantum mechanically, provided a suitable "classical apparatus" could be found for making the required measurements.) The above concepts along with several additional arguments permitted even those perturbed by the new science to safely disregard its most radical aspects in most practical settings.

In most people's minds "weird" revolutionary ideas became a curiosity confined to the atomic and sub-atomic realms as well as esoteric fields presumed devoid of any practical importance. Despite many attempts to export the new teachings to wider circles, including many academic disciplines, the actual and unadulterated discoveries did not percolate into general western consciousness. Rather than achieving the stature it deserved, the new fundamental theory of nature became a silent explosion in a niche domain with a recognized ability to amuse and perplex. Of course, the inherent difficulty of the subject and the high level of skill required of its practitioners were never helpful in efforts at wider dissemination.

In fields more closely affected by the quantum, many responded by adopting strong notions about the existence of as-yet-undiscovered and more fundamental predictive description(s) of microscopic phenomena that would explain the same facts more fully. In following such classical intuitions, some have spent considerable efforts in unsuccessful attempts to attribute the statistical nature of quantum mechanics to its incompleteness. Others tried to interpret or reconcile it with entrenched classical intuitions rooted in Newtonian physics. However, the deep desire to contextualize quantum mechanics within a larger and more "intuitive" or even quasi-classical framework has resulted in few works of practical significance. On the other hand, it has bred many philosophical discussions that are ongoing.

Meanwhile, as human tools enable us to probe nature at incredible resolutions, quantum mechanics continues to exhibit exceptional levels of agreement with all measurable aspects of reality. Its explanatory power within legitimately applicable realms remains unchallenged as it continues to defy all struggles at classical reinterpretations. Today, quantum mechanics and the consequent quantum theory of fields (its extension and partial integration with relativity theory) have proven to be humanity's best fundamental theories of nature. Sub-atomic, atomic as well as many molecular and even higher-level phenomena are now studied with quantum or at least quasi-quantum models.

In a radical departure from the classical assumption of perpetually existing and measurable quantities, the quantum representation of reality posits new entities called wavefunctions or state vectors. These unobservable components of the new model of reality are prior to the emergence of measured quantities (a.k.a. observables) or facts. More precisely, state vectors are related to distributions of probabilities for observing any one of a range of possible experimental results. A telltale sign of the "non-physical" status of a state vector is captured in the language of mathematics, where typical state vectors are expressed as imaginary-valued objects. Further, the space spanned by such state vectors is not classical (i.e., it is not our familiar Euclidean space or even any classical configuration space such as phase space). Instead, state vectors inhabit a Hilbert space of square-integrable functions.

Given that state vectors actually represent complex probability amplitudes, it is uncanny that their behavior is rather easily reconciled with previously developed physics formalisms. Indeed, after some revisions the tools of Lagrangian and Hamiltonian mechanics as well as many long-standing physical principles, such as the Principle of Least Action, are found to apply directly to state vectors and their evolution. The stark difference, of course, is that state vectors themselves represent relative propensities for observing certain measurable values associated with the objects of study, rather than these measurable quantities themselves. In other words, whereas the classical formulations, including Hamiltonian or Lagrangian mechanics, were originally devised to describe the evolution of "real" entities, their quantum mechanical equivalents apply to the evolution of probability amplitudes in a "pre-emerged reality". Apart from that jarring fact, when left unobserved the state vectors prove to be rather well behaved. Their continuous and unitary evolution in Hilbert space is not entirely unlike propagation of real waves in plain Euclidean space. Hence, some of our intuitions about classical wave mechanics are useful in grasping the behavior of quantum waves.

Of course, our intuitive notions about wave mechanics ultimately falter because quantum waves are not physical waves. This becomes abundantly clear when considering superpositions of two or more such complex-valued objects. Indeed, such superpositions help to bring out several unexpected aspects of quantum mechanics.

For example, quantum wave interference predicts the emergence of probability interference patterns that lead to unexpected distributions of measureable entities in real space. This is true, albeit not noticeable at macro-scales, even when dealing with familiar particles and their trajectories. The interference effect is probably best illustrated by the famous Young's double slit experiment. Here, the complex phase differences between quantum mechanical waves propagating from different space points, namely the two slits where the particle wave was forced to "bifurcate", manifest in a measurable effect on the path followed by the physical particle. Specifically, the particle is predicted to exhibit a type of self-interference that prevents it from reaching certain places that lie manifestly along classically computed particle trajectories. These startling quantum effects are confirmed by fact.

Although surprising, wave superpositions and interference patterns in probability distributions are ultimately not the novel aspects that challenged human intuition most. Far more mysterious is the nature of measurement during which a real value of an observable attribute or of an element of reality is actually observed. While the underlying model of pre-emerged reality constructed of quantum waves governed by differential wave equations (e.g., by the Schroedinger equation) and boundary conditions may be at least partly intuitive, measurement defies all attempts at non-probabilistic description.

According to quantum theory, the act of measurement forces the full state vector or wave packet of all possibilities to "collapse" or choose just one of the possibilities. In other words, measurement forces the normally compound wave function (i.e., a superposition of possible wave solutions to the governing differential equation) to transition discontinuously and manifest as just one of its constituents. Still differently put, measurement reduces the wave packet and selects only one component wave from the full packet that represents the superposition of all component waves contained in the state vector.

In order to properly evaluate the state of the prior art and to contextualize the contributions of the present invention, it will be necessary to review a number of important concepts from quantum mechanics, quantum information theory (e.g., the quantum version of bits also called "qubits" by skilled artisans) and several related fields. For the sake of brevity, only the most pertinent issues will be presented herein. A more thorough review of quantum information theory is found in course materials by John P. Preskill, "Quantum Information and Computation", Lecture Notes Ph219/CS219, Chapters 2&3, California Institute of Technology, 2013 and references cited therein and in lecture notes of Jeffrey Yepez, "Topics in Particles & Fields", Lectures 1&2 Phys711, Department of Physics and Astronomy of the University of Hawaii, Spring 2013 and the references cited therein as well. Excellent reviews of the fundamentals of quantum mechanics are found in standard textbooks starting with P.A.M. Dirac, "The Principles of Quantum Mechanics", Oxford University Press, $4^{th}$ Edition, 1958; L. D. Landau and E. M. Lifshitz, "Quantum Mechanics (Non-relativistic Theory)", Institute of Physical Problems, USSR Academy of Sciences, Butterworth Heinemann, $3^{rd}$ Edition, 1962; Cohen-Tannoudji et al., "Quantum Mechanics", John Wiley & Sons, 1977, and many others including the more modern and experiment-based treatments such as J. J. Sakurai, "Modern Quantum Mechanics", Addison-Wesley, 2011.

2. A Brief Review of Quantum Mechanics Fundamentals

In most practical applications of quantum models, the process of measurement is succinctly and elegantly described in the language of linear algebra or matrix mechanics (frequently referred to as the Heisenberg picture). Since all those skilled in the art are familiar with linear algebra, many of its fundamental theorems and corollaries will not be reviewed herein. In the language of linear algebra, a quantum wave $\psi$ is represented in a suitable eigenvector basis by a state vector $|\psi\rangle$. To provide a more rigorous definition, we will take advantage of the formal bra-ket notation introduced by Dirac and routinely used in the art.

In the bra-ket convention a column vector $\psi$ is written as $|\psi\rangle$ and its corresponding row vector (dual vector) is written as $\langle\psi|$. Additionally, because of the complex-valuedness of quantum state vectors, flipping any bra vector to its dual ket vector and vice versa implicitly includes the step of complex conjugation. After initial introduction, most textbooks do not expressly call out this step (i.e., $\langle\psi|$ is really $\langle\psi^*|$ where the asterisk denotes complex conjugation). The reader is cautioned that many simple errors can be avoided by recalling this fundamental rule of complex conjugation.

We now recall that a measure of norm or the dot product (which is related to a measure of length and is a scalar quantity) for a standard vector $\vec{x}$ is normally represented as a multiplication of its row vector form by its column vector form as follows: $d = \vec{x}^T \vec{x}$. This way of determining norm carries over to the bra-ket formulation. In fact, the norm of any state vector carries a special significance in quantum mechanics.

Expressed by the bra-ket $\langle\psi|\psi\rangle$, we note that this formulation of the norm is always positive definite and real-valued for any non-zero state vector. That condition is assured by the step of complex conjugation when switching between bra and ket vectors. State vectors describe probability amplitudes while their norms correspond to probabilities. The latter are real-valued and by convention mapped to a range between 0 and 1 (with 1 representing a probability of 1 or 100% certainty). Correspondingly, all state vectors are typically normalized such that their inner product (a generalization of the dot product) is equal to one, or simply put: $\langle\psi|\psi\rangle = \langle\chi|\chi\rangle = \ldots = 1$. This normalization enforces conservation of probability on objects composed of quantum mechanical state vectors.

Using the above notation, we can represent any state vector $|\psi\rangle$ in its ket form as a sum of basis ket vectors $|\epsilon_j\rangle$ that span the Hilbert space $\mathcal{H}$ of state vector $|\psi\rangle$. In this expansion, the basis ket vectors $|\epsilon_j\rangle$ are multiplied by their correspondent complex coefficients $c_j$. In other words, state vector $|\psi\rangle$ decomposes into a linear combination as follows:

$$|\psi\rangle = \Sigma_{j=1}^{n} c_j |\epsilon_j\rangle \qquad \text{Eq. 1}$$

where n is the number of vectors in the chosen basis. This type of decomposition of state vector $|\psi\rangle$ is sometimes referred to as its spectral decomposition by those skilled in the art.

Of course, any given state vector $|\psi\rangle$ can be composed from a linear combination of vectors in different bases thus yielding different spectra. However, the normalization of state vector $|\psi\rangle$ is equal to one irrespective of its spectral decomposition. In other words, bra-ket $\langle\psi|\psi\rangle = 1$ in any basis. From this condition we learn that the complex coefficients $c_j$ of any expansion have to satisfy:

$$p_{tot} = 1 = \Sigma_{j=1}^{n} c_j^* c_j \qquad \text{Eq. 2}$$

where $p_{tot}$ is the total probability. This ensures the conservation of probability, as already mentioned above. Furthermore, it indicates that the probability $p_j$ associated with any given eigenvector $|\epsilon_j\rangle$ in the decomposition of $|\psi\rangle$ is the norm of the complex coefficient $c_j$, or simply put:

$$p_j = c_j^* c_j. \qquad \text{Eq. 3}$$

In view of the above, it is not accidental that undisturbed evolution of any state vector $|\psi\rangle$ in time is found to be unitary or norm preserving. In other words, the evolution is such that the norms $c_j^* c_j$ do not change with time.

To better understand the last point, we use the polar representation of complex numbers by their modulus r and phase angle $\theta$. Thus, we rewrite complex coefficient $c_j$ as:

$$c_j = r_j e^{i\theta_j}, \qquad \text{Eq. 4a}$$

where $i = \sqrt{-1}$ (we will use i rather than j for the imaginary number). In this form, complex conjugate of complex coefficient $c_j^*$ is just:

$$c_j^* = r_j e^{-i\theta_j}, \qquad \text{Eq. 4b}$$

and the norm becomes:

$$c_j^* c_j = r_j e^{-i\theta_j} r_j e^{i\theta_j} = r_j^2. \qquad \text{Eq. 4c}$$

The step of complex conjugation thus makes the complex phase angle drop out of the product (since $e^{-i\theta} e^{i\theta} = e^{i(\theta-\theta)} = e^0 = 1$). This means that the complex phase of coefficient $c_j$ does not have any measurable effect on the real-valued probability $p_1$ associated with the corresponding eigenvector $|\epsilon_j\rangle$. Note, however, that relative phases between different components of the decomposition will introduce measurable effects (e.g., when measuring in a different basis).

Given the above insight about complex phases, it should not be a surprise that temporal evolution of state vector $|\psi\rangle$ corresponds to the evolution of phase angles of complex coefficients $c_j$ in its spectral decomposition (see Eq. 1). In other words, evolution of state vector $|\psi\rangle$ in time is associated with a time-dependence of angles $\theta_j$ of each complex coefficient $c_j$. The complex phase thus exhibits a time dependence $e^{i\theta_j} = e^{i\omega_j t}$, where the j-th angular frequency $\omega_j$ is associated with the j-th eigenvector $|\epsilon_j\rangle$ and t stands for time. For completeness, it should be pointed out that $\omega_j$ is related to the energy level of the correspondent eigenvector $|\epsilon_j\rangle$ by the famous Planck relation:

$$E_j = \hbar \omega_j, \qquad \text{Eq. 5}$$

where $\hbar$ stands for the reduced Planck's constant h, namely:

$$\hbar = \frac{h}{2\pi}.$$

Correspondingly, evolution of state vector $|\psi\rangle$ is encoded in a unitary matrix U that acts on state vector $|\psi\rangle$ in such a way that it only affects the complex phases of the eigenvectors in its spectral decomposition. The unitary nature of evolution of state vectors ensures the fundamental conservation of probability. Of course, this rule applies when there are no disturbances to the overall system and states exhibiting this type of evolution are often called stationary states.

In contrast to the unitary evolution of state vectors that affects the complex phases of all eigenvectors of the state vector's spectral decomposition, the act of measurement picks out just one of the eigenvectors. Differently put, the act of measurement is related to a projection of the full state vector $|\psi\rangle$ onto the subspace defined by just one of eigenvectors $|\epsilon_j\rangle$ in the vector's spectral decomposition (see Eq. 1). Based on the laws of quantum mechanics, the projection obeys the laws of probability. More precisely, each eigenvector $|\epsilon_j\rangle$ has the probability $p_1$ dictated by the norm $c_j^* c_j$ (see Eq. 3) of being picked for the projection induced by the act of measurement. Besides the rules of probability, there are no hidden variables or any other constructs involved in predicting the projection. This situation is reminiscent of a probabilistic game such as a toss of a coin or the throw of a die. It is also the reason why Einstein felt uncomfortable with quantum mechanics and proclaimed that he did not believe that God would "play dice with the universe".

No experiments to date have been able to validate Einstein's position by discovering hidden variables or other deterministic mechanisms behind the choice. In fact, experiments based on the famous Bell inequality and many other investigations have confirmed that the above understanding encapsulated in the projection postulate of quantum mechanics is complete. Furthermore, once the projection occurs due to the act of measurement, the emergent element of reality that is observed, i.e., the measurable quantity, is the eigenvalue $\lambda_j$ associated with eigenvector $|\epsilon_j\rangle$ selected by the projection.

Projection is a linear operation represented by a projection matrix P that can be derived from knowledge of the basis vectors. The simplest state vectors decompose into just two distinct eigenvectors in any given basis. These vectors describe the spin states of spin ½ particles such as electrons and other spinors. The quantum states of twistors, such as photons, also decompose into just two eigenvectors. In the present case, we will refer to spinors for reasons of convenience.

It is customary to define the state space of a spinor by eigenvectors of spin along the z-axis. The first, $|\epsilon_{z+}\rangle$ is aligned along the positive z-axis and the second, $|\epsilon_{z-}\rangle$ is aligned along the negative z-axis. Thus, from standard rules of linear algebra, the projection along the positive z-axis (z+) can be obtained from constructing the projection matrix or, in the language of quantum mechanics the projection operator $P_{z+}$ from the z+ eigenvector $|\epsilon_{z+}\rangle$ as follows:

$$P_{z+} = |\epsilon_{z+}\rangle\langle\epsilon_{z+}| = \begin{bmatrix}1\\0\end{bmatrix}\begin{bmatrix}1 & 0\end{bmatrix}^* = \begin{bmatrix}1 & 0\\0 & 0\end{bmatrix}, \quad \text{Eq. 6}$$

where the asterisk denotes complex conjugation, as above (no change here because vector components of $|\epsilon_{z+}\rangle$ are not complex in this example). Note that in Dirac notation obtaining the projection operator is analogous to performing an outer product in standard linear algebra. There, for a vector $\vec{x}$ we get the projection matrix onto it through the outer product, namely: $P_x = \vec{x}\vec{x}^T$.

3. A Brief Introduction to Qubits

We have just seen that the simplest quantum state vector $|\psi\rangle$ corresponds to a pre-emerged quantum entity that can yield one of two distinct observables under measurement. These measures are the two eigenvalues $\lambda_1$, $\lambda_2$ of the correspondent two eigenvectors $|\epsilon_1\rangle$, $|\epsilon_2\rangle$ in the chosen spectral decomposition. The relative occurrence of the eigenvalues will obey the probabilistic rule laid down by the projection postulate. In particular, eigenvalue $\lambda_1$ will be observed with probability $p_1$ (see Eq. 3) equal to the probability of projection onto eigenvector $|\epsilon_1\rangle$. Eigenvalue $\lambda_2$ will be seen with probability $p_2$ equal to the probability of projection onto eigenvector $|\epsilon_2\rangle$.

Because of the simplicity of the two-state quantum system represented by such two-state vector $|\psi\rangle$, it has been selected in the field of quantum information theory and quantum computation as the fundamental unit of information. In analogy to the choice made in computer science, this system is commonly referred to as a qubit and so the two-state vector becomes the qubit: $|qb\rangle = |\psi\rangle$. Operations on one or more qubits are of great interest in the field of quantum information theory and its practical applications. Since the detailed description will rely extensively on qubits and their behavior, we will now introduce them with a certain amount of rigor.

From the above preliminary introduction it is perhaps not surprising to find that the simplest two-state qubit, just like a simple spinor or twistor on which it is based, can be conveniently described in 2-dimensional complex space called $\mathbb{C}^2$. The description finds a more intuitive translation to our 3-dimensional space, $\mathbb{R}^3$, with the aid of the Bloch or Poincare Sphere. This concept is introduced by FIG. 1A, in which the Bloch Sphere 10 is shown centered on the origin of orthogonal coordinates indicated by axes X, Y, Z.

Before allowing oneself to formulate an intuitive view of qubits by looking at Bloch sphere 10, the reader is cautioned that the representation of qubits inhabiting $\mathbb{C}^2$ by mapping them to a ball in $\mathbb{R}^3$ is a useful tool. The actual mapping is not one-to-one. Formally, the representation of spinors by the group of transformations defined by SO(3) (Special Orthogonal matrices in $\mathbb{R}^3$) is double-covered by the group of transformations defined by SU(2) (Special Unitary matrices in $\mathbb{C}^2$).

In the Bloch representation, a qubit 12 represented by a ray in $\mathbb{C}^2$ is spectrally decomposed into the two z-basis eigenvectors. These eigenvectors include the z-up or $|+\rangle_z$ eigenvector, and the z-down or $|-\rangle_z$ eigenvector. The spectral decomposition theorem assures us that any state of qubit 12 can be decomposed in the z-basis as long as we use the appropriate complex coefficients. In other words, any state of qubit 12 can be described in the z-basis by:

$$|\psi\rangle_z = |qb\rangle_z = \alpha|+\rangle_z + \beta|-\rangle_z, \quad \text{Eq. 7}$$

where $\alpha$ and $\epsilon$ are the corresponding complex coefficients. In quantum information theory, basis state $|+\epsilon_z$ is frequently mapped to logical "yes" or to the value "1", while basis state $|-\epsilon_z$ is frequently mapped to logical "no" or to the value "0".

In FIG. 1A basis states $|+\epsilon_z$ and $|-\rangle_z$ are shown as vectors and are written out in full form for clarity of explanation. (It is worth remarking that although basis states $|+\rangle_z$ and $|-\rangle_z$ are indeed orthogonal in $\mathbb{C}^2$, they fall on the same axis (Z axis) in the Bloch sphere representation in $\mathbb{R}^3$. That is because the mapping is not one-to-one but rather homomorphic, as already mentioned above.) Further, in our chosen representation of qubit 12 in the z-basis, the X axis corresponds to the real axis and is thus also labeled by Re. Meanwhile, the Y axis corresponds to the imaginary axis and is additionally labeled by Im.

To appreciate why complex coefficients $\alpha$ and $\beta$ contain sufficient information to encode qubit 12 pointed anywhere within Bloch sphere 10 we now refer to FIG. 1B. Here the complex plane 14 spanned by real and imaginary axes Re, Im that are orthogonal to the Z axis and thus orthogonal to eigenvectors $|+\rangle_z$ and $|-\rangle_z$ of our chosen z-basis is hatched for better visualization. Note that eigenvectors for the x-basis $|+\rangle_x$, $|-\rangle_x$ as well as eigenvectors for the y-basis $|+\rangle_y$, $|-\rangle_y$ are in complex plane 14. Most importantly, note that each one of the alternative basis vectors in the two alternative basis choices we could have made finds a representation using the eigenvectors in the chosen z-basis. As shown in FIG. 1B, the following linear combinations of eigenvectors $|+\rangle_z$ and $|-\rangle_z$ describe vectors $|+\rangle_x$, $|-\rangle_x$ and $|+\rangle_y$, $|-\rangle_y$:

$$|+\rangle_x = \frac{1}{\sqrt{2}}|+\rangle_z + \frac{1}{\sqrt{2}}|-\rangle_z,\qquad\text{Eq. 8a}$$

$$|-\rangle_x = \frac{1}{\sqrt{2}}|+\rangle_z - \frac{1}{\sqrt{2}}|-\rangle_z,\qquad\text{Eq. 8b}$$

$$|+\rangle_y = \frac{1}{\sqrt{2}}|+\rangle_z + \frac{i}{\sqrt{2}}|-\rangle_z,\qquad\text{Eq. 8c}$$

$$|-\rangle_y = \frac{1}{\sqrt{2}}|+\rangle_z - \frac{i}{\sqrt{2}}|-\rangle_z.\qquad\text{Eq. 8d}$$

Clearly, admission of complex coefficients α and β permits a complete description of qubit 12 anywhere within Bloch sphere 10 thus furnishing the desired map from $\mathbb{C}^2$ to $\mathbb{R}^3$ for this representation. The representation is compact and leads directly to the introduction of Pauli matrices.

FIG. 1C shows the three Pauli matrices $\sigma_1$, $\sigma_2$, $\sigma_3$ (sometimes also referred to as $\sigma_x$, $\sigma_y$, $\sigma_z$) that represent the matrices corresponding to three different measurements that can be performed on spinors. Specifically, Pauli matrix $\sigma_1$ corresponds to measurement of spin along the X axis (or the real axis Re). Pauli matrix $\sigma_2$ corresponds to measurement of spin along the Y axis (or the imaginary axis Im). Finally, Pauli matrix $\sigma_3$ corresponds to measurement of spin along the Z axis (which coincides with measurements in the z-basis that we have selected). The measurement of spin along any of these three orthogonal axes will force projection of qubit 12 to one of the eigenvectors of the corresponding Pauli matrix. The measurable value will be the eigenvalue that is associated with the eigenvector.

To appreciate the possible outcomes of measurement we notice that all Pauli matrices $\sigma_1$, $\sigma_2$, $\sigma_3$ share the same two orthogonal eigenvectors, namely $|\epsilon_1\rangle = [1, 0]$ and $|\epsilon_2\rangle = [0, 1]$. Further, Pauli matrices are Hermitian (an analogue of real-valued symmetric matrices) such that:

$$\sigma_k = \sigma_k^\dagger,\qquad\text{Eq. 9}$$

for k=1,2,3 (for all Pauli matrices). These properties ensure that the eigenvalues $\lambda_1$, $\lambda_2$, $\lambda_3$ of Pauli matrices $\sigma_1$, $\sigma_2$, $\sigma_3$ are real and the same for each matrix. In particular, for spin particles such as electrons, the Pauli matrices are multiplied by a factor of $\hbar/2$ to obtain the corresponding spin angular momentum matrices $S_k$. Hence, the eigenvalues are shifted to $$\lambda_1 = \frac{\hbar}{2}$$

and $$\lambda_2 = -\frac{\hbar}{2}$$

(where h is the reduced Planck's constant already defined above). Here we also notice that Pauli matrices $\sigma_1$, $\sigma_2$, $\sigma_3$ are constructed to apply to spinors, which change their sign under a 2π rotation and require a rotation by 4π to return to initial state (formally, an operator S is a spinor if S(θ+2π)=−S(θ)).

As previously pointed out, in quantum information theory and its applications the physical aspect of spinors becomes unimportant and thus the multiplying factor of $\hbar/2$ is dropped. Pauli matrices $\sigma_1$, $\sigma_2$, $\sigma_3$ are used in unmodified form with corresponded eigenvalues $\lambda_1=1$ and $\lambda_2=-1$ mapped to two opposite logical values, such as "yes" and "no". For the sake of rigor and completeness, one should state that the Pauli matrices are traceless, each of them squares to the Identity matrix I, their determinants are −1 and they are involutory. A more thorough introduction to their importance and properties can be found in the many foundational texts on Quantum Mechanics, including the above mentioned textbook by P.A.M. Dirac, "The Principles of Quantum Mechanics", Oxford University Press, 4$^{th}$ Edition, 1958 in the section on the spin of the electron.

Based on these preliminaries, the probabilistic aspect of quantum mechanics encoded in qubit 12 can be re-stated more precisely. In particular, we have already remarked that the probability of projecting onto an eigenvector of a measurement operator is proportional to the norm of the complex coefficient multiplying that eigenvector in the spectral decomposition of the full state vector. This rather abstract statement can now be recast as a complex linear algebra prescription for computing an expectation value $\langle O \rangle$ of an operator matrix O for a given quantum state $|\psi\rangle$ as follows:

$$\langle O \rangle_\psi = \langle \psi | O | \psi \rangle,\qquad\text{Eq. 10a}$$

where the reader is reminded of the implicit complex conjugation between the bra vector $\langle\psi|$ and the dual ket vector $|\psi\rangle$. The expectation value $\langle O \rangle_\psi$ is a number that corresponds to the average result of the measurement obtained by operating with matrix O on a system described by state vector $|\psi\rangle$. For better understanding, FIG. 1C visualizes the expectation value $\langle \sigma_3 \rangle$ for qubit 12 whose ket in the z-basis is written as $|qb\rangle_z$ for a measurement along the Z axis represented by Pauli matrix $\sigma_3$ (note that the subscript on the expectation value is left out, since we know what state vector is being measured).

Although the drawing may suggests that expectation value $\langle \sigma_3 \rangle$ is a projection of qubit 12 onto the Z axis, the value of this projection is not the observable. Instead, the value $\langle \sigma_3 \rangle$ is the expectation value of collapse of qubit 12 represented by ket vector $|qb\rangle_z$ in other words, a value that can range anywhere between 1 and −1 ("yes" and "no") and will be found upon collecting the results of a large number of actual measurements.

In the present case, since operator $\sigma_3$ has a complete set of eigenvectors (namely $|+\rangle_z$ and $|-\rangle_z$) and since the qubit $|qb\rangle_z$ we are interested in is described in the same z-basis, the probabilities are easy to compute. The expression follows directly from Eq. 10a:

$$\langle \sigma_3 \rangle_\psi = \Sigma_j \lambda_j |\langle \psi | \epsilon_j \rangle|^2,\qquad\text{Eq. 10b}$$

where $\lambda_j$ are the eigenvalues (or the "yes" and "no" outcomes of the experiment) and the norms $|\langle\psi|\epsilon_j\rangle|^2$ are the probabilities that these outcomes will occur. Eq. 10b is thus more useful for elucidating how the expectation value of an operator brings out the probabilities of collapse to respective eigenvectors $|\epsilon_j\rangle$ that will obtain when a large number of measurements are performed in practice.

For the specific case in FIG. 1C, we show the probabilities from Eq. 10b can be found explicitly in terms of the complex coefficients $\alpha$ and $\beta$. Their values are computed from the definition of quantum mechanical probabilities already introduced above (see Eqs. 2 and 3):

$$p_1 = p_{\text{"yes"}} = |\langle qb|\epsilon_1\rangle|^2 =$$
$$|(\alpha^*\langle +|+\beta^*\langle -|)|+\rangle_z|^2 = \alpha^*\alpha$$

$$p_1 = p_{\text{"no"}} = |\langle qb|\epsilon_1\rangle|^2 = |(\alpha^*\langle +|+\beta^*\langle -|)|+\rangle_z|^2 = \beta^*\beta$$

$$p_1 + p_2 = p_{\text{"yes"}} + p_{\text{"no"}} = \alpha^*\alpha + \beta^*\beta = 1$$

These two probabilities are indicated by visual aids at the antipodes of Bloch sphere 10 for clarification. The sizes of the circles that indicate them denote their relative values. In the present case $p_{\text{"yes"}} > p_{\text{"no"}}$ given the exemplary orientation of qubit 12.

Representation of qubit 12 in Bloch sphere 10 brings out an additional and very useful aspect to the study, namely a more intuitive polar representation. This representation will also make it easier to point out several important aspects of quantum mechanical states that will be pertinent to the present invention.

FIG. 1D illustrates qubit 12 by deploying polar angle $\theta$ and azimuthal angle $\phi$ routinely used to parameterize the surface of a sphere in $\mathbb{R}^3$. Qubit 12 described by state vector $|qb\rangle_z$ has the property that its vector representation in Bloch sphere 10 intersects the sphere's surface at point 16. That is apparent from the fact that the norm of state vector $|qb\rangle_z$ is equal to one and the radius of Bloch sphere 10 is also one. Still differently put, qubit 12 is represented by quantum state $|qb\rangle_z$ that is pure; i.e., it is considered in isolation from the environment and from any other qubits for the time being. Pure state $|qb\rangle_z$ is represented with polar and azimuth angles $\theta$, $\phi$ of the Bloch representation as follows:

$$|qb\rangle_z = \cos\theta/2|+\rangle_z + e^{i\phi}\sin\theta/2|-\rangle_z, \quad \text{Eq. 11}$$

where the half-angles are due to the state being a spinor (see definition above). The advantage of this description becomes even more clear in comparing the form of Eq. 11 with Eq. 7. State $|qb\rangle_z$ is insensitive to any overall phase or overall sign thus permitting several alternative formulations.

Additionally, we note that the Bloch representation of qubit 12 provides for an easy parameterization of point 16 in terms of $\{x,y,z\}$ coordinates directly from polar and azimuth angles $\theta$, $\phi$. In particular, the coordinates of point 16 are just:

$$\{x,y,z\} = \{\sin\theta\cos\phi, \sin\theta\sin\phi, \cos\theta\}, \quad \text{Eq. 12}$$

in agreement with standard transformation between polar and Cartesian coordinates.

We now return to the question of measurement equipped with some basic tools and a useful representation of qubit 12 as a unit vector terminating at the surface of Bloch sphere 10 at point 16 (whose coordinates $\{x,y,z\}$ are found from Eq. 12) and pointing in some direction characterized by angles $\theta$, $\phi$. The three Pauli matrices $\sigma_1$, $\sigma_2$, $\sigma_3$ can be seen as associating with measurements along the three orthogonal axes X, Y, Z in real 3-dimensional space $\mathbb{R}^3$.

A measurement represented by a direction in $\mathbb{R}^3$ can be constructed from the Pauli matrices. This is done with the aid of a unit vector $\hat{u}$ pointing along a proposed measurement direction, as shown in FIG. 1D. Using the dot-product rule, we now compose the desired operator $\sigma_u$ using unit vector $\hat{u}$ and the Pauli matrices as follows:

$$\sigma_u = \hat{u}\cdot\vec{\sigma} = u_x\sigma_1 + u_y\sigma_2 + u_z\sigma_3. \quad \text{Eq. 13}$$

Having thus built up a representation of quantum mechanical state vectors, we are in a position to understand a few facts about the pure state of qubit 12. Namely, an ideal or pure state of qubit 12 is represented by a Bloch vector of unit norm pointing along a well-defined direction. It can also be expressed by Cartesian coordinates $\{x,y,z\}$ of point 16. Unit vector $\hat{u}$ defining any desired direction of measurement can also be defined in Cartesian coordinates $\{x,y,z\}$ of its point of intersection 18 with Bloch sphere 10.

When the direction of measurement coincides with the direction of the state vector of qubit 12, or rather when the Bloch vector is aligned with unit vector $\hat{u}$, the result of the quantum measurement will not be probabilistic. In other words, the measurement will yield the result $|+\rangle_u$ with certainty (probability equal to 1 as may be confirmed by applying Eq. 10b), where the subscript u here indicates the basis vector along unit vector $\hat{u}$. Progressive misalignment between the direction of measurement and qubit 12 will result in an increasing probability of measuring the opposite state, $|-\rangle_u$.

The realization that it is possible to predict the value of qubit 12 with certainty under above-mentioned circumstances suggests we ask the opposite question. When do we encounter the least certainty about the outcome of measuring qubit 12? With the aid of FIG. 1E, we see that in the Bloch representation this occurs when we pick a direction of measurement along a unit vector $\hat{v}$ that is in a plane 20 perpendicular to unit vector $\hat{u}$ after establishing the state $|+\rangle_u$ (or the state $|-\rangle_u$) by measuring qubit 12 eigenvalue "yes" along $\hat{u}$ (or "no" opposite to $\hat{u}$). Note that establishing a certain state in this manner is frequently called "preparing the state" by those skilled in the art. After preparation in state $|+\rangle_u$ or in state $|-\rangle_u$, measurement of qubit 12 along vector $\hat{v}$ will produce outcomes $|+\rangle_v$ and $|-\rangle_v$ with equal probabilities (50/50).

Indeed, we see that this same condition holds among all three orthogonal measurements encoded in the Pauli matrices. To wit, preparing a certain measurement along Z by application of matrix $\sigma_3$ to qubit 12 makes its subsequent measurement along X or Y axes maximally uncertain (see also plane 14 in FIG. 1B). This suggests some underlying relationship between Pauli matrices $\sigma_1$, $\sigma_2$, $\sigma_3$ that encodes for this indeterminacy. Even based on standard linear algebra we expect that since the order of application of matrix operations usually matters (since any two matrices A and B typically do not commute) the lack of commutation between Pauli matrices could be signaling a fundamental limit to the simultaneous observation of multiple orthogonal components of spin or, by extension, of qubit 12.

In fact, we find that the commutation relations for the Pauli matrices, here explicitly rewritten with the x,y,z indices rather than 1,2,3, are as follows:

$$[\sigma_x, \sigma_y] = i\sigma_z; [\sigma_y, \sigma_z] = i\sigma_x; [\sigma_z, \sigma_x] = i\sigma_y. \quad \text{Eq. 14}$$

The square brackets denote the traditional commutator defined between any two matrices A, B as $[A,B] = AB - BA$. When actual quantities rather than qubits are the subject of investigation, this relationship leads directly to the famous Heisenberg Uncertainty Principle. This fundamental limitation on the emergence of elements of reality prevents the simultaneous measurement of incompatible observables and places a bound related to Planck's constant h (and more precisely to the reduced Planck's constant $\hbar$) on the commutator. This happens because matrices encoding real observables bring in a factor of Planck's constant and the commutator thus acquires this familiar bound.

The above finding is general and extends beyond the commutation relations between Pauli matrices. According to quantum mechanics, the measurement of two or more incompatible observables is always associated with matrices that do not commute. Another way to understand this new limitation on our ability to simultaneously discern separate elements of reality, is to note that the matrices for incompatible elements of reality cannot be simultaneously diagonalized. Differently still, matrices for incompatible elements of reality do not share the same eigenvectors. Given this fact of nature, it is clear why modern day applications strive to classify quantum systems with as many commuting observables as possible up to the famous Complete Set of Commuting Observables (CSCO).

Whenever the matrices used in the quantum description of a system do commute, then they correspond to physical quantities of the system that are simultaneously measurable. A particularly important example is the matrix that corresponds to the total energy of the system known as the Hamiltonian H. When an observable is described by a matrix M that commutes with Hamiltonian H, and the system is not subject to varying external conditions, (i.e., there is no explicit time dependence) then that physical quantity that corresponds to operator M is a constant of motion.

4. A Basic Measurement Arrangement

In practice, pure states are rare due to interactions between individual qubits as well as their coupling to the environment. All such interactions lead to a loss of quantum state coherency, also referred to as decoherence, and the consequent emergence of "classical" statistics. Thus, many additional tools have been devised for practical applications of quantum models under typical conditions. However, under conditions where the experimenter has access to entities exhibiting relatively pure quantum states many aspects of the quantum mechanical description can be recovered from appropriately devised measurements.

To recover the desired quantum state information it is important to start with collections of states that are large. This situation is illustrated by FIG. 1F, where an experimental apparatus 22 is set up to perform a measurement of spin along the Z axis. Apparatus 22 has two magnets 24A, 24B for separating a stream of quantum systems 26 (e.g., electrons) according to spin. The spin states of systems 26 are treated as qubits $12a, 12b, \ldots, 12n$ for the purposes of the experiment. The eigenvectors and eigenvalues are as before, but the subscript "z" that was there to remind us of the z-basis decomposition, which is now implicitly assumed, has been dropped.

Apparatus 22 has detectors 28A, 28B that intercept systems 26 after separation to measure and amplify the readings. It is important to realize that the act of measurement is performed during the interaction between the field created between magnets 24A, 24B and systems 26. Therefore, detectors 28A, 28B are merely providing the ability to amplify and record the measurements for human use. These operations remain consistent with the original result of quantum measurements. Hence, their operation can be treated classically. (The careful reader will discover a more in-depth explanation of how measurement can be understood as entanglement that preserves consistency between measured events given an already completed micro-level measurement. By contrast, the naïve interpretation allowing amplification to lead to macro-level superpositions and quantum interference, to with the Schroedinger's Cat paradox, is incompatible with the consistency requirement. A detailed analysis of these fine points is found in any of the previously mentioned foundational texts on quantum mechanics.)

For systems 26 prepared in various pure states that are unknown to the experimenter, the measurements along Z will not be sufficient to deduce these original states. Consider that each system 26 is described by Eq. 7. Thus, each system 26 passing through apparatus 22 will be deflected according to its own distinct probabilities $p_{|+\rangle}=\alpha^*\alpha$ (or $p_{"yes"}$) and $p_{|-\rangle}=\beta^*\beta$ (or $p_{"no"}$). Hence, other than knowing the state of each system 26 with certainty after its measurement, general information about the preparation of systems 26 prior to measurement will be very difficult to deduce.

FIG. 1G shows the more common situation, where systems 26 are all prepared in the same, albeit unknown pure state (for "state preparation" see section 3 above). Under these circumstances, apparatus 22 can be used to deduce more about the original pure state that is unknown to the experimenter. In particular, a large number of measurements of $|+\rangle$ ("yes") and $|-\rangle$ ("no") outcomes, for example N such measurements assuming all qubits $12a$ through $12n$ are properly measured, can be analyzed probabilistically. Thus, the number $n_{|+\rangle}$ of $|+\rangle$ measurements divided by the total number of qubits 12 that were measured, namely N, has to equal $\alpha^*\alpha$. Similarly, the number $n_{|-\rangle}$ of $|-\rangle$ measurements divided by N has to equal $\beta^*\beta$. From this information the experimenter can recover the projection of the unknown pure state onto the Z axis. In FIG. 1G this projection 26' is shown as an orbit on which the state vector can be surmised to lie. Without any additional measurements, this is all the information that can be easily gleaned from a pure Z axis measurement with apparatus 22.

5. Overview of Practical Cases

By now it will have become apparent to the reader that the quantum mechanical underpinnings of qubits are considerably more complicated than the physics of regular bits. Regular bits can be treated in a manner that is completely divorced from their physicality. A computer scientist dealing with a bit does not need to know what the physical system embodying the bit happens to be, as long as it satisfies the typical criteria of performance (e.g., low probability of bit errors and containment of other failure modes). Unfortunately, as already remarked and further based on the reviews found in the patent applications enumerated in the section on related applications, the same is not true for qubits.

To deal with quantum systems exhibiting interactions between themselves and with the environment that has degrees of freedom inaccessible to an observer a more practical representation had to be adopted. That is because in such open systems states or typically not rays in Hilbert space and measurements are not obtained by applying simple projections operators. Moreover, the evolution of the states is usually not unitary. A suitable representation in view of these real-life limitations is embodied by the density matrix, which was devised in the first half of the $20^{th}$ century and is usually attributed to John von Neumann (also sometimes to Lev Landau and Felix Bloch). We have previously discussed this matrix in U.S. patent application Ser. No.

14/182,281. Here we want to focus more on how this matrix accommodates mixed states and pure states that include coherent superpositions.

Let us start by looking at coherent superpositions. From Eq. 8a we know a pure state of up along X axis, or $|+\rangle_x$, can be expressed in terms of the up- and down-states along Z axis, i.e., by using the z-basis eigenvectors $|+\rangle_z$ and $|-\rangle_z$. Recall that the required superposition is actually:

$$|+\rangle_x = \frac{1}{\sqrt{2}}|+\rangle_z + \frac{1}{\sqrt{2}}|-\rangle_z.$$

This means that if we were to measure the z-component of spin (using the $\sigma_3$ operator or equivalently experimental apparatus 22 introduced in FIG. 1F) over a statistical sample of quantum systems 26 prepared as $|+\rangle_x$ then we would find states $|+\rangle_z$ and $|-\rangle_z$ to be equally likely (50/50). After all, the superposition has $c_1 = \alpha = 1/\sqrt{2}$ and thus probability $p_1 = (1/\sqrt{2}) = 1/2$ for state $|+\rangle_z$ and $c_2 = \beta = 1\sqrt{2}$ leading to probability $p_2 = (1/\sqrt{2}) = 1/2$ for state $|-\rangle_z$. If we were to measure the x-component of spin for this superposition via the $\sigma_1$ operator, however, we would find $|+\rangle_x$ with certainty every time (100% chance). (Of course, we would not actually observe the states, but rather their eigenvalues.)

Now consider a case in which we have a statistical sample or, what those skilled in the art refer to as an ensemble, of quantum systems 26 in which half of the states are $|+\rangle_z$ and the other half of the states are $|-\rangle_z$. Once again, by applying the $\sigma_3$ operator instantiated by experimental apparatus 22 we would find these states to be equally likely (50/50). Yet, a measurement along X axis represented by the $\sigma_1$ operator (we would obviously have to rotate apparatus 22 to perform this measurement) on the same ensemble would now discover state $|+\rangle_x$ only half of the time. The other half of the time the state along X axis would be down or $|-\rangle_x$. In other words, the ensemble exhibits an equiprobable distribution (50/50 chance) of states $|+\rangle_x$ and $|-\rangle_x$!

We have just uncovered a fundamental inability of measurements along just one single axis to determine the difference between a coherent superposition and a statistical ensemble. Needless to say, a proper description of the superposition and the statistical ensemble (sometimes referred to as "Gemisch" (German for "mixture" or "mixed state") by those skilled in the art) should take account of this. The density matrix is the right description and can be used in either case.

Let us examine its representation of the pure state expressed by the coherent superposition of Eq. 8a first. We construct the density matrix for this pure state by forming a projection onto it and then multiplying it by the probability of occurrence of this pure state. In our case the probability of occurrence of state $|+\rangle_z$ is 100% or 1. It must clearly be so, since we are not dealing with a mixture of different states but a coherent superposition. The density operator thus has only one component (i=1) and is computed using the outer product (introduced in conjunction with projection operators) as follows:

$$\hat{\rho} = \Sigma_i p_i |\psi_i\rangle\langle\psi_i|, \qquad \text{Eq. 15}$$

yielding in our case:

$$\hat{\rho} = \left(\frac{1}{\sqrt{2}}|+\rangle_z + \frac{1}{\sqrt{2}}|-\rangle_z\right)\left(\frac{1}{\sqrt{2}}{}_z\langle+| + \frac{1}{\sqrt{2}}{}_z\langle-|\right) = \begin{bmatrix} \frac{1}{2} & \frac{1}{2} \\ \frac{1}{2} & \frac{1}{2} \end{bmatrix}.$$

The trace class density operator $\hat{\rho}$ thus obtained encodes pure state $|+\rangle_x$ computed from its traditional z-basis decomposition. (We note here that the basis in which the computation is done turns out to be unimportant.)

Matrix $\hat{\rho}$ for pure state $|+\rangle_z$ looks a bit unwieldy and it may not be immediately apparent that it encodes a coherent superposition. Of course, it is idempotent and thus a good candidate density operator for representing a pure state (a state whose point 16 in the Bloch representation is on the surface of the Bloch ball—also see here the background section of U.S. patent application Ser. No. 14/182,281 and FIG. 1J in particular for an additional refresher on the properties of density matrices). However, we can compute the average value of observable $\sigma_1$ corresponding to the X axis measurement of spin for a reliable cross-check. The computation is performed by tracing over the product of two matrices. The first matrix is the observable of interest, represented here by operator matrix O, and the second one is just matrix $\hat{\rho}$ as follows:

$$\overline{O} = Tr\hat{\rho}O, \qquad \text{Eq. 16}$$

where the over-bar denotes average value. It is worth recalling that the trace operation will yield the same answer irrespective of matrix order whether or not the matrices commute. Now, to deploy Eq. 16 for our cross-check we set $O = \sigma_1$ and obtain:

$$\overline{\sigma}_1 = Tr\left(\begin{bmatrix} \frac{1}{2} & \frac{1}{2} \\ \frac{1}{2} & \frac{1}{2} \end{bmatrix}\begin{bmatrix} 0 & 1 \\ 1 & 0 \end{bmatrix}\right) = 1.$$

This means that the average value for a measurement along X axis is 1, or spin up. In fact, for the pure state under consideration this is exactly the expectation value which is written as $\langle \sigma_1 \rangle$ and whose prescription we have already introduced above (see Eqs. 10a & 10b). Spin up along X axis for sure indicates state $|+\rangle_x$. We have thus confirmed that the more general density matrix formalism correctly reproduces the expectation value.

We turn now to the mixed state introduced above. It is an ensemble of states $|+\rangle_z$ and $|-\rangle_z$ occurring with equal probabilities. Clearly, this is not a coherent superposition of the two states, but rather a stream of these states with 50/50 probability. The density operator applied from Eq. 15 now yields:

$$\hat{\rho} = \frac{1}{2}(|+\rangle_{zz}\langle+| + |-\rangle_{zz}\langle-|) = \begin{bmatrix} \frac{1}{2} & 0 \\ 0 & \frac{1}{2} \end{bmatrix} = \frac{1}{2}I,$$

where I is the 2×2 identity matrix. The application of Eq. 16 to find the average value of spin along any one of the three axes X, Y and Z (and indeed along any arbitrary direction indicated by unit vector $\hat{u}$) will yield zero. We further note that the Von Neumann Entropy, which is defined as $S=-Tr(\Sigma \ln(\rho))$, is maximum for our mixed state and minimum (zero) for the coherent superposition. Given perfect knowledge of our pure state versus the equiprobable statistics of our mixture this is the expected result. We also note that the same density operator was obtained when describing the Einstein Podolsky Rosen (EPR) states in U.S. patent application Ser. No. 14/182,281 (see Eq. 18).

The density matrix becomes an especially useful tool when dealing with entangled states. Such states may include entangled states that obey either Bose-Einstein or Fermi-Dirac statistics. These types of states are not found in classical information theory, but are of great interest in quantum information theory. Using the z-basis decomposition implicitly, the two possible two-qubit states that exhibit entanglement are:

$$|\phi^{\pm}\rangle = \frac{1}{\sqrt{2}}(|-,-\rangle \pm |+,+\rangle) = \frac{1}{\sqrt{2}}(|00\rangle \pm |11\rangle),\quad \text{Eq. 17a}$$

$$|\psi^{\pm}\rangle = \frac{1}{\sqrt{2}}(|-,+\rangle \pm |+,-\rangle) = \frac{1}{\sqrt{2}}(|01\rangle \pm |10\rangle).\quad \text{Eq. 17b}$$

We use here the convention that wave functions $\phi$ denote entities that obey Bose-Einstein statistics (they are correlated). Wave functions $\psi$ denote entities that obey Fermi-Dirac statistics and are subject to the Pauli Exclusion Principle (they are anti-correlated). The latter cannot occupy the same quantum state, as evident from inspecting Eq. 17b. Maximally entangled states of Eqs. 17a & 17b are also sometimes called Bell states by those skilled in the art.

Applying unitary evolution operators to pure and to entangled states, including the maximally entangled Bell states, is at the foundation of quantum computing. In fact, quantum logic gates are implementations of exactly such operators. Therefore, the ability to translate an algorithm into a form that can be "programmed" in quantum logic is of great interest. Considerable resources have been allocated to quantum computing. The algorithm of Peter Shor for prime number factoring is one of the promising applications for such quantum logic gates when finally developed. To date the largest prime number that has been factored by adiabatic quantum computation (AQC) is 143.

Still, despite the excitement and massive resources allocated to the development of quantum computers, many challenges and open questions remain. These include the number of quantum gates that can be made to cooperate reliably in the given physical instantiation, generation of entangled states, the overall physical system and conditions under which the gates are implemented, types of gates (e.g., Hadamard gate, Pauli gates, Phase shift gates, Toffoli gate etc.), quantum error correction codes and their practical efficacy as well as many others. Early ideas in this subject can be found in Feynman, Richard P., "Simulating Physics with Computers", International Journal of Theoretical Physics 21 (6-7), pp. 467-488, 1982. Subsequent development is found in textbooks such as Nielsen, Michael A. and Chuang, Isaac L., "Quantum Computation and Quantum Information", Cambridge University Press, 2000. Finally, current literature should be consulted for the progress being made in this exciting subject.

6. Prior Art Applications of Quantum Theory to Subject States

Since the advent of quantum mechanics, many have realized that some of its non-classical features may better reflect the state of affairs at the human grade of existence. In particular, the fact that state vectors inherently encode incompatible measurement outcomes and the probabilistic nature of measurement do seem quite intuitive upon contemplation. Thus, many of the fathers of quantum mechanics did speculate on the meaning and applicability of quantum mechanics to human existence. Of course, the fact that rampant quantum decoherence above microscopic levels tends to destroy any underlying traces of coherent quantum states was never helpful. Based on the conclusion of the prior section, one can immediately surmise that such extension of quantum mechanical models in a rigorous manner during the early days of quantum mechanics could not even be legitimately contemplated.

Nevertheless, among the more notable early attempts at applying quantum techniques to characterize human states are those of C. G. Jung and Wolfgang Pauli. Although they did not meet with success, their bold move to export quantum formalisms to large scale realms without too much concern for justifying such procedures paved the way others. More recently, the textbook by physicist David Bohm, "Quantum Theory", Prentice Hall, 1979 ISBN 0-486-65969-0, pp. 169-172 also indicates a motivation for exporting quantum mechanical concepts to applications on human subjects. More specifically, Bohm speculates about employing aspects of the quantum description to characterize human thoughts and feelings.

In a review article published online by J. Summers, "Thought and the Uncertainty Principle", http://www.jason-summers.org/thought-and-the-uncertainty-principle/, 2013 the author suggests that a number of close analogies between quantum processes and our inner experience and through processes could be more than mere coincidence. The author shows that this suggestion is in line with certain thoughts on the subject expressed by Niels Bohr, one of the fathers of quantum mechanics. Bohr's suggestion involves the idea that certain key points controlling the mechanism in the brain are so sensitive and delicately balanced that they must be described in an essentially quantum-mechanical way. Still, Summers recognizes that the absence of any experimental data on these issues prevents the establishment of any formal mapping between quantum mechanics and human subject states.

The early attempts at lifting quantum mechanics from their micro-scale realm to describe human states cast new light on the already known problem with standard classical logic, typically expressed by Bayesian models. In particular, it had long been known that Bayesian models are not sufficient or even incompatible with properties observed in human decision-making. The mathematical nature of these properties, which are quite different from Bayesian probabilities, were later investigated in quantum information science by Vedral, V., "Introduction to quantum information science", New York: Oxford University Press 2006.

Taking the early attempts and more recent related motivations into account, it is perhaps not surprising that an increasing number of authors argue that the basic framework of quantum theory can be somehow extrapolated from the micro-domain to find useful applications in the cognitive domain. Some of the most notable contributions are found in: Aerts, D., Czachor, M., & D'Hooghe, B. (2005), "Do we think and communicate in quantum ways? On the presence of quantum structures in language", In N. Gontier, J. P. V. Bendegem, & D. Aerts (Eds.), Evolutionary epistemology, language and culture. Studies in language, companion series. Amsterdam: John Benjamins Publishing Company; Atmanspacher, H., Roemer, H., & Walach, H. (2002), "Weak quantum theory: Complementarity and entanglement in physics and beyond", Foundations of Physics, 32, pp. 379-406; Blutner, R. (2009), "Concepts and bounded rationality: An application of Niestegge's approach to conditional quantum probabilities", In Accardi, L. et al. (Eds.), Foundations of probability and physics-5, American institute of physics conference proceedings, New York (pp. 302-310); Busemeyer, J. R., Wang, Z., & Townsend, J. T. (2006), "Quantum dynamics of human decision-making", Journal of Mathematical Psychology, 50, pp. 220-241; Franco, R. (2007), "Quantum mechanics and rational ignorance", Arxiv preprint physics/0702163; Khrennikov, A. Y., "Quantum-like formalism for cognitive measurements", BioSystems, 2003, Vol. 70, pp. 211-233; Pothos, E. M., & Busemeyer, J. R. (2009), "A quantum probability explanation for violations of 'rational' decision theory", Proceedings of the Royal Society B: Biological Sciences, 276. Recently, Gabora, L., Rosch, E., & Aerts, D. (2008), "Toward an ecological theory of concepts", Ecological Psychology, 20, pp. 84-116 have even demonstrated how this framework can account for the creative, context-sensitive manner in which concepts are used, and they have discussed empirical data supporting their view.

An exciting direction for the application of quantum theory to the modeling of inner states of subjects was provided by the paper of R. Blutner and E. Hochnadel, "Two qubits for C. G. Jung's theory of personality", Cognitive Systems Research, Elsevier, Vol. 11, 2010, pp. 243-259. The authors propose a formalization of C. G. Jung's theory of personality using a four-dimensional Hilbert space for representation of two qubits. This approach makes a certain assumption about the relationship of the first qubit assigned to psychological functions (Thinking, Feeling, Sensing and iNtuiting) and the second qubit representing the two perspectives (Introversion and Extroversion). The mapping of the psychological functions and perspectives presumes certain relationships between incompatible observables as well as the state of entanglement between the qubits that does not appear to be borne out in practice, as admitted by the authors. Despite this insufficiency, the paper is of great value and marks an important contribution to techniques for mapping problems regarding the behaviors and states of human subjects to qubits using standard tools and models afforded by quantum mechanics.

Thus, attempts at applying quantum mechanics to phenomena involving subjects at macro-levels have been mostly unsuccessful. A main and admitted source of problems lies in the translation of quantum mechanical models to human situations. More precisely, it is not at all clear how and under what conditions to map subject states as well as subject actions or reactions to quantum states. It is not even apparent in what realms the mappings may be valid.

Finally, the prior art does not provide for a quantum informed approach to gathering data. Instead, the state of the art for development of predictive personality models based on "big data" collected on the web is ostensibly limited to classical data collection and classification approaches. Some of the most representative descriptions of these are provided by: D. Markvikj et al., "Mining Facebook Data for Predictive Personality Modeling", Association for the Advancement of Artificial Intelligence, www.aaai.org, 2013; G. Chittaranjan et al., "Who's Who with Big-Five: Analyzing and Classifying Personality Traits with Smartphones", Idiap Research Institute, 2011, pp. 1-8; B. Verhoeven et al., "Ensemble Methods for Personality Recognition", CLiPS, University of Antwerp, Association for the Advancement of Artificial Intelligence, Technical Report WS-13-01, www.aaai.org, 2013; M. Komisin et al., "Identifying Personality Types Using Document Classification Methods", Dept. of Computer Science, Proceedings of the Twenty-Fifth International Florida Artificial Intelligence Research Society Conference, 2012, pp. 232-237.

OBJECTS AND ADVANTAGES

In view of the shortcomings of the prior art, it is an object of the present invention to provide computer implemented methods and computer systems for perturbing and detecting the perturbation effects in applications of quantum representations to subject states. The methods and systems are to address perturbation to a known contextualization by a given subject of an underlying proposition about an original item. More specifically still, it is an object of the invention to test for perturbation effects on the subject whose measurable indication given the original item at the center of the underlying proposition is already known, while the perturbation effects are induced by altering the original item and presenting or exposing the subject to an altered item instead of the original item.

These and other objects and advantages of the invention will become apparent upon reading the detailed specification and reviewing the accompanying drawing figures.

SUMMARY OF THE INVENTION

The present invention relates to computer implemented methods and computer systems that are designed to perturb and detect the perturbation effects when using a quantum representation of a subject and of the contextualization the subject adopts modulo an underlying proposition that the subject is confronted with. The present methods and computer system rely on collecting measurable indications from the subject. Any subject confronted by underlying propositions is free to contextualize them, i.e., apprehend, perceive, understand or value them in different and personal ways. The kind of subject we are interested in here, is one that adopts a known contextualization and exhibits a known measurable indication in that contextualization of the underlying proposition about some known item that the underlying proposition is about.

In general, the confrontation of the subject by an underlying proposition and the subject's choice about what value to use in making sense of the underlying proposition will be referred to herein as a contextualization of the underlying proposition by that subject. Many different contextualizations of the same underlying proposition are available to a subject. Some of the available contextualizations are incompatible. These are represented by non-commuting quantum mechanical operators. Some other available contextualizations are compatible. These, on the other hand, are represented by commuting quantum mechanical operators.

The computer implemented method for perturbing a known contextualization of a given underlying proposition about an original item involves selecting a subject with the aid of a mapping module. The subject chosen uses the known contextualization and has a known measurable indication modulo the underlying proposition about the original item. The requisite prior knowledge about the subject can be obtained from on historical data, for example. The method calls for assigning a subject value matrix $PR_V$ that is used by the subject in the known contextualization. The subject value matrix $PR_S$ is assigned by an assignment module and it is a quantum mechanical operator in accordance with the quantum representation.

The method further calls for altering the original item to generate an altered item. In other words, the item at the center of the underlying proposition, or the item which the underlying proposition is about, is changed. This step introduces the perturbation.

According to the method, a collecting step is performed by a network monitoring unit that has access to information about the subject. Specifically, the network monitoring unit collects from the subject at least one altered measurable indication after the subject is exposed to the altered item. Of course, in some cases the altered measurable indication can be the same as the original or known measurable indication. This can occur when the perturbation is not sufficiently strong; e.g., the altered item is virtually identical to the original item as apprehended by the subject. In the case of a more pronounced perturbation the contextualization of the underlying proposition about the altered item is expected to start shifting.

It is duly noted that in the case of a very strong perturbation effect, the subject may fail to contextualize the underlying proposition altogether. This may occur when the subject stops considering the underlying proposition as legitimate upon perceiving the altered item. In more extreme cases still, the subject may not even apprehend the proposition at all given the altered item and may fail to even attempt to contextualize it.

A statistics module is used for detecting the perturbation effect on the known contextualization of the underlying proposition by the subject. To accomplish this, the statistics module compares the known measurable indication and the at least one altered measurable indication. It is also advantageous to use the statistics module to estimate a change in the quantum representation of the subject due to the altered item. More advantageously still, any change in the subject value matrix $PR_V$ should be detected, if possible.

Typically, the quantum representation of the subject will involve a density matrix, although in the case of reasonably pure states a state vector representation can be deployed. Advantageously, the estimating step includes presenting at least one additional proposition about the altered item and/or at least one additional proposition about the original item to the subject. This is done in order to obtain one or more additional measurable indications to help in estimating the adjusted density matrix or state vector. It is most advantageous when the additional proposition(s) is/are chosen to be incompatible with the initial proposition and/or the proposition about the altered item.

The step of altering can involve either changing the original item to derive the altered item or even replacing the original item with a new item considered here to be the altered item (in that sense it is item substitution). Altering the original item can be accomplished by making changes to the entire item, one or more of its features or attributes or morphing/changing any or all of its aspects in still some other manner. What is important is that the altering step should result in changes that are perceptible to the subject. In general, the original item can be any combination of one or more subjects, objects and experiences. Similarly, the altered item can also be any combination of one or more subjects, objects and experiences.

A computer system according to the invention is designed for perturbing the known contextualization of the underlying proposition about the original item experienced by the subject. The computer system has a mapping module for selecting the subject that uses the known contextualization and exhibits known measurable indication module the underlying proposition about the original item. The computer system is also equipped with the assignment module for assigning the subject value matrix $PR_V$ that is used by the subject in their known contextualization.

The computer system is considered to include the altered item that is to be presented to the subject. In some embodiments the computer system may even include the requisite mechanism for performing the alteration on the original item to generate the altered item. Clearly, in case the original and altered items are graphical objects that can be displayed by the computer system such deployment is very straightforward.

The computer system also has a network monitoring unit for collecting at least one measurable indication from the subject after the subject has been presented with the altered item. Furthermore, the computer system includes a statistics module for detecting the perturbation effect on the known contextualization deployed by the subject. The statistics module can detect the perturbation effect by performing a comparison of the known measurable indication when the proposition was about the original item and the at least one altered measurable indication when the proposition is about the altered item.

In a preferred embodiment, the computer system is implemented in a network. Thus the original and altered items can be conveniently presented to the subject within the network. Suitable networks include the Internet, the World Wide Web, a Wide Area Network (WAN) and a Local Area Network (LAN) as well as any other private or public networks capable of affording suitable communications channels between subjects. In fact, in the most preferred embodiment the subject is predefined with the aid of one or more social groups. For example, the subject can be a member of one or more of such social groups. Suitable social groups include Facebook, LinkedIn, Google+, MySpace, Instagram, Tumblr, YouTube and any other social group or socializing platform that aids in explicitly or implicitly segmenting its members. For example, the social group can manifest by an affiliation with one or more product sites on the network. These could be Amazon.com, Walmart.com, bestbuy.com, Groupon.com, Netflix.com, iTunes, Pandora, Spotify or any analogous product site.

The present invention, including the preferred embodiment, will now be described in detail in the below detailed description with reference to the attached drawing figures.

BRIEF DESCRIPTION OF THE DRAWING FIGURES

Figure 6A:
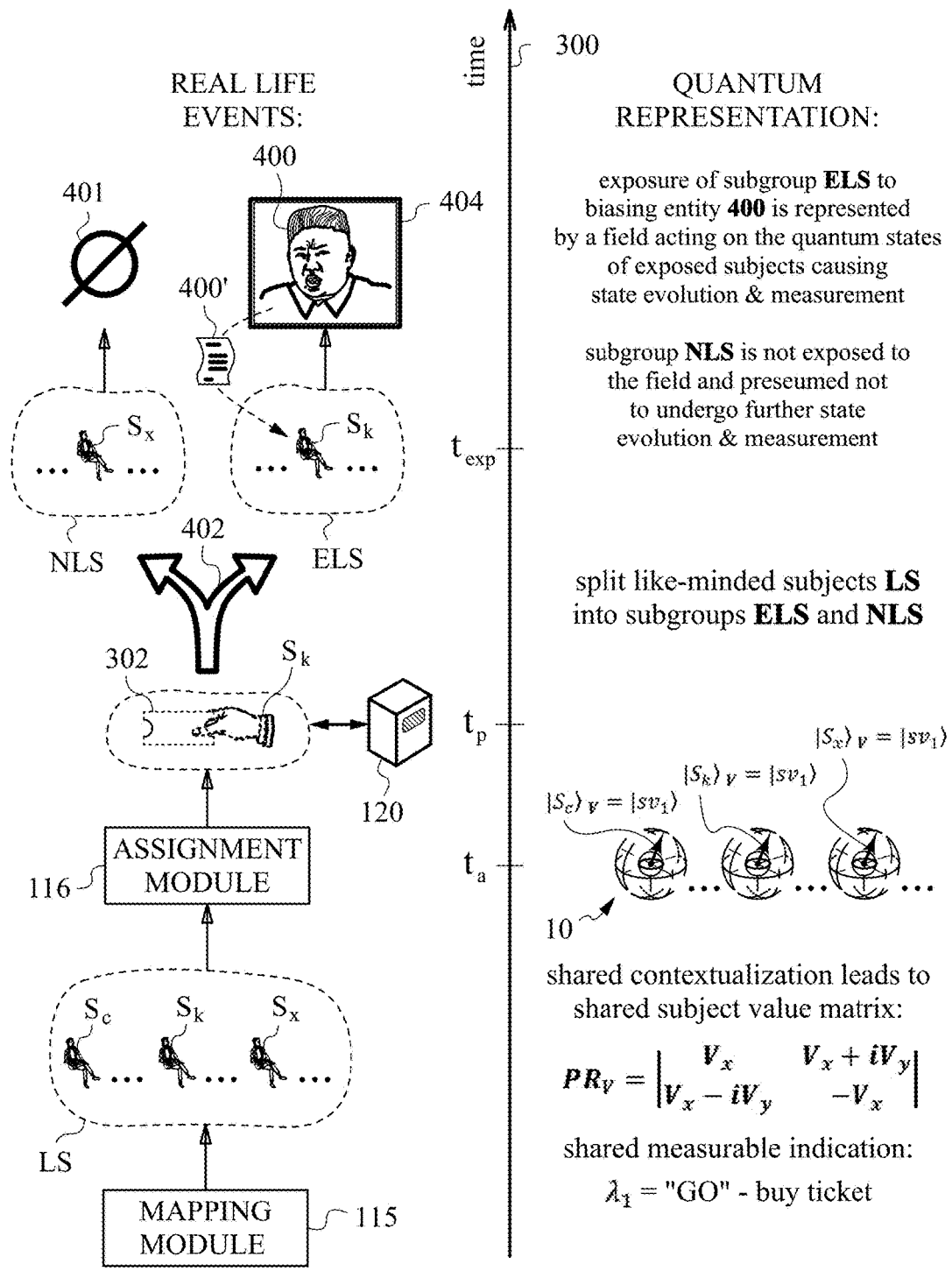
Figure 6B:
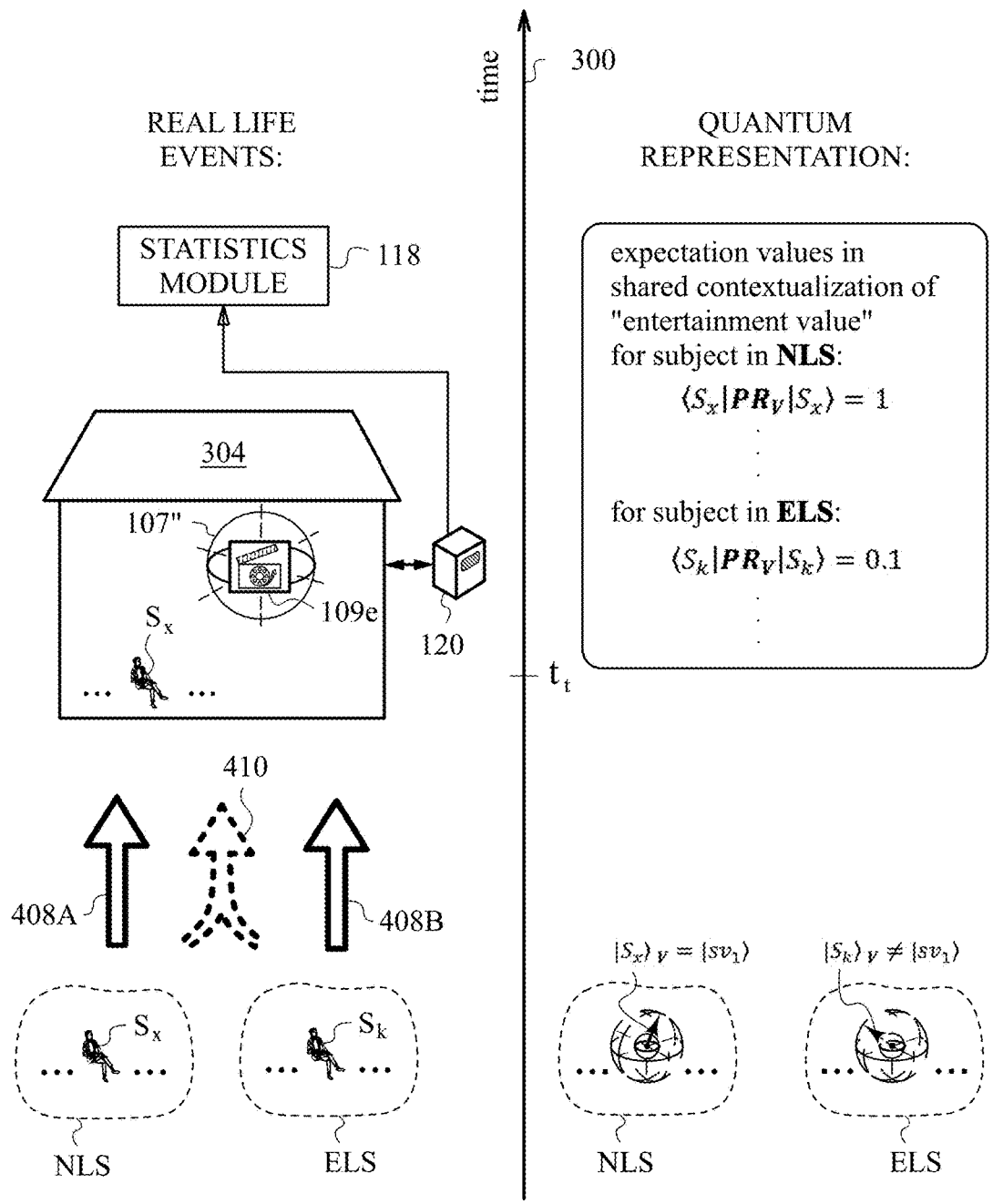

FIGS. 6A-B are diagrams illustrating real life events and their quantum representations in an embodiment for detecting the biasing effects due to a specific biasing entity.

Figure 7:
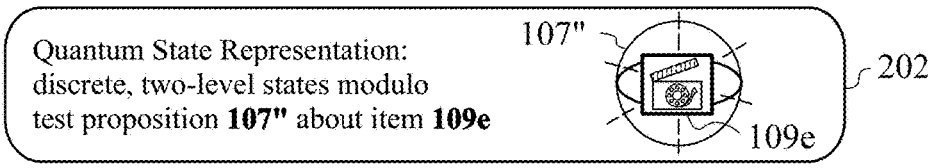
Figure 7:
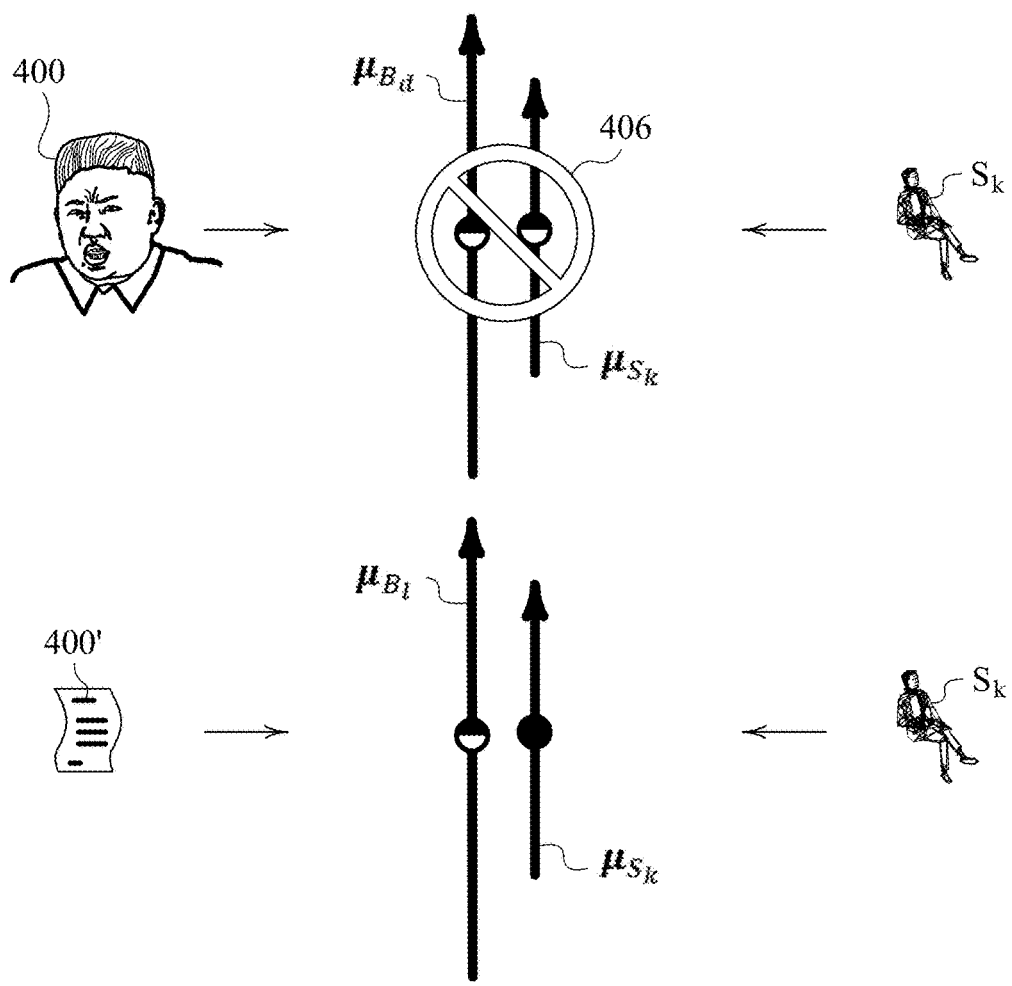

FIG. 7 is a diagram illustrating the effect of spin statistics on the biasing effects induced by the specific biasing entity.

Figure 8A:
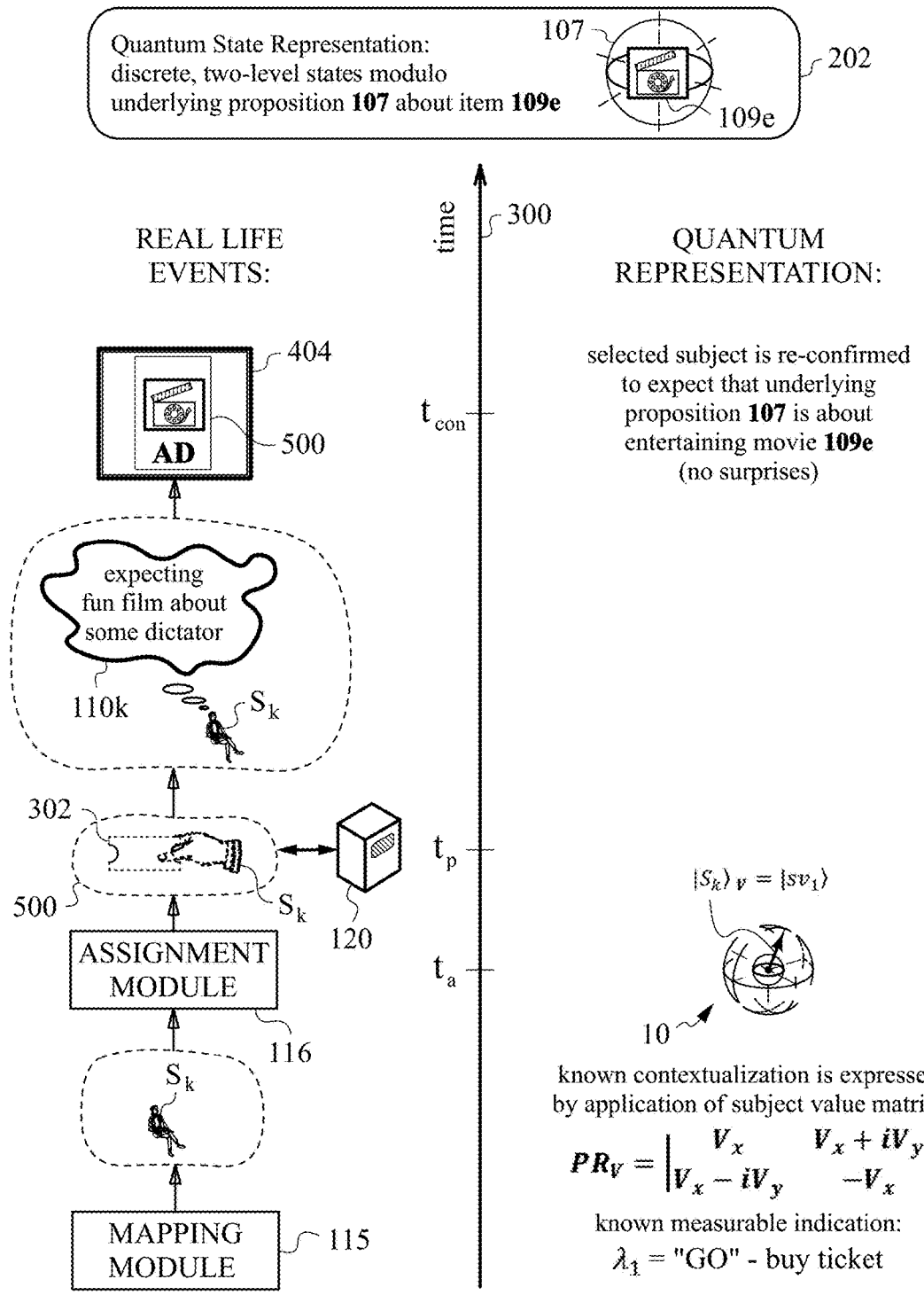
Figure 8B:
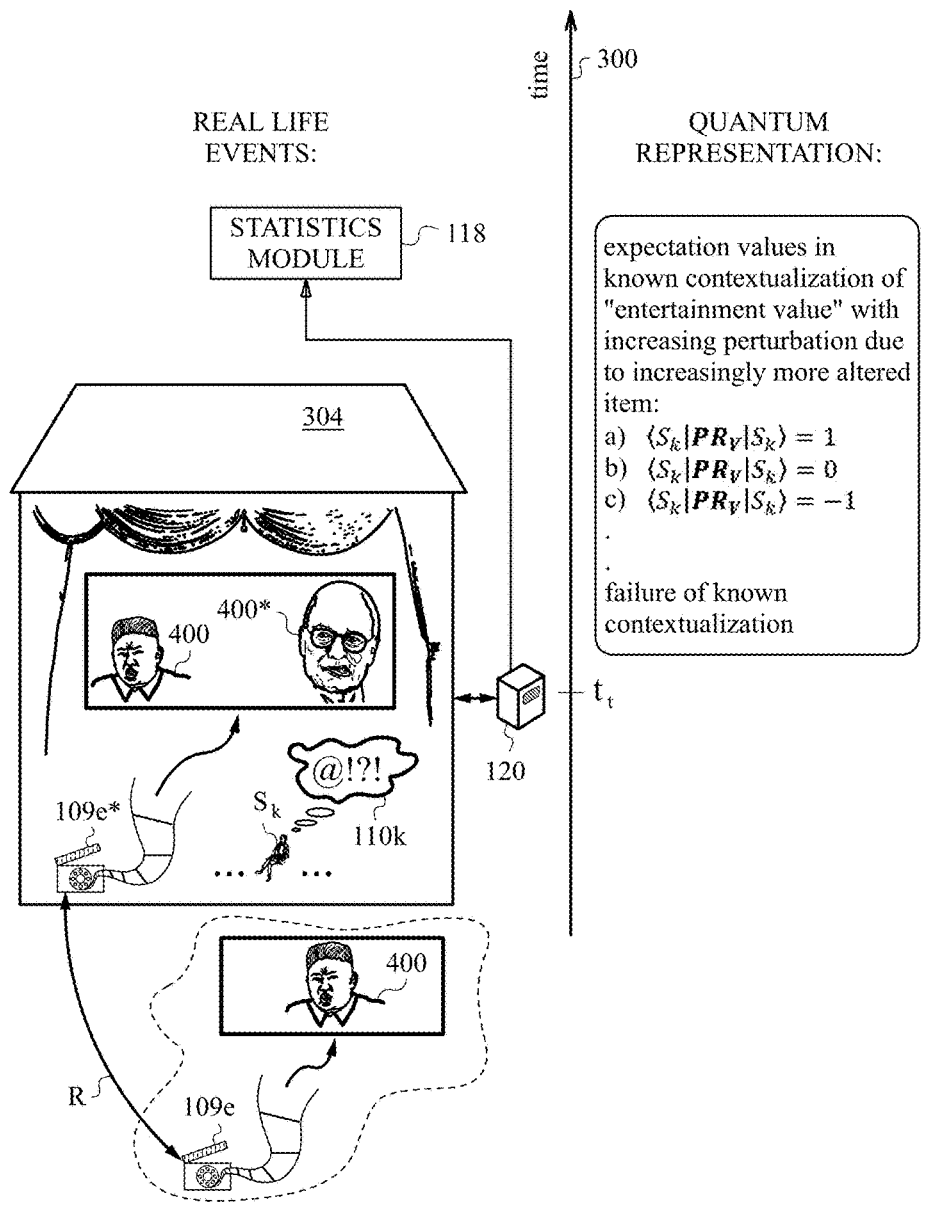

FIGS. 8A-B are diagrams illustrating real life events and their quantum representation in an embodiment for perturbing and detecting the perturbation on the contextualization of an underlying proposition due to alteration of the item about which the proposition is constructed.

DETAILED DESCRIPTION

The drawing figures and the following description relate to preferred embodiments of the present invention by way of illustration only. It should be noted that from the following discussion many alternative embodiments of the methods and systems disclosed herein will be readily recognized as viable options. These may be employed without straying from the principles of the claimed invention. Likewise, the figures depict embodiments of the present invention for purposes of illustration only.

Prior to describing the embodiments of the apparatus or computer systems and methods of the present invention it is important to articulate what this invention is not attempting to imply or teach. This invention does not take any ideological positions on the nature of the human mind or the mind of any subject that may qualify as a sentient subject or being, thus falling within the meaning of the term subject, test subject or observer as used in the present invention. This invention also does not try to answer any philosophical questions related to epistemology or ontology. The instant invention does not attempt, nor does it presume to be able to follow up on the suggestions of Niels Bohr and actually find which particular processes or mechanisms in the brain of a subject need or should be modeled with the tools of quantum mechanics. This work is also not a formalization of the theory of personality based on a correspondent quantum representation. Such formalization may someday follow, but would require a full formal motivation of the transition from Bayesian probability models to quantum mechanical ones. Formal arguments would also require a justification of the mapping between non-classical portions of subject/human emotional and thought spaces/processes and their quantum representation. The latter would include a description of the correspondent Hilbert space, including a proper basis, support, rules for unitary evolution, formal commutation and anti-commutation relations between observables as well as explanation of which aspects are subject to entanglement with each other and the environment (decoherence).

Instead, the present invention takes a highly data-driven approach to tracking selected subjects, which may herein be sometimes referred to as test subjects. The quantum states will be assigned to these subjects modulo or with respect to underlying propositions using pragmatic state vector assignments. In some implementations, the state vectors can be represented by quantum bits or qubits. In more robust approaches, the quantum representation may deploy density matrices instead of state vectors. Such transition in description will be clearly justified to those skilled in the art when the state of the subject is not reasonably pure.

The availability of "big data" that documents online life, and in particular online as well as real-life responses of subjects to various propositions including simple "yes/no" type questions, has made extremely large amounts of subject data ubiquitous. The test subjects can thus be isolated out of the large numbers of potentially available subjects based on measured data. Quantum mechanical tests require large numbers of identically or at least similarly prepared states to examine in order to ascertain any quantum effects. For the first time, these practical developments in "big data" and the capture of massive numbers of measurements permit one to apply the tools of quantum mechanics to uncover such quantum aspects of test subject behaviors or measureable indications as they manifest when confronted by underlying propositions, i.e., as a result of contextualizations. Specifically, it is finally feasible to set up a quantum mechanical model of test subject states and check for signs of quantum mechanical relationships and quantum mechanical statistics in the context of certain propositions that the test subjects perceive.

Thus, rather than postulating any a priori relationships between different states, e.g., the Jungian categories, we only assume that self-reported or otherwise obtained/derived data about test subjects and their contextualizations of underlying propositions of interest is reasonably accurate. In particular, we rely on the data to be sufficiently accurate to permit the assignment of state vectors or qubits to the test subjects. We also assume that the states suffer relatively limited perturbation and that they do not evolve quickly enough over time-frames of measurement(s) (long decoherence time) to affect the model. Additional qualifications as to the regimes or realms of validity of the model will be presented below as required.

No a priori relationships between different state vectors or qubits representing test subjects and their contextualizations of propositions is presumed. Thus, the assignment of state vectors or qubits in the present invention is performed in the most agnostic manner possible. This is done prior to testing for any complicated relationships. Preferably, the subject state assignments with respect to the underlying proposition are first tested empirically based on historical data available for the subjects. In this manner the correct set of test subjects can be isolated. Curation of relevant metrics is performed to aid in the process of discovering quantum mechanical relationships in the data. The curation step preferably includes a final review by human experts or expert curators that may have direct experience of relevant state(s) as well as well as experience(s) when confronted by the underlying propositions under investigation. Specifically, the human curator should have a "personal understanding" of the various ways in which the underlying proposition may be contextualized by the different test subjects that are being selected in accordance with the invention.

Figure 2:
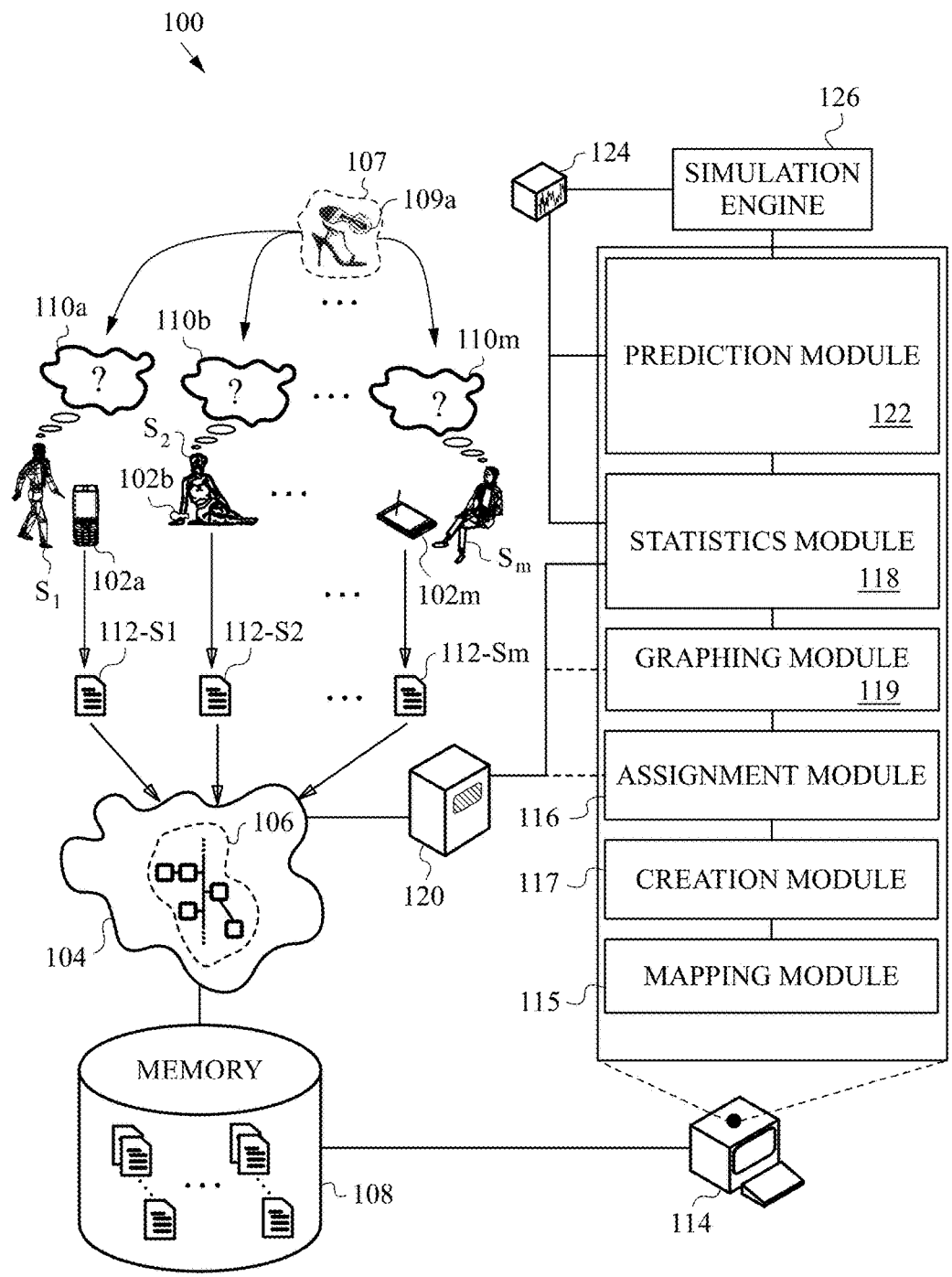
FIG. 2 is a diagram illustrating the most important parts and modules of a computer system according to the invention in a basic configuration.

Before describing the act of perturbing a subject's contextualization and detecting the effects of such perturbation it is important to review the foundations of a quantum representation on which the idea of tracking subject behaviors or, more generally, their measurable indications is based. To accomplish this we will first review a general apparatus. The main parts and modules of such an apparatus are embodied in a computer system 100 designed for tracking the behaviors of subjects is illustrated in FIG. 2. Computer system 100 is designed around a number of subjects $S_1, S_2, \ldots, S_m$. For convenience, subjects $S_1, S_2, \ldots, S_m$ will be enumerated with the aid of index i thus referring to subjects $S_i$, where i=1, 2, ..., m and m is the total number of subjects.

All subjects $S_i$ in the present embodiment are human beings. They may be selected here from a much larger group of many subjects that are not expressly shown. In the subsequent description some of these additional subjects that were not chosen will be introduced separately. In principle, subjects $S_i$ can embody any sentient beings other than humans, e.g., animals. However, the efficacy in applying the methods of invention will usually be highest when dealing with human subjects.

Subject $S_1$ has a networked device 102a, here embodied by a smartphone, to enable him or her to communicate data about them in a way that can be captured and processed. In this embodiment, smartphone 102a is connected to a network 104 that is highly efficient at capturing, classifying, sorting, and storing data as well as making it highly available. Thus, although subject $S_1$ could be known from their actions observed and reported in regular life, in the present case subject $S_1$ is known from their online presence and communications as documented on network 104.

Similarly, subject $S_2$ has a networked device 102b, embodied by a smart watch. Smart watch 102b enables subject $S_2$ to share personal data just like subject $S_1$. For this reason, watch 102b is also connected to network 104 to capture the data generated by subject $S_2$. Other subjects are similarly provisioned, with the last or m-th subject $S_m$ shown here deploying a tablet computer with a stylus as his networked device 102m. Tablet computer 102m is also connected to network 104 that captures data from subjects. The average practitioner will realize that any networked device can share some aspect of the subject's personal data. In fact, devices on the internet of things, including simple networked sensors that are carried, worn or otherwise coupled to some aspect of the subject's personal data (e.g., movement, state of health, or other physical or emotional parameter that is measurable by the networked sensor) are contemplated to belong to networked devices in the sense of the present invention.

Network 104 can be the Internet, the World Wide Web or any other wide area network (WAN) or local area network (LAN) that is private or public. Furthermore, some or all subjects $S_i$ may be members of a social group 106 that is hosted on network 104. Social group or social network 106 can include any online community such as Facebook, LinkedIn, Google+, MySpace, Instagram, Tumblr, YouTube or any number of other groups or networks in which subjects $S_i$ are active or passive participants. Additionally, documented online presence of subjects $S_i$ includes relationships with product sites such as Amazon.com, Walmart.com, bestbuy.com as well as affinity groups such as Groupon.com and even with shopping sites specialized by media type and purchasing behavior, such as Netflix.com, iTunes, Pandora and Spotify. Relationships from network 106 that is erected around an explicit social graph or friend/follower model are preferred due to the richness of relationship data that augments documented online presence of subjects $S_i$.

Computer system 100 has a memory 108 for storing measurable indications a, b that correspond to state vectors or just simply states $|S_i\rangle$ in internal spaces 110a, 110b, ..., 110j of subjects $S_i$ defined modulo an underlying proposition 107. In accordance with the present invention, measurable indications a, b are preferably chosen to be mutually exclusive indications. Mutually exclusive indications are actions, responses or still other indications that subjects $S_i$ cannot manifest simultaneously. For example, measurable indications a, b are mutually exclusive when they correspond to "YES"/"NO" type responses, choices, actions or any other measurable indications of which subjects $S_i$ can manifest just one at a time with respect to underlying proposition 107. Subjects $S_i$ also preferably report, either directly or indirectly (in indirect terms contained in their on-line communications) their measurable indications via their networked devices 102a, 102b, ..., 102j.

It should be duly noted that it is not a limitation of the quantum representation adopted herein to require that measurable indications come in pairs, such as measurable indications a, b in the present example. Measurable indications can span many values, as any person skilled in the art will recognize. It is also not a limitation that the values of such pairs exhibit discrete precipitation type; they may instead cover a continuous range. The reader is referred to the teachings contained in U.S. patent application Ser. No. 14/324,127 to review why the choice of measurable indications that precipitate as pairs of discrete values, and in particular as mutually exclusive pairs is advantageous.

In the first example, underlying proposition 107 is associated with an item that is instantiated by a specific object 109a. It is noted that specific object 109a is selected here in order to ground the rather intricate quantum-mechanical explanation to follow in a very concrete setting for purposes of better understanding and more practical teaching of the invention. Thus, underlying proposition 107 revolves around object 109a being a pair of shoes that subjects $S_i$ have been exposed to on their home log-in pages to network 104. For example, the log-in page could have been Yahoo News and shoes 109a were presented next to typical items such as Khardashians or Snookies.

The nature of any underlying proposition in the sense of the invention is that it is "about something". It is that "something that it's about" that leads to the contextualizations of the underlying proposition by subjects $S_i$ according to their frames of mind, apprehensions, conceptions, context rule(s) or, most generally put, their values. The "something that it's about" is generally one or more items that are either physical or non-physical. In the present example the item is instantiated by an object, namely shoes 109a. However, items can be any commonly perceived objects or even commonly perceived subjects or experiences.

For example, a legitimate item can be one of subjects $S_i$ from the point of view of any other subject. Still another permissible type or category of items includes non-physical or experiential goods such as commonly perceived experiences. The experience of watching a movie, flying a kite, meeting a subject, driving a car and so on are therefore legitimate items. It is important, however, that qualifying items be commonly perceived by subjects $S_i$.

By commonly perceived we specifically do not mean that they are contextualized according to the same value by all subjects $S_i$. Instead, commonly as used herein means that at least in principle all subjects $S_i$ are capable of apprehending the underlying proposition about the item in question. For example, if the item is the experiential good of driving a car, then it is a commonly perceived item for virtually all subjects $S_i$ that live in developed countries. On the other hand, if the experiential good is a religious conversion to a specific deity then, most likely, only subjects $S_i$ that belong to that religious group commonly perceive that item. It is on this common perceptual basis that inclusion of just any subjects in general for the purpose of tracking is usually not productive. For this reason, it is advantageous to carefully select or vet subjects $S_i$ that are known to commonly perceive the item(s) that are used in formulating the underlying proposition(s) before commencing any tracking, testing and/or simulating activities.

The term contextualization will be used herein to denote a process. It is the process that commences with a subject being exposed to or confronted with an underlying proposition. The subject is free to apprehend, perceive, understand, evaluate and/or value in any of the number of personal ways that the subject can select. This confrontation of any subject including the subjects we are interested in by the underlying proposition as well as that subject's choice about how or in accordance with what value to make sense of the underlying proposition will be referred to herein as a contextualization of the underlying proposition by that subject.

Typically, many different contextualizations of the same underlying proposition are available to any one of subjects $S_i$. Some of the available contextualizations are incompatible. These will later be represented by non-commuting quantum mechanical operators introduced by the quantum representation according to the invention. Some other available contextualizations are compatible. These, on the other hand, will later be represented by commuting quantum mechanical operators. Note that in some cases we may refer to the propositions as being incompatible. The reason for this ambiguity in the use of language is that quantum mechanics is rather difficult to translate directly into human language without any ambiguities. In fact, the Uncertainty Principle that we are invoking is the very definition of ambiguity of frame choice or "how to understand" or "how to take" a given proposition. Nevertheless, when referring to incompatible contextualizations, apprehensions, frames of mind, propositions, and more generally values, which is our preferred term whenever possible, we do mean that the quantum mechanical operators associated with these will be non-commuting rather than commuting. By the term non-commuting we mean that the commutator between these quantum mechanical operators is non-zero.

One of the main aspects of the present invention relates to enabling computer system 100 to track the behaviors of subjects $S_i$ that are generated in response to contextualizations. We are interested in behaviors generated irrespective of the type of contextualizations actually experienced by subjects. More precisely still, system 100 is designed to track measurable indications a, b that include any type of behavior, action, response or any other indication that can be measured or reported within the framework set up by computer system 100. From the point of view of the quantum representation, measurable indications are measurements. Measurements are the real-valued results that manifest or emerge as fact in response to quantum measurement. The nature of measurable indications generated as a result of contextualizations of underlying proposition 107 by subjects $S_i$ will be discussed in much more detail below.

In the present embodiment, measurable indications a, b are captured in data files 112-S1, 112-S2, . . . , 112-Sm that are generated by subjects $S_1, S_2, \ldots, S_m$. Conveniently, following socially acceptable standards, data files 112-S1, 112-S2, . . . , 112-Sm are shared by subjects $S_i$ with network 104 by transmission via their respective networked devices 102a, 102b, . . . , 102m. Network 104 either delivers data files 112-S1, 112-S2, . . . , 112-Sm to any authorized network requestor or channels it to memory 108 for archiving and/or later use. Memory 108 can be a mass storage device for archiving all activities on network 104, or a dedicated device of smaller capacity for tracking just the activities of some subjects of which subjects $S_i$ are a subset.

It should be pointed out that in principle any method or manner of obtaining the chosen measurable indications, i.e., either a or b, from subjects $S_i$ is acceptable. Thus, the measurable indications can be produced in response to direct questions posed to subjects $S_i$, a "push" of prompting message(s), or externally unprovoked self-reports that are conscious or even unconscious (e.g., when deploying a personal sensor as the networked device that reports on some body parameter such as, for example, heartbeat). Preferably, however, the measurable indications are delivered in data files 112-S1, 112-S2, . . . , 112-Sm generated by subjects $S_i$. This mode enables efficient collection, classification, sorting as well as reliable storage and retrieval from memory 108 of computer system 100. The advantage of the modern connected world is that large quantities of self-reported measurable indications of states $|S_i\rangle$ in internal spaces 110a, 110b, . . . , 110j are generated by subjects $S_i$ and shared, frequently even in real time, with network 104. This represents a massive improvement in terms of data collection time, data freshness and, of course, sheer quantity of reported data.

Subjects $S_i$ can either be aware or not aware of their respective measurable indications. For example, data files 112-S1, 112-S2, . . . , 112-Sm of subjects $S_i$ reporting of their responses, actions or other indications can be shared among subjects $S_i$ such that everyone is informed. This may happen upon request, e.g., because subjects $S_i$ are fiends in social network 106 and may have elected to be appraised of their friends' responses, actions and other indications such as parameters of their well-being (e.g., those measured by personal sensors mentioned above), or it may be unsolicited. The nature of the communications broadcasting the choices can be one-to-one, one-to-many or many-to-many.

In principle, any mode of communication between subjects $S_i$ is permissible including blind, one-directional transmission. For this reason, in the present situation any given subject can be referred to as the transmitting subject and another subject can be referred to as the receiving subject to more clearly indicate the direction of communication in any particular case. Note that broadcasts of responses, actions or other measurable indications from the subjects need not be carried via network 104 at all. They may occur via any medium, e.g., during a physical encounter between transmitting and receiving subjects or by the mere act of one subject observing the chosen response, action or other measurable indication of another subject. Indeed, as mentioned above, the method of the invention can be practiced in situations where no inter-subject communications take place at all and all subjects $S_i$ merely report their measurable indications via network 104.

When inter-subject communications takes place, the exposure of receiving subjects to broadcasts of transmitting subjects carrying any type of information about the transmitter's choice of measurable indication vis-à-vis underlying proposition 107 may take place online or offline (e.g., in real life). Preferably, however, all broadcasts are carried via network 104 or even within social network 106, if all transmitting and receiving subjects $S_i$ are members of network 106.

Computer system 100 is equipped with a separate computer or processor 114 for making a number of crucial assignments based on measurable indications a, b contained in data files 112-S1, 112-S2, . . . , 112-Sm of subjects $S_j$. For this reason, computer 114 is either connected to network 104 directly, or, preferably, it is connected to memory 108 from where it can retrieve data files 112-S1, 112-S2, . . . , 112-Sm at its own convenience. It is noted that the quantum representation underlying the present invention will perform best when large amounts of data are available. Therefore, it is preferred that computer 114 leave the task of storing and organizing data files 112-S1, 112-S2, . . . , 112-Sm as well as any relevant data files from other subjects to the resources of network 104 and memory 108, rather than deploying its own resources for this job.

Computer 114 has a mapping module 115 for finding an internal space or a values space that is shared by subjects $S_j$. Module 115 can be embodied by a simple non-quantum unit that compares records from network 104 and/or social network 106 to ascertain that subjects $S_i$ are friends or otherwise in some relationship to one another. Based on this relationship and/or just propositions over which subjects $S_j$ have interacted in the past, mapping module 115 can find the shared or common internal space that will henceforth be referred to herein as community values space. It is important that mapping module 115 confirm that the community values space is shared modulo underlying proposition 107 in particular.

The community values space corresponds to a regime or realm of shared excitements, interests, proclivities, beliefs, likes, dislikes and/or opinions over various items represented, among other, by objects, subjects or experiences (e.g., activities). For the sake of a simple example, all subjects $S_j$ that are candidates for the subset which can be considered as a group or community can be interested in shoes, sports, coffee, car racing, movies, dating and making money. In most practical applications, however, it will be sufficient to confirm that subjects $S_i$ are aware of the same items. This means that they perceive these items in the group or community values space common to the subset/group/community of subjects $S_j$. Of course, that certainly does not mean that all subjects $S_i$ will or are even likely to contextualize the underlying propositions about the items of which they are all aware in the same way. The meaning of this last statement will be explained in much more detail below.

Computer 114 is equipped with a creation module 117 that is connected to mapping module 115. Creation module 117 is designed for positing the selected subjects $S_i$ that belong to a group or community by virtue of sharing a community values space modulo proposition 107. The action of positing is connected with the quantum mechanical action associated with the application of creation operators. Also, annihilation operators are used for un-positing or removing subjects $S_i$ from consideration.

The creation and annihilation aspects of the operation of creation module 117 are required for formal positing of the state vectors (and in more robust representations of the density matrices) corresponding to quantized entities. These steps depend on whether the entity obeys the Fermi-Dirac anti-consensus statistics (F-D statistics) or the Bose-Einstein consensus statistics (B-E statistics) as well as several other considerations due to the quantum mechanical representation. All of these aspects have been previously described in detail in U.S. patent application Ser. No. 14/324,127. They will be reviewed here to the extent required to contextualize the present invention.

Further, computer 114 has an assignment module 116 that is connected to creation module 117. Assignment module 116 is designed for the task of making certain assignments based on the quantum representations adopted by the instant invention. More precisely, assignment module is tasked with assigning to each one of the selected subjects $S_i$ discovered by mapping module 115 and posited by creation module 117 a subject state $|S_i\rangle$. All assigned subject states $|S_i\rangle$ reside in a group or community state space $\mathcal{H}^{(c)}$, which is the Hilbert space associated with the community values space.

Assignment module 116 is indicated as residing in computer 114, but in many embodiments it can be located in a separate processing unit altogether. This is mainly due to the nature of the assignments being made and the processing required. More precisely, assignments related to quantum mechanical representations are very computationally intensive for central processing units (CPUs) of regular computers. In many cases, units with graphic processing units (GPUs) are more suitable for implementing the linear algebra instructions associated with assignments dictated by the quantum model that assignment module 116 has to effectuate.

Computer system 100 has a graphing module 119 connected to assignment module 116. Computer 114 deploys graphing module 119 for placing subject states $|S_i\rangle$, as assigned by assignment module 116, on a graph or any construct that encodes the interconnections that exist between subjects $S_i$. In cases where the interconnections are tenuous, uncertain or even unknown, graphing module 119 may place subject states $|S_i\rangle$ in a disconnected context (i.e., on nodes/vertices without any connecting edges). Lack of interconnections indicates no inter-subject communications.

In cases where interconnections are known, e.g., from a social graph that interconnects subjects $S_i$, graphing module 119 places subject states $|S_i\rangle$ of subject states $S_i$ at the corresponded nodes or vertices of the social graph. In general, however, the mapping as understood herein reaches beyond the concept of one subject per vertex in a social graph setting—in this larger context the mapping is understood to be a surjective mapping. In other words, the mapping is onto the graph but not typically one-to-one. Graphs as defined herein include any type of structures that include interconnections, e.g., links or edges, between entities that may be related to one or more vertices, nodes or points. For example, the graph may be a social graph, a tree graph, a general interconnected diagram or chart (also see graph theory and category theory). In some embodiments described herein the chosen graph corresponds to a physical system, such as a lattice or other less-organized structures such as spin-glass. Various aspects of the graphing or mapping process including adjustments and simplifications (e.g., pruning) have been previously discussed in U.S. patent application Ser. No. 14/324,127. Therefore, only the aspects of graphing most relevant to the present invention and the below examples will be discussed herein.

Computer 114 also has a statistics module 118 connected to graphing module 119. Statistics module 118 is designed for estimating various fundamental quantum parameters of the graph model that lead to classical probabilities and/or large-scale phenomena and behaviors. In some embodiments statistics module 118 also estimates or computes classical probabilities. Most importantly, however, statistics module 118 estimates a degree of incompatibility between the values according to which subjects $S_i$ contextualize underlying propositions of interest in the social values space or rather in its quantum equivalent—community state space $\mathcal{H}^{(c)}$.

Computer 114 is further provisioned with a prediction module 122 that is in turn connected to statistics module 118. The quantum interactions between the various quantum states $|S_i\rangle$ imported onto the graph by graphing module 119 are used by prediction module 122 for predicting subject states $|S_i\rangle$ about underlying proposition 107. Prediction module 122 is connected to statistics module 118 in order to receive the estimated probabilities and value information. Of course, it also receives as input the data generated and prepared by the previous modules, including data about the graph generated by graphing module 119 based on still prior inputs from assignment module 116, creation module 117 and mapping module 115.

Prediction module 122 can reside in computer 114, as shown in this embodiment or it can be a separate unit. For reasons analogous to those affecting assignment module 116, prediction module 122 can benefit from being implemented in a GPU with associated hardware well known to those skilled in the art.

Computer system 100 has a network monitoring unit 120. Unit 120 monitors and tracks at the very least the network behaviors and communications of subjects $S_i$ in the identified group or community. Network monitoring unit 120 preferably monitors entire network 104 including members of specific social groups 106. When specific subjects $S_i$ are selected for tracking and for any subsequent model, simulation and/or prediction, they thus fall into a subset of all subjects tracked by monitoring unit 120. To be effective, unit 120 is preferably equipped with wire-rate data interception capabilities for rapid ingestion and processing. This enables unit 120 to capture and process data from data files 112 of large numbers of subjects connected to network 104 and discern large-scale patterns in nearly real-time.

Statistics module 118 is connected to network monitoring unit 120 to obtain from it behavior information for maintaining up-to-date its classical event probabilities as well as quantum parameters, especially including subject contextualizations. It is duly noted, that computer 104 can gather relevant information about the subjects on its own from archived data files 112 in memory 108. This approach is not preferred, however, due to concerns about data freshness and the additional computational burden placed on computer 104.

Computer system 100 has a random event mechanism 124 connected to both statistics module 118 and prediction module 122. From those modules, random event mechanism can be seeded with certain estimated quantum parameters as well as other statistical information, including classical probabilities to randomly generate events on the graph in accordance with those probabilities and statistical information. Advantageously, random event mechanism 124 is further connected to a simulation engine 126 to supply it with input data. In the present embodiment simulation engine 126 is also connected to prediction module 122 to be properly initialized in advance of any simulation runs. The output of simulation engine 126 can be delivered to other useful apparatus where it can serve as input to secondary applications such as large-scale tracking, modeling, simulation and/or prediction mechanisms for social or commercial purposes or to market analysis tools and online sales engines. Furthermore, simulation engine 126 is also connected to network monitoring unit 120 in this embodiment in order to aid unit 120 in its task of discerning patterns affecting subjects $S_i$ (as well as other subjects, as may be required) based on data passing through network 104.

Figure 3A:
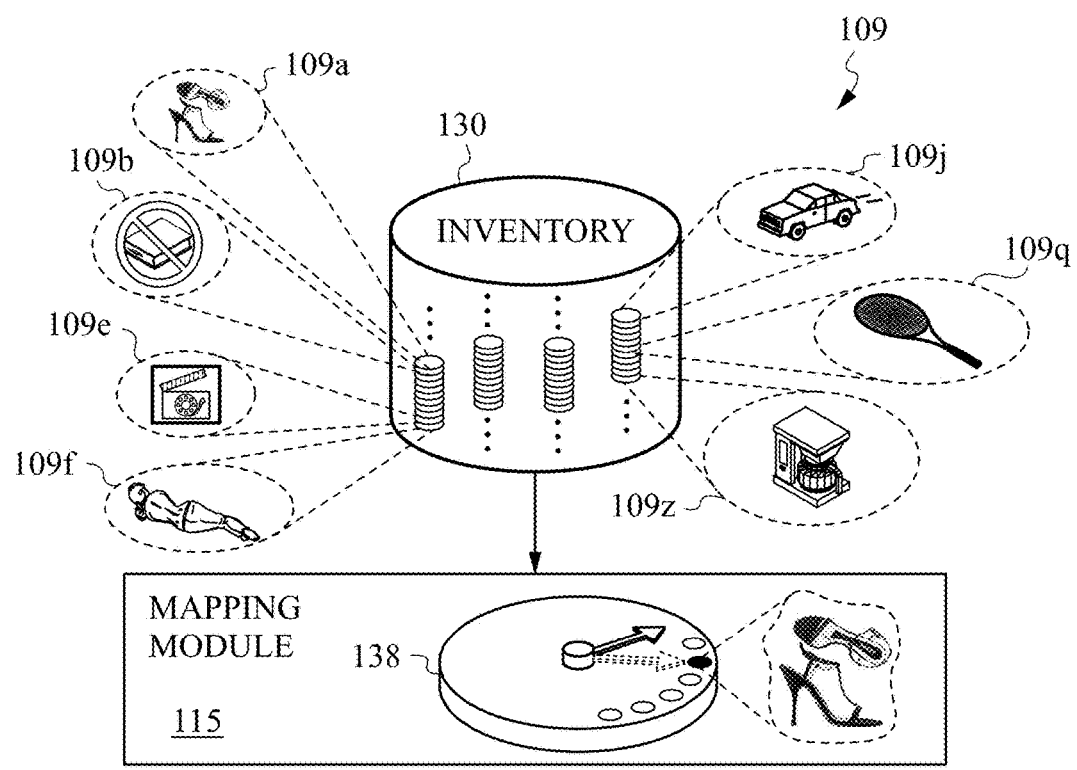
FIG. 3A is a diagram showing in more detail the mapping module of the computer system from FIG. 2 and the inventory store of relevant items.

We will now examine the operation of computer system 100 in incremental steps guided by the functions performed by the modules introduced in FIG. 2 and any requisite secondary resources. Our starting point is mapping module 115 in conjunction with an inventory store 130 to which it is connected as shown in FIG. 3A. Computer system 100 is designed to work with many underlying propositions 107 about different items 109. In other words, item 109a that is an object instantiated by the pair of shoes depicted in FIG. 2 is merely one exemplary object that is used for the purpose of a more clear and practical explanation of the present invention.

Meanwhile, inventory store 130 contains a large number of eligible items. As understood herein, items 109 include objects, subjects, experiences (aka experiential goods) and any other items that subjects $S_i$ can contextualize in their minds to yield underlying proposition 107. Preferably, a human curator familiar with human experience and specifically with the lives and cognitive expectations of subjects under consideration should review the final inventory of items 109. The curator should not include among items 109 any that do not register any response, i.e., those generating a null response among the subjects. Responses obtained in a context that is not of interest may be considered as mis-contextualized and the item that provokes them should be left out if their consideration is outside the scope of tracking. All null responses and mis-contextualizations should preferably be confirmed by prior encounters with the potentially irrelevant item by subjects $S_i$. The curator may be able to further understand the reasons for irrelevance and mis-contextualization to thus rule out the specific item from inventory store 130.

For example, a specific item 109b embodied by a book about ordinary and partial differential equations is shown as being deselected in FIG. 3A. The elimination of book 109b is affirmed by the human curator, who understands the human reasons for the book's lack of appeal. In the case at hand, all subjects reporting on network 104 are members of a group that does not consider the language of mathematics relevant to their lives. Thus, most of the time that book 109b is encountered by the subjects it evokes a null response as they are unlikely to register its existence. The possible exception is in the case of unanticipated contextualization, e.g., as a "heavy object" for purposes of "weighing something down". If the prediction does not want to take into account such mis-contextualization then book 109b should be left out. If, on the other hand, contextualization of textbooks as heavy objects were of interest in tracking, then book 109b should be kept in inventory store 130.

It is also possible to supplement or, under some circumstances even replace the vetting of items 109 by a human curator with a cross-check deploying network monitoring unit 120. That is because monitoring unit 120 is in charge of reviewing all data files 112 to track and monitor communications and behaviors of all subjects on network 104.

Hence, it possesses the necessary information to at the very least supplement human insights about reactions to items 109 and their most common contextualizations. For example, despite the intuition of the human curator book 109b could have provoked a reaction and anticipated contextualization, e.g., as a study resource, by at least a few subjects. Such findings would be discovered by network monitoring unit 120 in reviewing data files 112. These findings should override the human curator's judgment in a purely data-driven approach to tracking. Such pragmatism is indeed recommended in the preferred embodiments of the present invention to ensure discovery of quantum effects and derivation of correspondent practical benefits from these findings.

After vetting by the human curator and corroboration by network monitoring unit 120, inventory store 130 will contain all items of interest to the subjects and presenting to them in contextualizations that are within the scope of tracking. For example, items 109a, 109q and 109z from store 130 all fall into the category of objects embodied here by shoes, a tennis racket and a coffee maker. A subject 109f embodied by a possible romantic interest to one or more subjects $S_i$ to be confronted by proposition 107 is also shown. Further, store 130 contains many experiential goods of which two are shown. These are experiences 109e, 109j embodied by watching a movie and taking a ride in a sports car, respectively. Numerous other objects, subjects and experiences are kept within store 130 for building different types of underlying propositions 107.

In order to follow the next steps with reference to a concrete example to help ground the explanation, we consider shoes 109a that were chosen by mapping module 115 from among all vetted items 109 in inventory store 130. To make the choice module 115 has a selection mechanism 138. Mechanism 138 is any suitable apparatus for performing the selection among items 109 in store 130. It is noted that selection mechanism 138 can either be fully computer-implemented for picking items 109 in accordance with a computerized schedule or it can include an input mechanism that responds to human input. In other words, mechanism 138 can support automatic or human-initiated selection of items 109 for tracking of contextualizations under the quantum representation of the present invention.

Figure 3B:
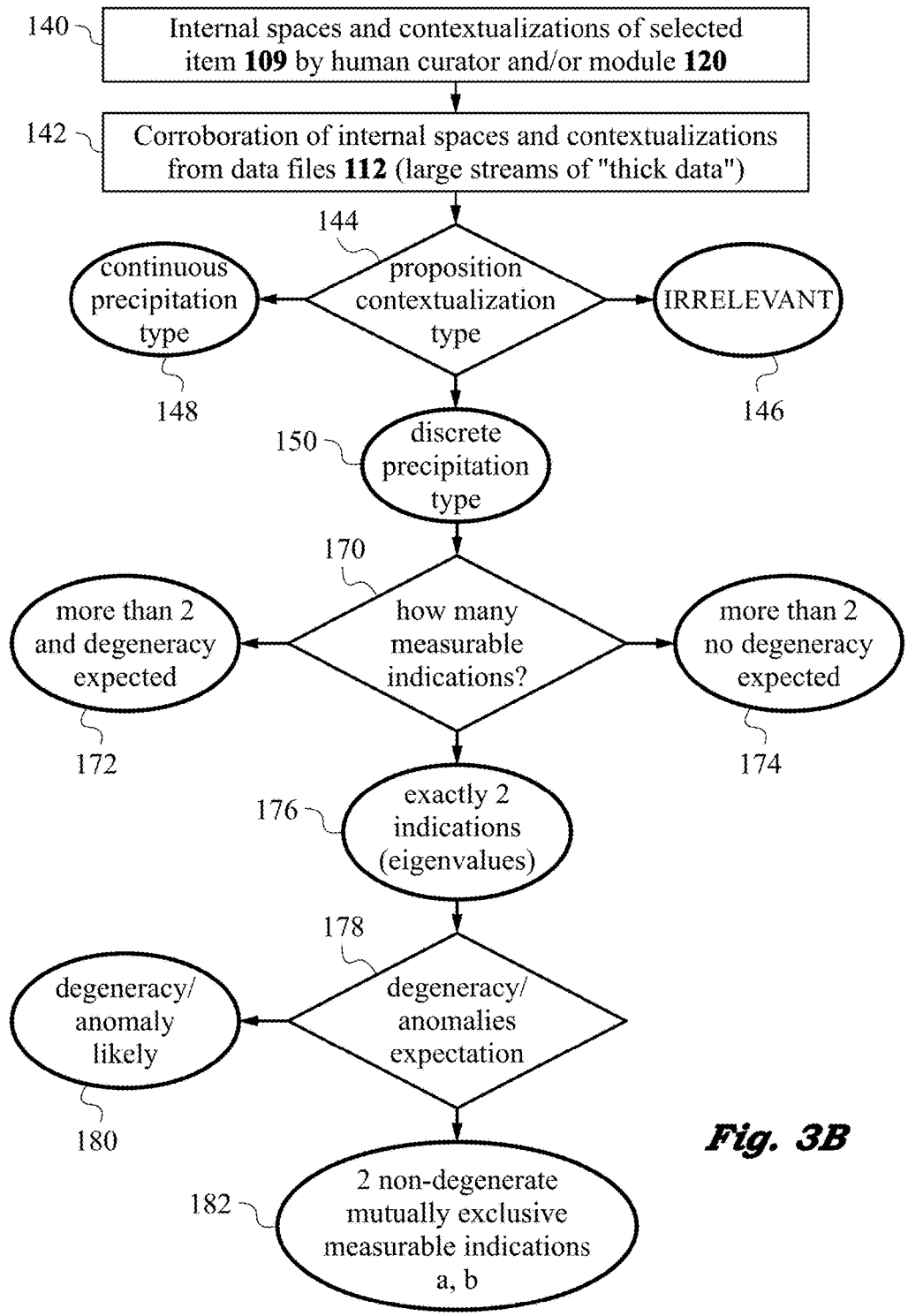
FIG. 3B is a flow diagram of several initial steps performed by the mapping module to generate a quantum representation.

FIG. 3B illustrates the steps performed by mapping module 115 in further examining the internal spaces 110a, 110b, ..., 110m of subjects $S_i$ and their contextualizations. More precisely, mapping module 115 takes the first formal steps to treating these concepts in accordance with a quantum representation as adopted herein. Any specific quantum representation will apply in the community values space postulated to exist between subjects $S_i$. It should be remarked here that all steps performed to arrive at a quantum representation of subjects $S_i$ in their contextualizations of the underlying propositions about the item also apply to obtaining a quantum representation of any additional or separate subject(s). Such subject(s) may or may not share the same community values space but may nonetheless be of interest.

In a first step 140, mapping module 115 selects item 109 and presumes that item 109 registers in the community values space. The observed contextualizations of item 109 as found by network monitoring module 120 and/or the human curator are also imported by mapping module 115. Obtaining a large amount of data at this pre-tracking or calibration stage is very advantageous.

In a second step 142, mapping module 115 corroborates the existence of the overall internal space, namely community values space and of the contextualizations by cross-checking data files 112. In performing step 142, mapping module 115 typically accesses memory 108 and archived data files 112. This allows mapping module 115 to look over "thick data", i.e., data files 112 that present a historically large stream of information that relates to item 109. In this manner the relevance of item 109 and hence its registration specifically in internal spaces 110a, 110b, ..., 110m belonging to the select subjects $S_i$ forming the presumptive community or group can be further ascertained and more carefully quantified. For example, a number of occurrences of a response, a reference to or an action involving item 109 over time is counted. At this point, if item 109 has an ephemeral existence in the minds of the subjects then mapping module 115 could provide that information to the human user. Should prediction of fads not be of interest for the prediction or simulation, then the human user of computer system 100 could stop the process and induce the choice of a different item 109.

Assuming that item 109 remains of interest, then mapping module 115 proceeds to step three 144. Step 144 is important from the point of view of the quantum representation as it relates to the type of contextualization of underlying proposition 107 about item 109 by subjects $S_i$. We consider two precipitation types and a null result or "IRRELEVANT" designated by 146. Of course, the careful reader will have noticed that items 109 that induce a null response encoded here by "IRRELEVANT" 146 were previously eliminated. However, since step 144 determines the precipitation for each subject concerned, and some of the subjects may not register item 109 despite the fact that a large number of their peers do, it is necessary to retain the option of null outcome 146 in step 144.

The first precipitation type being considered herein is a continuous precipitation type 148. The second type is a discrete precipitation type 150. Although continuous precipitation type 148 certainly admits of a quantum representation and has been discussed in more detail in U.S. patent application Ser. No. 14/324,127 we will focus on discrete precipitation type 150 in the present discussion. That is because despite the fact that continuous precipitation type 148 can be used in apparatus and methods of the invention, it is more difficult to model it with graphs and the mathematical formalism is more involved. Furthermore, such continuous precipitation type 148 does not typically yield clearly discernible, mutually exclusive responses by subjects in their contextualizations (e.g., modulo underlying proposition 107 about shoes 109a in the present example). In other words, in the case of shoes 109a as an example, continuous precipitation type 148 in the contextualization of say "LIKE" could yield a wide spread in the degree of liking of shoes 109a for a multitude of reasons and considerations. Of course, a skilled artisan will be able to adopt the present teachings to continuous cases using standard tools known in the art.

In preferred embodiments of the invention we seek simple precipitation types corresponding to simple contextualizations of underlying proposition 107. In other words, we seek to confirm the community or group of subjects $S_i$ in whose minds or internal spaces 110a, 110b, ..., 110m proposition 107 about shoes 109a induces discrete precipitation type 150. This precipitation type should apply individually to each subject making up such a group or community. Of course, subjects embedded in their normal lives cannot be tested for precipitation type entirely outside the context they inhabit. Some error may thus be present in the assessment of precipitation type for each subject. To the extent possible, such error can be kept low by reviewing previous precipitation types the subject under review exhibited with respect to similar propositions and ideally similar propositions about the same item. Further, a review of precipitation type by the human curator is advantageous to corroborate precipitation type.

It is further preferred that the contextualization be just in terms of a few mutually exclusive states and correspondent mutually exclusive responses or, more generally measurable indications that the subject can exhibit. Most preferably, the contextualization of underlying proposition 107 corresponds to discrete precipitation type 150 that manifests only two orthogonal internal states and associated mutually exclusive responses such as "YES" and "NO". In fact, for most of the present application we will be concerned with exactly such cases for reasons of clarity of explanation. Once again, review by the human curator is highly desirable in estimating the number of internal states.

Additionally, discrete precipitation type 150 into just two orthogonal states associated with two distinct eigenvalues corresponds to the physical example of spinors that we have already explored in the background section. Many mathematical and applied physics tools have been developed over the past decades to handle these entities. Thus, although more complex precipitation types and numerous orthogonal states can certainly be handled by the tools available to those skilled in the art (see, e.g., references on working in the energy or Hamiltonian eigen-basis of general systems), cases where subjects' internal states are mapped to two-level quantum systems are by far the most efficient. Also, two-level systems tend to keep the computational burden on computer system 100 within a reasonable range and do not require excessively large amounts of data files 112 to set up in practice. Two-level systems will also tend to keep the computational burden low even when the more robust descriptions of subject states in terms of correspondent density matrices have to be implemented.

For the above reasons we now continue with the case of discrete precipitation type 150 modulo proposition 107 about shoes 109a admitting of only discrete and orthogonal eigenstates. In other words, internal states $|S_i\rangle$ residing in internal spaces 110a, 110b, ..., 110m decompose into superpositions of these few discrete and orthogonal eigenstates.

In this most preferred case, discrete precipitation type 150 induces subjects $S_i$ to contextualize underlying proposition 107 about shoes 109a in terms of just two mutually exclusive states manifesting in mutually exclusive responses such as "YES" and "NO". Thus, the manner in which subjects $S_i$ contextualize proposition 107 in this preferred two-level form can be mapped to quantum-mechanically well-understood entities such as simple spinors or qubits. However, before proceeding to the next step performed by mapping module 115 with subjects $S_i$ that do fall into the above preferred discrete precipitation type 150 with two eigenstates and two eigenvalues, it is important to ensure proper quantum behavior of the assigned states $|S_i\rangle$ in common values space replaced at this point by community state space $\mathcal{H}^{(c)}$, as will be appreciated by one skilled in the art.

We now turn our attention to step 170 in which mapping module 115 confirms the number of measurable indications or eigenvalues associated with discrete precipitation type 150 to be two (2), as selected for the most preferred case. We should briefly remark on the other possibilities that we are not discussing in detail. In case 172 more than two eigenvalues are expected and some of them are associated with different state vectors. This is a classic case of a quantum mechanical system with degeneracy. In other words, the system has several linearly independent state vectors that have the same eigenvalues or measurable indications. Those skilled in the art will recognize that this typical situation is encountered often when working in the "energy-basis" dictated by the Hamiltonian.

In case 174 more than two eigenvalues are expected and all of them are associated with different state vectors. Such systems can correspond to more complicated quantum entities including spin systems with more than two possible projections along the axis on which they precipitate (e.g., total spin 1 systems). Quantum mechanical systems that are more than two-level but non-degenerate are normally easier to track than systems with degeneracy. Those skilled in the art will recognize that cases 172 and 174 can be treated with available tools.

In the preferred embodiment of the instant invention, however, we concentrate on case 176 selected in step 170 in which there are only two eigenvalues or two measurable indications. In other words, we prefer to base the apparatus and methods of invention on the two-level system. As mentioned above, it is desirable for the human curator that understands subjects $S_i$ to review these findings to limit possible errors due to misjudgment of whether the precipitation is non-degenerate and really two-level. This is preferably done by reviewing historical data of subject responses, actions and any indications available (e.g., from data files 112 archived in memory 108) that are used by mapping module 115 in making the determinations. We thus arrive at a corroborated selection of subjects $S_i$ that apparently form a community or group and exhibit discrete precipitation with just two eigenvalues and whose states $|S_i\rangle$ in internal spaces 110a, 110b, ..., 110m can therefore be assigned to two-level wave functions.

A final two-level system review step 178 may optionally be performed by mapping module 115. This step should only be undertaken when subjects $S_i$ can be considered based on all available data and, in the human curator's opinion, as largely independent of their social group and the overall environment. In other words, the level of quantum entanglement of subject states $|S_i\rangle$ with the environment and with each other is low as determined with standard tools. The reader is here referred to U.S. patent application Ser. No. 14/182,281, the references cited therein and further standard references discussing Bell's Inequality, Bell single-channel and multi-channel tests.

In human terms, low levels of entanglement are likely to apply to subjects that are extremely individualistic and formulate their own opinions without apparent influence by others within their community/group or outside of it. When such radically individualistic subjects are found, their further examination is advantageous to bound potential error in assignments of state vectors $|S_i\rangle$ and/or in the case of more rigorous procedures, any errors in the estimation of states $|S_i\rangle$ or more robust expressions formulated with the aid of density matrices.

Preferably, mapping module 115 should divide case 176 into sub-group 180 and sub-group 182. Sub-group 180 is reserved for subjects $S_i$ that despite having passed previous selections exhibit some anomalies or couplings. These are potentially due to inter subject entanglement and/or subject to environment entanglement. Subjects $S_i$ with states $|S_i\rangle$ manifesting substantial levels of entanglement and/or other anomalies that may cause degeneracy or other unforeseen issues should be put in sub-group 180. These subjects should be eliminated from being used in further prediction or simulation if only pure states are used. They may be retained, however, if a suitable density matrix representation is possible, as will be appreciated by those skilled in the art.

Meanwhile, sub-group 182 is reserved for confirmed well-behaved subjects $S_i$ whose states $|S_i\rangle$ reliably manifest in two-level, non-degenerate, measurable indications a and b modulo underlying proposition 107 about the chosen item 109 (or an item very similar to item 109) as confirmed by historical data. These subjects will be assigned two-level state vectors $|S_i\rangle$ by assignment module 116 as explained in more detail below. At this point the reader may again refer to U.S. patent application Ser. No. 14/182,281 that explains qubit-type state vector assignments in situations that center on individual subjects divorced from community effects.

In addition to selecting subjects $S_i$ that can be assigned to two-level states $|S_i\rangle$, mapping module 115 also examines the community values space. In other words, module 115 also confirms that all subjects $S_i$ that have been qualified in the prior steps (found to exhibit the desired discrete, non-degenerate, two-level precipitation type with respect to proposition 107 about item 109a) really inhabit a group or community values space that can be represented by a single community state space $\mathcal{H}^{(c)}$. More information about this process, tensor product spaces and the requisite tools is found in U.S. patent application Ser. No. 14/324,127.

For the remaining portion of the present teachings, it will be assumed that all subjects $S_i$ are indeed found to be in sub-group 182 and thus justify assignment of state vectors or states $|S_i\rangle$ in community state space $\mathcal{H}^{(c)}$. Furthermore, it will also be assumed herein that all subjects $S_i$ are within the appropriate range of validity of the quantum representation for the underlying propositions under study and given the items that these propositions are about. This last point is preferably confirmed by mapping module 115 prior to handing off information about subjects $S_i$ to assignment module 116 for state assignment, as discussed below. For a more thorough treatment of issues relating to renormalization and other relevant considerations in the application of the quantum representation the reader is referred to U.S. patent application Ser. No. 14/504,435.

Figure 3C:
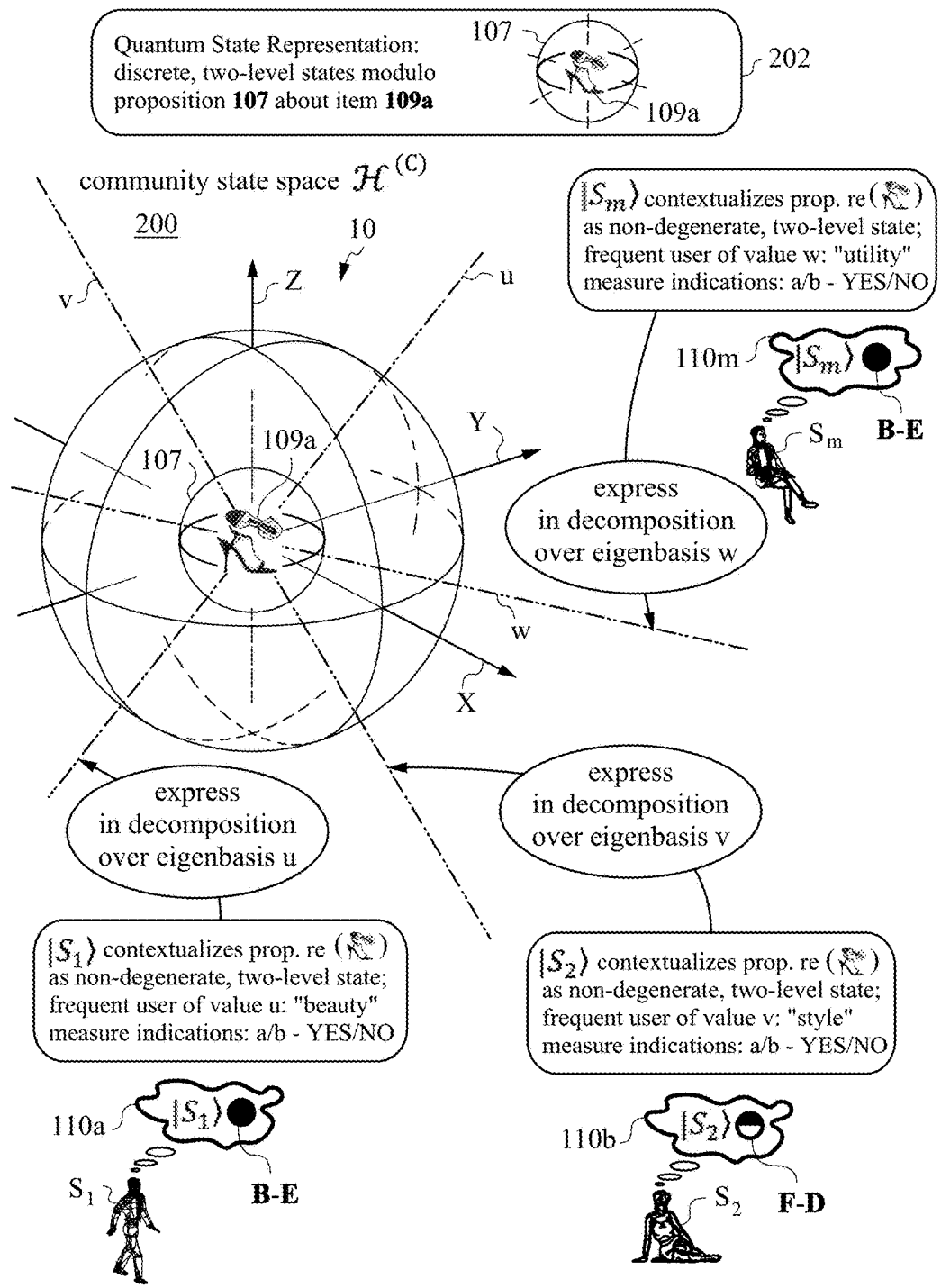
FIG. 3C is a diagram visualizing the operation of the assignment module in formally assigning quantum subject states $|S_i\rangle$ to subjects $S_i$ qualifying for quantum representation.

FIG. 3C is a diagram to help in visualizing the operations performed by creation module 117 and assignment module 116. This drawing figure focuses in particular on three selected test subjects $S_1$, $S_2$ and $S_m$ with their respective internal spaces 110a, 110b, and 110m posited in community values space 200. The last is represented quantum mechanically by community state space $\mathcal{H}^{(c)}$. An overall context 202 for the quantum representation is included at the top of FIG. 3C. Context 202 reminds us that in their quantum mechanical representation states $|S_i\rangle$ of all subjects $S_i$ behave as discrete, two-level systems based on the determinations made by mapping module 115 as described above. Each of those can be conveniently represented with the aid of Bloch sphere 10 as already introduced in the background section.

Creation module 117 formally posits or creates selected subjects $S_i$ that belong to the community by virtue of sharing community values space 200 modulo proposition 107. The action of positing is connected with the quantum mechanical action associated with the application of creation operators. Also, annihilation operators are used for un-positing or removing quantum states $|S_i\rangle$ of subjects $S_i$ from consideration. Just to recall the physics assumptions being used herein when creating and annihilating states, it is important to know what type of state is being created or annihilated. Symmetric wave functions are associated with elementary (gauge) and composite bosons. Bosons have a tendency to occupy the same quantum state under suitable conditions (e.g., low enough temperature and appropriate confinement parameters). The operators used to create and annihilate bosons are specific to them. Meanwhile, fermions do not occupy the same quantum state under any conditions and give rise to the Pauli Exclusion Principle. The operators used to create and annihilate fermions are specific to them as well.

Again, it may be difficult to discern such competitive dynamic modulo proposition 107 about the same pair of shoes 109a or the need for an anti-symmetric joint state from data files 112 and communications found in traffic propagating via network 104 and within social network 106. This is why creation module 117 has to review data files 112 as well as communications of test subjects $S_i$ containing indications exhibited in situations where both were present and were confronted by propositions as similar or close as possible to proposition 107 about shoes 109a. The prevalence of "big data" as well as "thick data" that subjects produce in self-reports is again very helpful. The human curator that understands the lives of test subjects $S_i$ should preferably exercise their intuition in reviewing and approving the proposed F-D anti-consensus statistic or B-E consensus statistic based on data from pairs of subjects $S_i$ modulo proposition 107 about shoes 109a.

Once all subjects $S_i$ have their statistics determined to be either B-E consensus or F-D anti-consensus creation module 117 can properly posit them in community values space 200 as quantum states $|S_i\rangle$. All subject states $|S_i\rangle$ corresponding to subjects $S_i$ exhibiting B-E consensus statistic are created by bosonic creation operator $\hat{a}^\dagger$. All subject states $|C_k\rangle$ corresponding to subjects $S_i$ exhibiting F-D anti-consensus statistic are created by fermionic creation operator $\hat{c}^\dagger$. All subjects states $|S_i\rangle$ irrespective of statistics are posited in shared community values space 200 represented by community state space $\mathcal{H}^{(c)}$.

Assignment module 116 is the one that formally associates the quantum representation to all subjects $S_i$. This is shown explicitly only for the three states $|S_1\rangle$, $|S_2\rangle$, $|S_m\rangle$ corresponding to internal spaces 110a, 110b, 110m of three select subjects $S_1$, $S_2$, $S_m$ in FIG. 3C for reasons of clarity. In the present drawing figure we see subject $S_1$ with internal state 110a already assigned to a two-level quantum state vector or simply state $|S_1\rangle$ with a B-E marking. The marking serves to remind us that subject $S_1$ exhibits B-E consensus statistic with respect to other subjects $S_i$ when contextualizing proposition 107 about shoes 109a. Furthermore, based on historical data in data files 112-S1 stored in memory 108, mapping module 115 has determined that the most likely value applied by subject $S_1$ in contextualization of proposition 107 about item 109, i.e., shoes 109a in the present example, concerns their "beauty". Since the precipitation type of subject state $|S_1\rangle$ is two-level the two possible measurable indications a, b map to a "YES" indication and a "NO" indication.

Given all available information about subject $S_1$, assignment module 116 estimates and expresses state $|S_1\rangle$ in a decomposition in the u-basis which corresponds to value "beauty". Of course, if available assignment module 116 uses the most recent measurement. State "UP" along u is taken as the eigenstate in which subject $S_1$ finds shoes 109a beautiful with the associated eigenvalue or measurable indication being "YES". State "DOWN" along u is taken as the eigenstate in which subject $S_1$ finds shoes 109a not beautiful with the associated eigenvalue or measurable indication being "NO". The measurable indications a, b in this case are two mutually exclusive responses "YES" and "NO".

Meanwhile, subject $S_2$ with internal state 110b is assigned their discrete, two-level estimated state $|S_2\rangle$ with an F-D marking. The latter serves to remind us that subject $S_2$ exhibits F-D anti-consensus statistic with respect to other subjects $S_i$ when contextualizing proposition 107. In this case, mapping module 115 has determined that the most common value applied by subject $S_2$ in contextualizing proposition 107 about shoes 109a (or any sufficiently similar contextualization, as noted above) concerns their "style". Thus, in any measurement the a or "YES" indication indicates that subject $S_2$ judges shoes 109a to be stylish. The corresponding eigenstate is taken "UP" along v. The b or "NO" indication indicates that subject $S_2$ judges shoes 109a to not be stylish. The corresponding eigenstate is taken "DOWN" along v.

State $|S_2\rangle$ estimated for subject $S_2$ by assignment module 116 is posited to also reside in the same Hilbert space as state $|S_1\rangle$ of subject $S_1$, namely in community state space $\mathcal{H}^{(c)}$. Belonging to the same values space 200 can be confirmed in finding evidence from contemporaneous and historical data files 112-S1, 112-S2 of subjects $S_1$ and $S_2$ (see FIG. 2). Mentions or even discussion of items similar as well as specifically item 109a is an indication of contextualizing in shared values space 200.

Subject $S_m$ with internal state 110m is also assigned their discrete, two-level estimated or measured state $|S_m\rangle$ by assignment module 116 with a B-E marking designating consensus statistic with respect to other subjects $S_i$ when contextualizing proposition 107. In the case of subject $S_m$, mapping module 115 determined that the most common value applied by subject $S_m$ in contextualizing proposition 107 about shoes 109a (or any sufficiently similar contextualization, as noted above) concerns their "utility". Thus, in any measurement the a or "YES" indication indicates that subject $S_m$ judges shoes 109a to be useful. The corresponding eigenstate is taken "UP" along w. The b or "NO" indication indicates that subject $S_m$ judges shoes 109a to not be useful. The corresponding eigenstate is taken "DOWN" along w. Thus decomposed in the w-eigenbasis state $|S_m\rangle$ of subject $S_m$ is processed and finally placed in community state space $\mathcal{H}^{(c)}$.

Proceeding in this manner, assignment module 116 assigns community subject states $|S_i\rangle$ that are posited in community state space $\mathcal{H}^{(c)}$ to each one of subjects $S_i$ along with their B-E or F-D consensus statistics. This is done based on the best available and most recent information from data files 112 as well as communications gleaned from network 104. To ensure data freshness, assignment module 116 is preferably connected to network monitoring unit 120. The latter can provide most up-to-date information about subjects $S_i$ to allow assignment module 116 to assign the best possible estimates of states $|S_i\rangle$ based on measurements of similar propositions or even to assign the measured states if recent measurement of the proposition at hand is available for the given subjects. This should always be done as part of pre-calibration at the start of a tracking run or else a prediction or simulation run. A person skilled in the art may consider the actions of assignment module 116 to represent assignment of estimates and may indicate this by an additional notational convenience. In some cases a "hat" or an "over-bar" are used. In order to avoid undue notational rigor we will not use such notation herein and simply caution the practitioner that the assigned state vectors as well as matrix operators we will derive below from the already introduced eigenbases are estimates.

A person skilled in the art will note that, depending on the embodiment, the distribution of functions between modules 115, 117 and 116 and even network monitoring unit 120 can be adjusted. Irrespective of the division of tasks, these modules need to share information to ensure that the most accurate possible quantum representation is achieved.

In general, measurable indications a, b transcend the set of just mutually exclusive responses that can be articulated in data files 112-S1 or otherwise transmitted by a medium carrying any communications generated by subject $S_1$. Such indications can include actions, choices between non-communicable internal responses, as well as any other choices that subject $S_1$ can make internally but is unable to communicate about externally. Because such "internal" choices are difficult to track, unless community subject $S_1$ is under direct observation by another human that understands them, they may not be of practical use in the present invention.

On the other hand, mutually exclusive responses that can be easily articulated by subject $S_1$ are suitable in the context of the present invention. The actual decomposition into the corresponding eigenvectors or eigenstates and eigenvalues that correspond to the measurable indications a, b, as well as the associated complex coefficients, probabilities and other aspects of the well-known quantum formalism will not be discussed herein. These aspects have been previously explained in great detail in U.S. patent application Ser. No. 14/324,127 to which the reader is referred for corresponding information.

It is important to realize that the assignment by assignment module 116 of state $|S_1\rangle$ to first community subject $S_1$ will most often be an estimate. Of course, it is not an estimate in the case of confirmed and very recent measurement. Measurement occurs when subject $S_1$ has just yielded one of the measurable indications, which corresponds to an eigenvalue $\lambda_i$ that associates with an eigenvector in that eigenbasis. At that point, assignment module 116 simply sets state $|S_1\rangle$ equal to that eigenvector. The estimate of state $|S_1\rangle$ is valid for underlying proposition 107 about shoes 109a. The estimate reflects the contextualization by subject $S_1$ at a certain time and will generally change as the state of subject $S_1$ evolves with time. The same is true for the measured state since all states evolve (only eigenvalues observed during quantum measurements represent facts that are immutable records of which a history can be made).

Updates to the estimates and prior measurements of all quantum states are preferably derived from contextualizations that have been actually measured within a time period substantially shorter than or less than a decoherence time. Since no contextualizations are identical, even if only due to temporal evolution of the state, similar contextualizations should be used in estimating states whenever available. In other words, estimates based on propositions about items that are similar to proposition 107 about shoes 109a should be used. This strategy allows assignment module 116 to always have access to an up-to-date estimated or measured state vector.

Quantum states modulo certain propositions may exhibit very slow evolution on human time scales, e.g., on the order of months, years or even decades. States with very long decoherence times are advantageous because they do not require frequent updates after obtaining a good first estimate or preferably even a measurement. For states that evolve more quickly, frequent updates will be required to continuously maintain fresh states. Contextualizations modulo some propositions may evolve so rapidly on human time scales that keeping up-to-date estimates or measurements may be challenging. For example the change in state from "fight" to "flight" modulo an underlying proposition 107 about item 109 instantiated by a wild tiger (or item 109b instantiated by the book covering ordinary and partial differential equations) can evolve on the order of split seconds. Therefore, in considering any particular proposition data and estimated state freshness may be crucial for some tracking activities while barely at all for others. A review of estimates, measurements and their freshness by the human curator is thus recommended before commencing any tracking processes and even more so before attempting any prediction or simulation runs.

Preferably, network monitoring unit 120 curates what we will consider herein to be estimated quantum probabilities $p_a$, $p_b$ for the corresponding measurable indications a, b of all quantum states $|S_i\rangle$. Of course, a human expert curator or other agent informed about the human meaning of the information available in network 104 about subjects $S_i$ should be involved in setting the parameters on unit 120.

The expert human curator should also verify the measurement in case the derivation of measurable indications actually generated is elusive or not clear from data files 112-Si. Such review by an expert human curator will ensure proper derivation of estimated quantum probabilities $p_a$, $p_b$. Appropriate human experts may include psychiatrists, psychologists, counselors and social workers with relevant experience.

In some embodiments assignment module 116 may itself be connected to network 104 such that it has access to documented online presence and all data generated by test subjects $S_i$ in real time. Assignment module 116 can then monitor the state and online actions of subjects $S_i$ without having to rely on archived data from memory 108. Of course, when assignment module 116 resides in a typical local device such as computer 114, this may only be practicable for tracking a few very specific subjects or when tracking subjects that are members of a relatively small social group 106 or other small subgroups of subjects with known affiliations.

In the present example, contextualization of proposition 107 about shoes 109a by any one of subjects $S_i$ that exhibits the two-level, non-degenerate precipitation type is taken to exhibit two of the most typical opposite responses, namely "YES" and "NO". In general, however, mutually exclusive measurable indications or responses can also be opposites such as "high" and "low", "left" and "right", "buy" and "sell", "near" and "far", and so on. Proposition 107 may evoke actions or feelings that cannot be manifested simultaneously, such as liking and disliking the same item at the same time, or performing and not performing some physical action, such as buying and not buying an item at the same time. Frequently, situations in which two or more mutually exclusive responses are considered to simultaneously exist lead to nonsensical or paradoxical conclusions. Thus, in a more general sense mutually exclusive responses in the sense of the invention are such that the postulation of their contemporaneous existence would lead to logical inconsistencies and/or disagreements with fact. This does not mean that any one of subjects $S_i$ may not internally experience such conflicts, but it does mean that they cannot act them out in practice (i.e., you can't buy and not buy shoes 109a at the exact same time).

Sometimes, after exposure to proposition 107 any one of subjects $S_i$ reacts in an unanticipated way and no legitimate response can be obtained in the contextualization of proposition 107. The quality of tracking will be affected by such "non-results". Under these circumstances devoting resources to assigning and monitoring of subject state $|S_i\rangle$ and monitoring of their expectation value becomes an unnecessary expenditure. Such non-response can be accounted for by classical null response probability $p_{null}$, and as also indicated in prior teachings (see U.S. patent application Ser. Nos. 14/182,281 and 14/224,041). In some cases, non-results or spurious responses can be due to being outside the range of validity for the quantum representation of the specific subject. This issue is renormalization-related and has been previously addressed in U.S. patent application Ser. No. 14/504,435. In a preferred embodiment, as mentioned above, mapping module 115 confirms the range of validity to eliminate form consideration subjects $S_i$ whose states that may exhibit renormalization-related issues.

In preferred embodiments of computer system 100 and methods of the present invention, it is preferable to remove non-responsive subjects $S_i$ after a certain amount of time corroborated by the human curator. The amount of time should be long in comparison with the decoherence time. Therefore, any subject observed to generate "non-results" for a comparatively long time is removed from community state space $\mathcal{H}^{(c)}$ by action with a corresponding annihilation operator. This is tantamount to removing the subject from tracking. This action is also referred to as annihilation in the field of quantum field theory. It is here executed in analogy to its action in a field theory by the application of fermionic or bosonic annihilation operator $\hat{c}$ or $\hat{\alpha}$ in creation module 117. The type of annihilation operator depends on whether subject state exhibited B-E consensus or F-D anti-consensus statistic during its original creation.

Figure 3D:
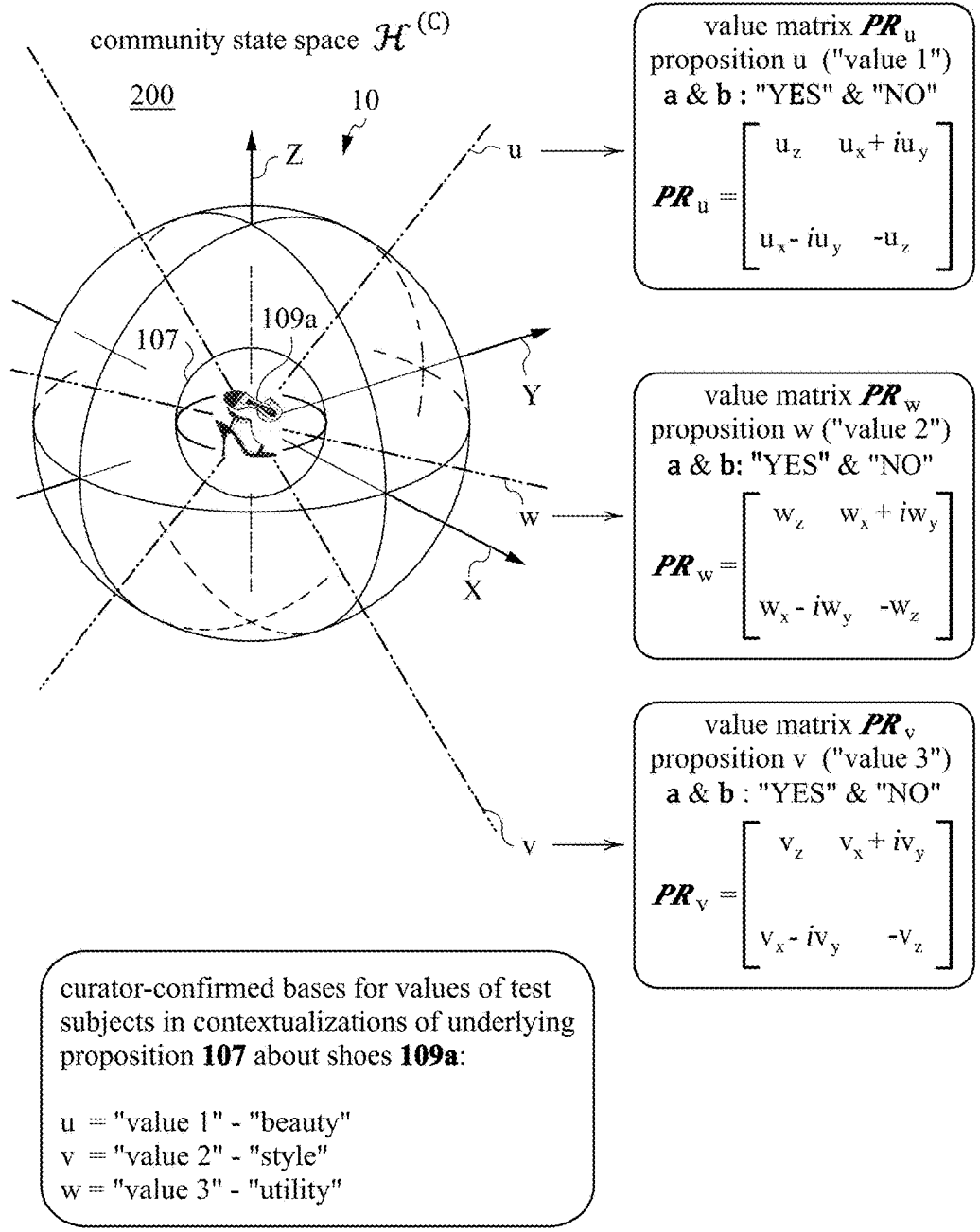
FIG. 3D is a diagram that illustrates the derivation of value matrices PR for three specific subject values used in contextualizations by test subjects of an underlying proposition about a specific item.

FIG. 3D illustrates another important function performed by assignment module 116. This function is to convert into quantum representation subject values (not to be confused with numeric values—here we mean human values or judgment criteria). The values we mean here are those that subjects $S_i$ apply in their contextualizations, apprehensions, frames of mind, judgments and/or assessments. FIG. 3D continues with the same example, namely the one focused on subjects $S_1$, $S_2$ and $S_m$. Instead of reviewing the quantum states, assignment module 116 now trains on the eigenvectors that make up the u-, v- and w-eigenbases. These eigenbases are associated with contextualizations of the underlying proposition using the values of "beauty", "style" and "utility", respectively.

Figure 1A:
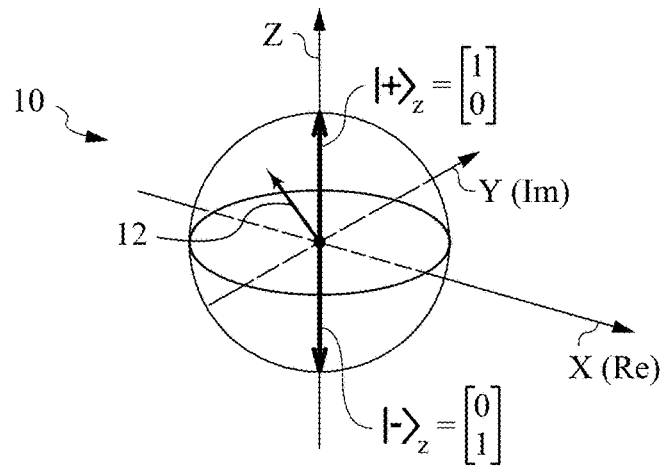
FIG. 1A (Prior Art) is a diagram illustrating the basic aspects of a quantum bit or qubit.
Figure 1B:
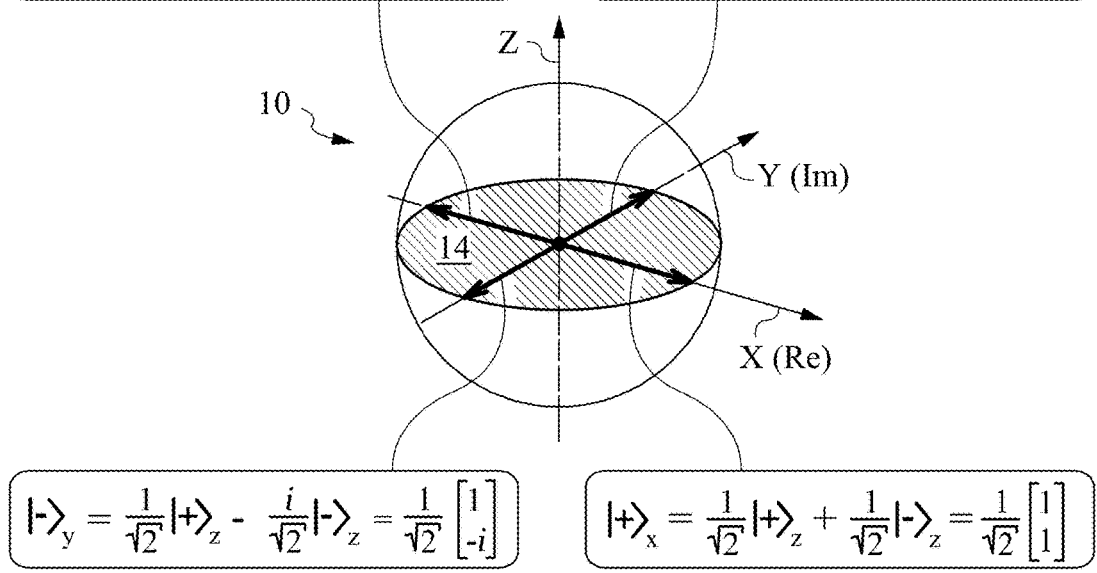
FIG. 1B (Prior Art) is a diagram illustrating the set of orthogonal basis vectors in the complex plane of the qubit shown in FIG. 1A.
Figure 1C:
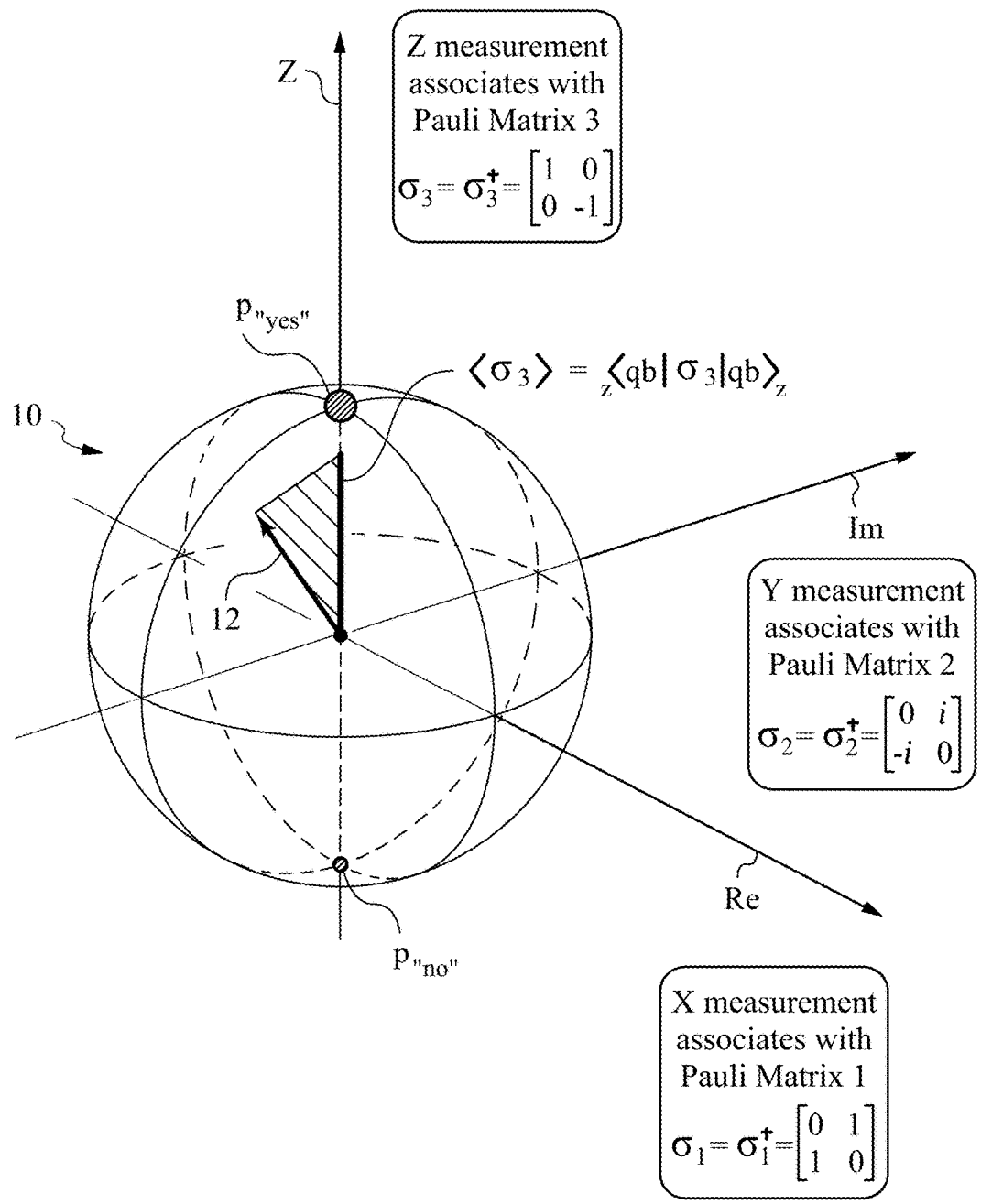
FIG. 1C (Prior Art) is a diagram illustrating the qubit of FIG. 1A in more detail and the three Pauli matrices associated with measurements.
Figure 1D:
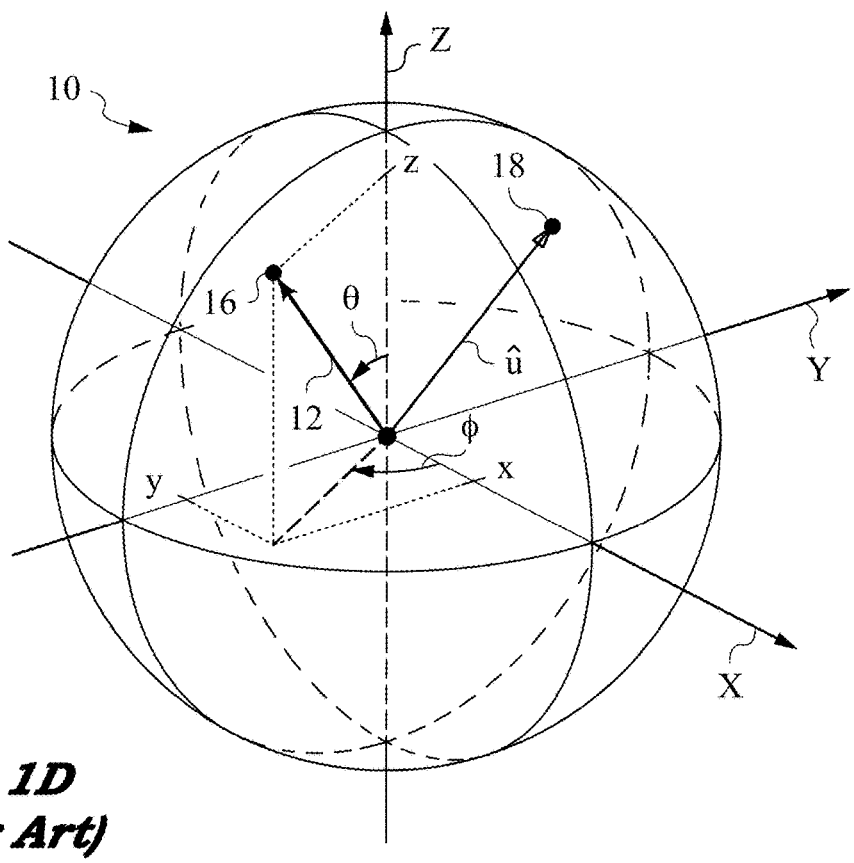
FIG. 1D (Prior Art) is a diagram illustrating the polar representation of the qubit of FIG. 1A.

As we know from standard quantum mechanics, since states $|S_i\rangle$ are two-level they can be spectrally decomposed in bases with two eigenvectors. The spectral decompositions of states $|S_1\rangle$, $|S_2\rangle$, $|S_m\rangle$ belonging to subjects $S_1$, $S_2$ and $S_m$ as shown in FIG. 3C has already introduced the u-, v- and w-eigenbases. Each of these three eigenbases has two eigenvectors that are not explicitly drawn here (see, e.g., FIGS. 1A & 1B and corresponding description in the background section). In other words, the eigenvectors in this example come in pairs. There is one "UP" and one "DOWN" eigenvector in each of the three eigenbases. Equivalently put, we have eigenvectors that are parallel and anti-parallel with the u, v and w rays shown in FIGS. 3C & 3D.

By convention already introduced above, we take "UP" eigenvectors to mean that the subject is experiencing a state of positive judgment in that value (contextualization yields positive value judgment). Therefore, the "UP" eigenvector is associated with the first eigenvalue $\lambda_1$ that we take to stand for the "YES" measurable indication a. The "DOWN" eigenvectors mean the state of negative judgment in that value. Hence, the second eigenvalue $\lambda_2$ that goes with the "DOWN" eigenvector is taken to stand for "NO" measurable indication b.

In the quantum representation of contextualizations as implemented by assignment module 116 the eigenvector pairs describe the different values that subjects may deploy. Subjects $S_i$ can contextualize proposition 107 with any chosen value described by the eigenvector pairs but they can only choose one at a time. In fact, in many applications of the present apparatus and methods it is advantageous to obtain measurable indications a, b (or eigenvalues $\lambda_1$, $\lambda_2$) from many subjects $S_i$ in at least two different eigenvector bases or, equivalently, in two different contextualizations.

Based on the rules of linear algebra, subject states $|S_i\rangle$ forming the quantum representation of subjects $S_i$ modulo underlying proposition 107 can be expressed in any contextualization or using any of the available values. This is ensured by the spectral decomposition theorem. We have already used this theorem above in FIG. 3C for subject state decompositions in terms of eigenvectors. To wit, we have expressed subject state $|S_1\rangle$ of subject $S_1$ in the u-basis, subject state $|S_2\rangle$ of subject $S_2$ in the v-basis, and subject state $|S_m\rangle$ of subject $S_m$ in the w-basis.

In FIG. 3D we proceed further and introduce value matrices $PR_j$ whose eigenvectors are the very eigenvectors we have already deployed. Conveniently, we thus express the different bases or eigenbases with corresponding value matrices $PR_j$ that have these eigenvectors in their eigenbases. Value matrices $PR_j$ represent quantum mechanical operators (Hermitian matrices). In the case of our two-level systems are related to the Pauli matrices already introduced in the Background section.

The quantum mechanical prescription for deriving the proper operator or "beauty" value matrix $PR_u$ is based on knowledge of the unit vector $\hat{u}$ along ray u. The derivation has already been presented in the background section in Eq. 13. To accomplish this task, we decompose unit vector $\hat{u}$ into its x-, y- and z-components. We also deploy the three Pauli matrices $\sigma_1$, $\sigma_2$, $\sigma_3$. By standard procedure, we then derive value matrix $PR_u$ as follows:

$$PR_u = \hat{u} \cdot \overline{\sigma} = u_x \sigma_1 + u_y \sigma_2 + u_z \sigma_3. \quad \text{Eq. 18a}$$

The same procedure yields the two remaining value matrices $PR_v$, $PR_w$ that, in our quantum representation, stand for contextualizations using the values of "style" and "beauty", respectively. Once the decompositions of unit vectors $\hat{v}$, $\hat{w}$ along rays v, w are known, these are expressed as follows:

$$PR_v = \hat{v} \cdot \overline{\sigma} = v_x \sigma_1 + v_y \sigma_2 + v_z \sigma_3, \text{ and} \quad \text{Eq. 18b}$$

$$PR_w = \hat{w} \cdot \overline{\sigma} = w_x \sigma_1 + w_y \sigma_2 + w_z \sigma_3. \quad \text{Eq. 18c}$$

All three value matrices $PR_u$, $PR_v$, $PR_w$ obtained from these equations are shown in FIG. 3D in association with their corresponding rays u, v and w.

Figure 1E:
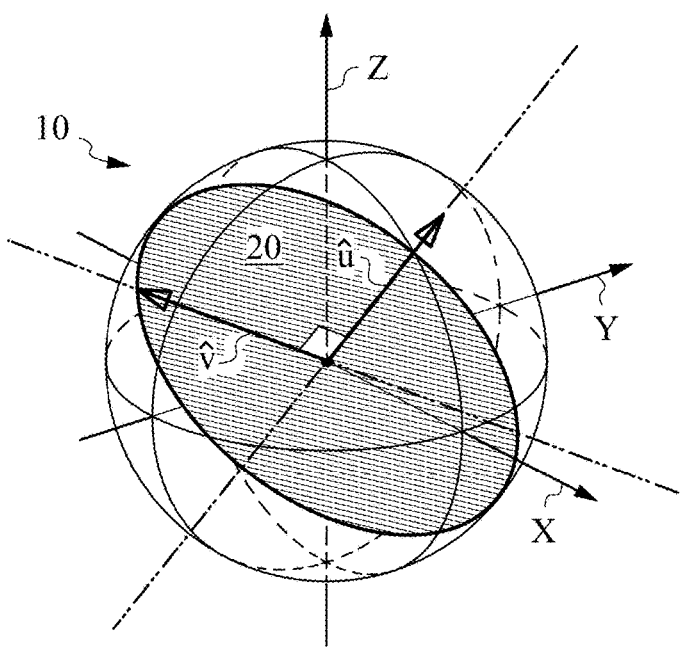
FIG. 1E (Prior Art) is a diagram illustrating the plane orthogonal to a state vector in an eigenstate along the u-axis (indicated by unit vector û).
Figure 1F:
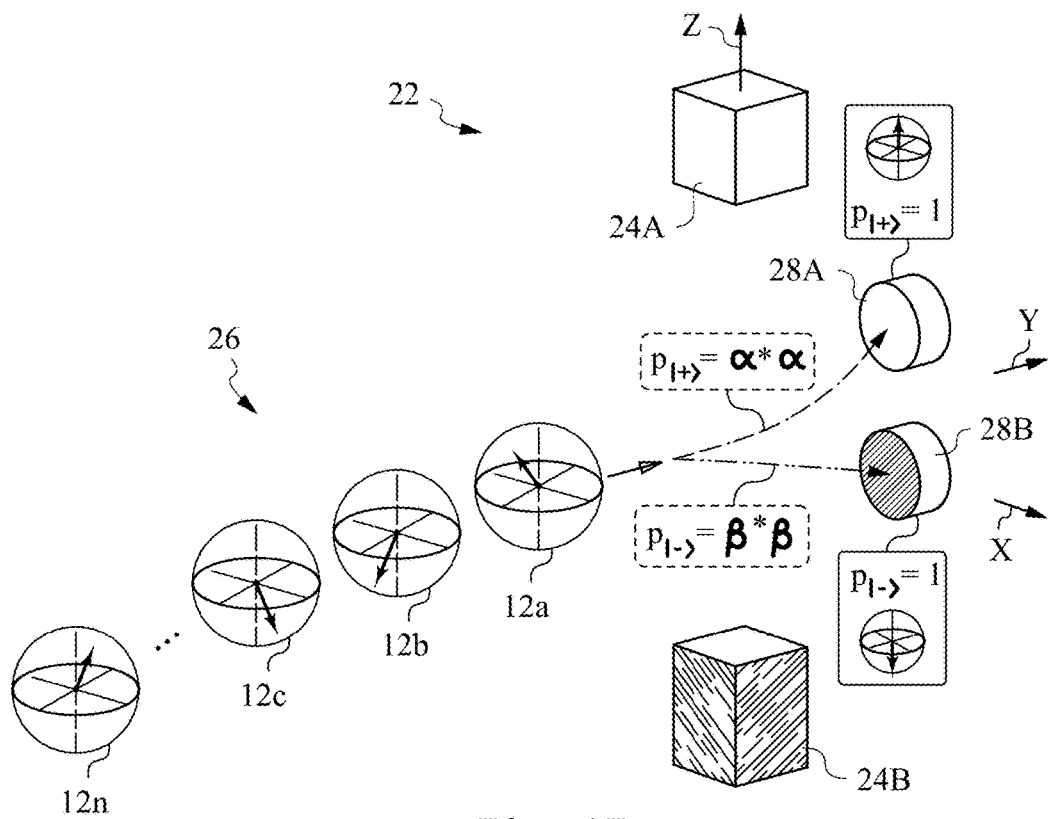
FIG. 1F (Prior Art) is a diagram illustrating a simple measuring apparatus for measuring two-state quantum systems such as electron spins (spinors).

Per standard rules of quantum mechanics, we take value matrices $PR_j$ to act on or be applied to subject states $|S_i\rangle$ to yield eigenvalues $\lambda_k$ associated with measurable indications modulo underlying proposition 107 as exhibited by subjects $S_i$. The eigenvalues, of course, stand for the "YES" and "NO" measurable indications. The practitioner is here reminded that prior to the application of the corresponding value matrix the subject state should be expressed in the eigenbasis of that value matrix. In the case of values represented with value matrices $PR_u$, $PR_v$, $PR_w$ we are clearly not dealing with eigenvector bases that are completely orthogonal (see FIG. 1E and discussion of the Uncertainty Principle in the Background section). Thus, contextualizations with these values are not completely incompatible. However, they are far from compatible, since u-, v- and w-produce clearly different unit vectors.

In some embodiments it will be advantageous to select two or more different eigenvector bases (depending on dimensionality of state space $\mathcal{H}^{(c)}$) represented by two or more value matrices $PR_j$ that are non-commuting and thus subject to the Heisenberg Uncertainty relation. Measurements obtained over test subjects $S_i$ contextualizing with incompatible values as encoded by such non-commuting value matrices $PR_j$ will be useful in further explorations and in constructing views for classical representations. The measurable indications obtained when contextualizing with such non-commuting value matrices $PR_j$ cannot have simultaneous reality. In other words, they cannot be measured/observed in any one of subjects $S_i$ at the same time.

Armed with the quantum mechanical representation thus mapped, many computations and estimations can be undertaken. The reader is referred to the co-pending application Ser. Nos. 14/182,281; 14/224,041 and 14/324,127 for further teachings about the extension of the present quantum representation to simple measurements. Those teachings also encompass computation of outcome probabilities in various bases with respect to different propositions typically presented to just one or two subjects. The teachings partly rely on trying to minimize the effects from interactions between the environment and the state that stands in for the subject of interest. It is also assumed for the purposes of those teachings that the states are reasonably pure allowing us to build up our intuition without having to move to the density matrix representation of subject states.

In the present invention we will continue building on the intuition from simple situations of reasonably pure states. That is because teachings based on pure states are easily translated by those skilled in the art to the more complex situations in which, e.g., several pure states are possible for a single subject. Given that the density matrix is thus obtained from probabilities of two or more pure states, as already shown in the Background section, a person skilled in the art will be able to adapt these teachings to construct requisite density matrices. Thus, more complicated situations in which subject states are mixtures and entanglement between subjects exists can be properly accounted for based on the teachings of the present quantum representation.

We are presently interested in the detection of biasing effects on the contextualization of a test proposition by like-minded subjects. By like-minded we mean subjects that exhibit shared measurable indications and shared contextualizations of one or more preparatory propositions that are analogous or closely related to a test proposition. The type of biasing effects to be detected are produced by a biasing entity to which some of the like-minded subjects are exposed. More specifically, the biasing effects we are interested in induce a different choice of contextualization and hence lead to a change in measurable indications obtained from subjects that were exposed.

Figure 4:
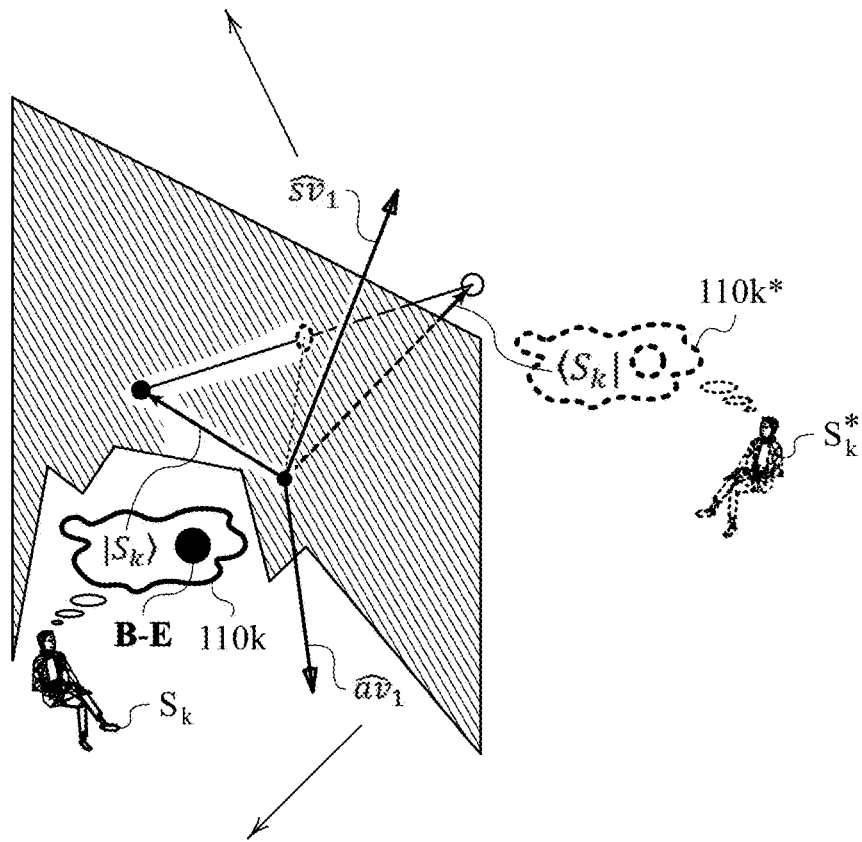
FIG. 4 is a diagram to aid in the visualization of the computation of a quantum mechanical expectation value.

In order to better understand important aspects of biasing and the resultant biasing effects we now refer to FIG. 4 to review the computation of an expectation value for a measurement. Here we see a single subject $S_k$ with a pure state $|S_k\rangle$ representing their internal state 110k at some initial time $t_o$. A reasonably pure quantum state representation for subject $S_k$ has been confirmed by mapping module 115 (see FIG. 2). The state fits the description of discrete and two-level modulo a preparatory proposition 107' about item 109e. In this example item 109e happens to be an experience and more particularly still and experiential good embodied by a movie. Overall context 202 for the quantum representation valid in this example is included at the top of FIG. 4.

Creation module 117 (see FIG. 2) is informed by historical data (possibly further corroborated by a human curator) about the consensus type of subject $S_k$. In this exemplary case, the nature of subject $S_k$ modulo preparatory proposition 107' about movie 109e is B-E consensus type, or more simply put consensus seeking. Thus, creation module 117 has used a bosonic creation operator to posit state $|S_k\rangle$, as duly marked in FIG. 4.

The most commonly adopted contextualization practiced by subject $S_k$ in considering preparatory proposition 107' about movie 109e is gleaned from "thick data" available on network 104 (potentially in social network 106 if subject $S_k$ is a member). In the present example, this most commonly adopted contextualization is encapsulated by the concept of "entertainment value". In other words, subject $S_k$ typically apprehends proposition 107' presenting movie 109e as an opportunity to be entertained.

Once again, it is the job of assignment module 116 (see FIG. 2), appraised of information about subject $S_k$ to formally translate subject state 110k under the "entertainment value" contextualization into quantum representation. First, the value used in the contextualization is presented in the form of a subject value matrix $PR_V$. Since the system is two-level, subject value matrix $PR_V$ has two eigenvectors $|sv_1\rangle$, $|sv_2\rangle$ and two corresponding eigenvalues $\lambda_1$, $\lambda_2$. In the present example, eigenvector $|sv_1\rangle$ is taken for "entertaining" with corresponding eigenvalue $\lambda_1$ standing for the measurable indication that subject $S_k$ yields when entertained. In our example, this measurable indication will be also referred to by $\lambda_1$ to simplify the notation. Furthermore, it will be counted as a response of: $\lambda_1$="YES" response for "entertainment value". Second eigenvector $|sv_2\rangle$ is taken for "not entertaining" with corresponding eigenvalue $\lambda_2$ standing for the measurable indication that subject $S_k$ yields when not entertained. This negative measurable indication referred to by $\lambda_2$ is counted as a response of: $\lambda_2$="NO" response for "entertainment value". Finally, in keeping with the above convention, the complex coefficients for the spectral decomposition of subject state $|S_k\rangle$ in the basis offered by subject value matrix $PR_V$ are represented by the familiar $\alpha$, $\beta$. This means that assignment module 116 outputs the manifestly Hermitian subject value matrix $PR_V$:

$$PR_V = \begin{vmatrix} V_x & V_x + iV_y \\ V_x - iV_y & -V_x \end{vmatrix},$$ Eq. 19 where capital V (rather than lower-case we were using before) now stands for the corresponding ray in Hilbert space. Also, assignment module 116 outputs subject state $|S_k\rangle$ decomposed in the eigenbasis of subject value matrix $PR_V$:

$$|S_k\rangle_V = \alpha_V |sv_1\rangle_V + \beta_V |sv_2\rangle_V,$$ Eq. 20a where we use the capital V subscripts to remind ourselves that the quantum representation is in the eigenbasis of subject value matrix $PR_V$.

Given this decomposition we will expect that a measurement using the contextualization expressed with subject value matrix $PR_V$ will yield the following probabilities for "YES" and "NO" measurable indications or responses of subject $S_k$ encoded in eigenvalues $\lambda_1$, $\lambda_2$:

$p_{"YES"} = \alpha_V^* \alpha_V$ (probability of observing subject $S_k$ manifest eigenvalue $\lambda_1$);

$p_{"NO"} = \beta_V^* \beta_V$ (probability of observing subject $S_k$ manifest eigenvalue $\lambda_2$).

At this point "thick" data about subject $S_k$ is used by assignment module 116 to estimate the complex coefficients and the probabilities. Advantageously, the deployment of the invention in network 104 captures large amounts of "thick" and recent data to help in estimating these coefficients and probabilities. In some cases the estimate may be very good, e.g., when based on a recent measurement. For example, there may exist a recent record, e.g., in a data file 112 (see FIG. 2) of subject $S_k$ effectively stating: "I find movie 109e to be of excellent entertainment value". In this case the decomposition is simple and consists only of the first eigenvector $|sv_1\rangle_V$ with $p_{"YES"} = p_{|sv_1\rangle} = \alpha_V = 1$ ($p_{"no"} = p_{|sv_2\rangle} = \beta_V = 0$. In the opposite case, where subject $S_k$ effectively stated: "I find movie 109e to be of no entertainment value" we again obtain an excellent estimate. Namely, the decomposition consists only of the second eigenvector $|sv_2\rangle_V$ with $p_{"NO"} = \beta_V = 1$ ($p_{"YES"} \cdot \alpha_V = 0$). The reason why even such measurements should be treated as estimates is due to temporal evolution and decoherence effects that set in with the passage of time. This is also the reason why fresh data is of utmost importance for propositions whose evaluation by a human mind changes quickly with time.

Assignment module 116 can also assign a mixed state for subject $S_k$ in case he or she is known to exhibit a less common but still often deployed alternative contextualization. For example, in a simple case subject $S_k$ may be known from historical records to deploy the alternative contextualization of "educational value" with respect to proposition 107' about movie 109e. For the sake of the present example, the probability that subject $S_k$ actually adopts this alternative contextualization is 10%. This is expressed with an alternative subject value matrix $PR_{AV}$.

Given this information, module 116 produces an estimate of subject state $|S_k\rangle$ decomposed in the eigenbasis of alternative subject value matrix $PR_{AV}$:

$$|S_k\rangle_{AV} = \alpha_{AV} |av_1\rangle_{AV} + \beta_{AV} |av_2\rangle_{AV},$$ Eq. 20b with the subscript AV denoting that the quantum representation is in the eigenbasis of alternative subject value matrix $PR_{AV}$.

Given that subject $S_k$ may have some probability of being in a pure state in the eigenbasis of $PR_{AV}$, the two pure states can be combined. The correct quantum mechanical prescription has already been provided in the Background section (see Eq. 15) and leads to the following density operator for our example:

$\hat{\rho} = \Sigma_i p_i |\psi_i\rangle \langle \psi_i| = (0.9) |S_k\rangle_{VV} \langle S_k| + (0.1) |S_k\rangle_{AV\,AV} \langle S_k|.$ Eq. 21

The $p_i$'s in this case represent the relative probabilities (summing to one in order to preserve the normalization condition discussed above) that subject $S_k$ will apply contextualization "entertainment value" and "educational value", respectively. In our example the probability of subject state $|S_k\rangle_V$ is 90% (0.9) since contextualization with alternative subject value matrix $PR_{AV}$ and hence of $|S_k\rangle_{AV}$ has a likelihood of 10% (0.1). In any particular case, these probabilities are computed from the historical records about subject $S_k$ and may be further corroborated/vetted by the human curator.

In a preferred embodiment, proposition 107' is presented to subject $S_k$ on the screen of their networked device (see FIG. 2 for a few non-limiting examples of networked devices). Alternatively, it is presented to them in any convenient way capable of displaying enough information about movie 109e to register as viable proposition. Indeed, the presentation can even be in person—i.e., presentation of proposition 107' about movie 109e is made during a real life encounter with another subject or by some proxy, mechanism or message including written and/or drawn information (e.g., an advertisement).

FIG. 4 illustrates subject state $|S_k\rangle$ and its dual bra vector state $\langle S_k|$. This drawing indicates by unit vector $\vec{sv}_1$ the "entertaining" eigenvector in the most commonly adopted contextualization of "entertainment value" expressed by subject value matrix $PR_V$. The drawing further shows by unit vector $\vec{av}_1$ the "educational" eigenvector in the alternative contextualization of "educational value". Per our quantum representation we postulate that at the time subject $S_k$'s state $|S_k\rangle$ is measured and collapses to either of these two eigenvectors the corresponding eigenvalue manifests. Specifically, collapse of $|S_k\rangle$ to $|sv_1\rangle$ will coincide with subject $S_k$ manifesting $\lambda_1$="YES" meaning "yes movie 109e is entertaining". The collapse of $|K_k\rangle$ to $|av_1\rangle$ will coincide with subject $S_k$ manifesting $\lambda_1$="YES" meaning "yes movie 109e is educational". Also in agreement with the quantum representation, the probability of collapse will start at zero at initial time $t_o$ and will keep increasing for as long as preparatory proposition 107' is being apprehended by subject $S_k$.

Eigenvectors $\vec{sv}_2$, $\vec{av}_2$ representing the state of subject $S_k$ at the moment of measuring eigenvalues $\lambda_2$="NO" for "no movie 109e is not entertaining" and $\lambda_2$="NO" for "no movie 109e is not educational" are omitted for reasons of clarity. Also note that in the case of the mixture discussed above, subject $S_k$ is only expected to have its state $|S_k\rangle$ be one of eigenvectors $\vec{sv}_1$ and $\vec{av}_1$. Differently put, subject $S_k$ is expected to be in one of the "YES"-eigenstates, but we do not know (based on a classical probability for relative probabilities in the mixture) which one. In other words, we have 90/10 chances for subject $S_k$ adopting the "entertainment value" or "educational value" contextualization modulo preparatory proposition 107' about movie 109e. In either case, subject $S_k$ is expected to yield the measurable indication "YES".

Since we can already tell in our own capacity as curators of human experience that it is hard to judge the same movie 109e in contextualizations based on "entertainment value" and based on "educational value" simultaneously, we expect that matrices $PR_V$ and $PR_{AV}$ will not commute. As a result, the fact that eigenvectors $\vec{sv}_1$ and $\vec{av}_1$ are not aligned is not surprising. In practice, the relative orientation of these eigenvectors should be confirmed not just by the human curator but also by reviewing large numbers of measurements and deploying the rules of commutator algebra well known to those skilled in the art.

The expectation value of subject's $S_k$ judgment of movie 109e in the "entertainment value" basis (measured by applying subject value matrix $PR_V$) is obtained by taking the regular prescription (see Eq. 10a). That prescription involves ket subject state $|S\rangle$, its complex conjugated dual bra $\langle S|$ and subject value matrix $PR_V$. Similarly, we can also obtain the expectation value of subject's $S_k$ judgment of movie 109e in the "educational value" basis (measured by applying alternative subject value matrix $PR_{AV}$). The same prescription holds and calls for subject state $|S_k\rangle$, its bra $\langle S_k|$ and now alternative subject value matrix $PR_{AV}$ instead of subject value matrix $PR_V$.

Just from a cautious geometrical intuition built from examining FIG. 4, we see that these expectation values will be very different. We state this fact more formally by using the expectation value formula explicitly as follows:

$$\langle S|PR_V|S\rangle \neq \langle S|PR_{AV}|S\rangle, \text{ or}$$

$$\langle PR_V\rangle_{|S\rangle} \neq \langle PR_{AV}\rangle_{|S\rangle} \qquad \text{Eq. 22}$$

In practice, the range of expectation value (given our +1 and −1 eigenvalues) will be between +1 and −1. From a simple visual inspection of the geometry (the reader is yet again cautioned that FIG. 4 is a Bloch-related representation) we see the projection for $\langle PR_V\rangle_{|S\rangle}$ to be close to about 0.75, while $\langle PR_{AV}\rangle_{|S\rangle}$ appears to be close to 0.

In FIG. 4 subject $S_k$ is indicated with internal state 110k and their internal complex-conjugated state 110k\*. Both the state and its complex-conjugate are about movie 109e at center of preparatory proposition 107'. As we have previously seen in U.S. application Ser. No. 14/324,127, the evolution along some orbit can always take internal state 110k to internal complex-conjugated state 110k\*. In a sense, these two states are "reflections" of each other. We thus posit subject $S_k$ and a "mirror image" subject $S_k$ namely subject $S_k^*$. Subject $S_k^*$ can be thought of as the same subject $S_k$ after some amount of evolution. Subject $S_k^*$ can also be thought of as a completely different subject that currently contextualizes movie 109e but whose ket state (the non complex-conjugated state) is represented by internal state 110k\*. In other words, the $|$notional$\rangle$ state or ket state of subject $S_k^*$ is in fact the bra state or the $\langle$counter-notional$|$ state of subject $S_k$.

This "flipping" between bras and kets can be understood as a change in mind about movie 109e from the point of view of a "party" represented by subject $S_k$ to the point of view of a "counter-party" represented by subject $S_k^*$. In the vernacular, such opposite thinking about the same underlying proposition may express itself as: 1) "yes the movie is entertaining to me" and 2) "yes the movie is entertaining to others". Differently put, this pair of complex-conjugate internal states can be associated with a "party" and a "counter-party" mentality. They both certainly "see eye to eye". They also agree on judging movie 109e in the same contextualization of "entertainment value" but still are distinct in the sense that one would act like a "viewer" or "consumer" of movie 109e and the other like a "promoter" or "producer" of movie 109e.

Figure 5:
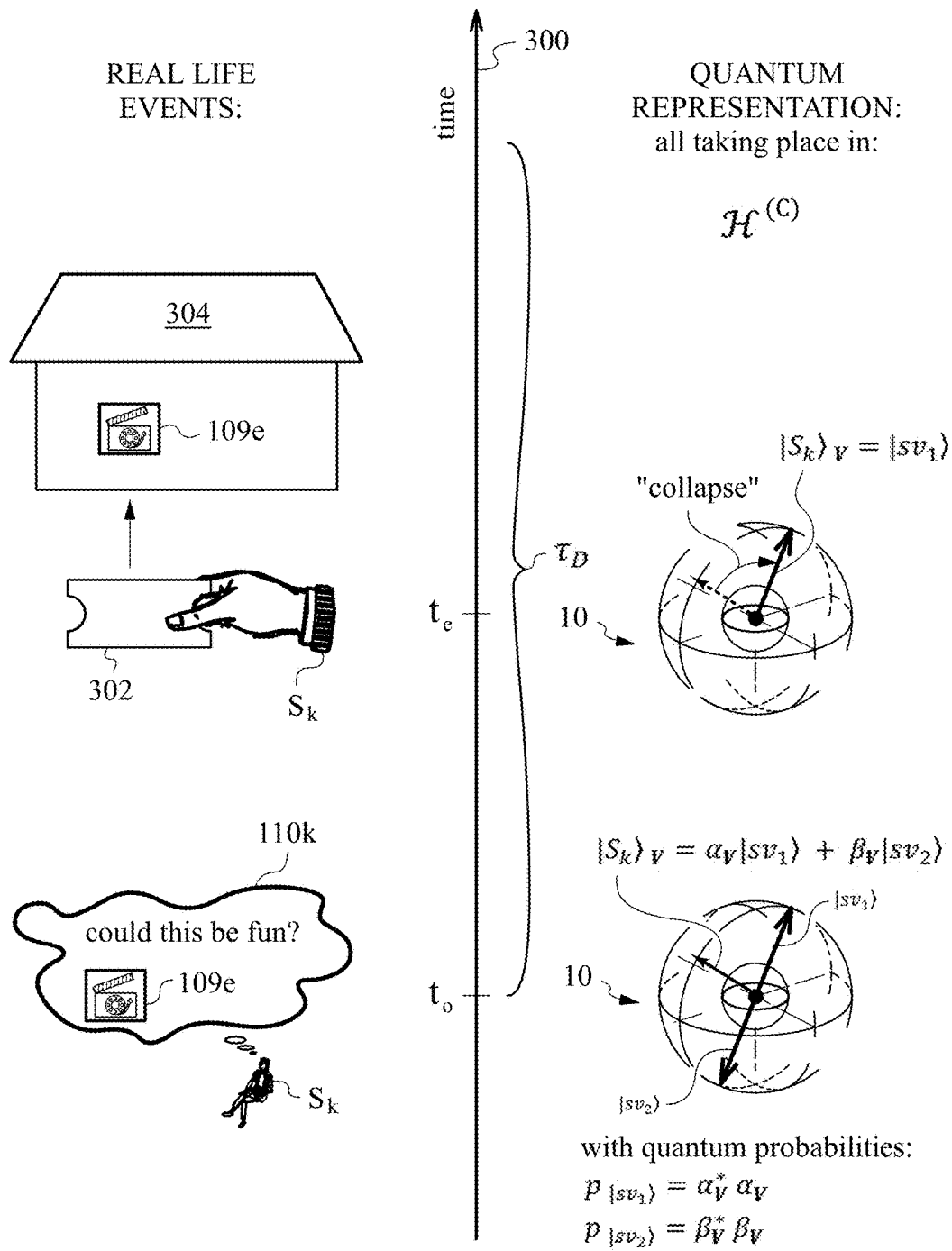
FIG. 5 is a diagram showing a set of real life events involving a subject of interest and the quantum representations of salient aspects of these real life events as required for the present quantum representation.

FIG. 5 is a diagram showing the quantum representation of real life events involving subject $S_k$ contextualizing preparatory proposition 107' about movie 109e and acting on it. Salient aspects of the quantum representation are shown on the right of a time line 300. Salient aspects of real life events involving subject $S_k$ are shown on the left of time line 300. Real life events and the quantum representation are temporally synced. Time increases in the up direction.

The real life events and their quantum representation are both shown to commence at initial time $t_o$. That it the time when subject $S_k$ is confronted by preparatory proposition 107' about movie 109e in real life. The drawing thus shows subject $S_k$ confronting preparatory proposition 107' about movie 109e at initial time $t_o$ on the real life events side of time line 300. Subject $S_k$ confronts proposition 107' by considering movie 109e in their internal space 110k according to their most commonly adopted contextualization of "entertainment value". It is duly noted that the existence of internal space 110k in real life where subject $S_k$ considers movie 109e and asks questions about it is taken as a proxy and as an illustrational convenience.

On the quantum representation side, the ket representation of subject state $|S_k\rangle_V$ is shown with the aid of Bloch sphere 10. The decomposition is in the eigenbasis of subject value matrix $PR_V$ that corresponds to most commonly adopted contextualization of "entertainment value". In fact, the state is identical to the one of Eq. 20a above (subscripts on eigenvectors are omitted at this point since the decomposition basis is clear). In addition, the probabilities $p_{|sv_1\rangle}$, $p_{|sv_2\rangle}$ of collapse to the two eigenvectors $|sv_1\rangle$, $|sv_2\rangle$ matrix $PR_V$ respectively, are expressly calculated in FIG. 5. These probabilities, of course, are also the probabilities of subject $S_k$ yielding the corresponding eigenvalues $\lambda_1$, $\lambda_2$ that stand for measurable indications observable on the real life side. In the example of FIG. 5, the measurable indications will be taken as: $\lambda_1$="GO" meaning "go see movie 109e I consider entertaining"; and $\lambda_2$="DON'T GO" meaning "don't go see movie 109e I consider not entertaining".

After some amount of time that is less than a decoherence time $\tau_D$ an event occurs at event time $t_e$. This real life event shown on the left side of time line 300 is the real action of buying a ticket 302 by subject $S_k$. It is understood by subject $S_k$ that in accordance with social conventions the purchase of ticket 302 will allow him or her to see movie 109e. The circumstances under which movie 109e is shown or delivered for viewing by subject $S_k$ are only limited by technological possibilities and socially accepted conditions and norms. In the present example, movie 109e is screened at a cinema or other suitable venue 304 at a screening time.

The quantum representation of the event on the right side of time line 300 at event time $t_e$ experiences a discontinuous change. This change is due to quantum measurement or the "collapse" of original subject state $|S_k\rangle_V$ initially containing a superposition of the two eigenvectors to just the first eigenvector $|sv_1\rangle$. In other words, at event time $t_e$ we get a discontinuous jump of subject state to $|S_k\rangle_V=|sv_1\rangle$. At this point there are no longer any probabilities involved—the outcome right then and also very shortly after event time $t_e$ is certain. After all, in real life subject $S_k$ just purchased ticket 302. Of course, further evolution of the new subject state can at some future time can cause subject $S_k$ to reconsider the purchase of ticket 302 to "GO" and see movie 109e. This further evolution due to becoming aware or being confronted with additional propositions that may be related to preparatory proposition 107' are certainly within the scope of the quantum representation.

The real element or fact that manifests on the left side of time line 300 is the act of purchase. This act stands for the measurable indication $\lambda_1$="GO" which is the eigenvalue that goes with eigenvector $|sv_1\rangle$. It should be remarked here that a more stringent quantification of eigenvalues could be introduced at this point. The eigenvalues could be denominated in some real-valued quantity that is generally accepted by subjects being considered. Suitable quantities of this type have been previously discussed in U.S. application Ser. No. 14/504,435 and are generally referred to by the letter W. One very useful real-valued quantity that can stand for W is money. A social consensus is necessary to bestow the requisite meaning on W, the real-value parameter that denominates action among subjects. In the present case, W would be an agreed-upon currency and eigenvalue $\lambda_1$ would be the purchase price of ticket 302 denominated in that currency. It is duly noted however, that proper ranges of validity for the quantum representation of subject $S_k$ in the given contextualization modulo preparatory proposition 107' about movie 109e have to be confirmed as indicated in U.S. application Ser. No. 14/504,435 before adopting such a rigorous description.

If preparatory proposition 107' drops out of internal space 110k of subject $S_k$ than it becomes less likely as time passes that subject $S_k$ will manifest either of the two mutually measurable indications in this example. In other words, subject $S_k$ will not act out either the "GO" or "DON'T GO" observables. This is known in the vernacular as the act of a proposition dropping out of someone's mind, becoming unimportant, being forgotten and/or displaced by other issues and so on. Renewal of preparatory proposition 107' is required to keep subject $S_k$ engaged in their contextualization of proposition 107'.

The act of consideration of preparatory proposition 107 by subject $S_k$ leads potentially to the unpredictable collapse of the wave function or state vector $|S_k\rangle$ to one of the eigenvectors and measurement. It should further be noted that this description also applies when the quantum state of subject $S_k$ is a mixture as represented by the density matrix introduced above. Of course, if the instantaneous contextualization deployed by subject $S_k$ and the eigenvalue observed are known, then the density matrix representation may be replaced by the pure state just measured. This state will be valid for at least some time after event time $t_e$ that is less than decoherence time $\tau_D$.

The measurement, of course, does not lock up subject $S_k$ in a static mode. Rather, propositions centered about subjects, objects and experiences that subject $S_k$ is exposed to or confronted with after his or her measurement, i.e., right after purchasing ticket 302 will affect subject $S_k$. We assume here that these propositions subsequent to the act of purchase are in the state space (community space in our case) of subject $S_k$. These propositions can cause further evolution or even another measurement of subject's $S_k$ state $|S_k\rangle$. Such subsequent measurement (also sometimes referred to as test measurement by those skilled in the art, since it is performed after exposure to preparatory proposition 107') could occur in a different contextualization, i.e., in a different basis.

In accordance with our quantum representation, such secondary contextualization must be described by a secondary subject value matrix $PR_{SV}$ that is very likely to have different eigenvectors than subject value matrix $PR_V$. Since the choice of such subsequent contextualization is not necessarily up to subject $S_k$, we may not assume that subject $S_k$ will adopt their second most favorite contextualization of "educational value" expressed by alternative subject value matrix $PR_{AV}$. In some instances the secondary contextualization could even be forced on subject $S_k$ by real life circumstances. These might include a compulsory enforcement of secondary contextualization represented by secondary subject value matrix $PR_{SV}$.

It is not only the eigenvectors of secondary subject value matrix $PR_{SV}$ representing the secondary contextualization that need not be the same as those of subject value matrix $PR_V$ standing for the "entertainment value" contextualization. The measurable indications of subject $S_k$ obtained under secondary subject value matrix $PR_{SV}$ do not necessarily need to be the same. In some cases the eigenvalues need not even be denominated in the same real-valued quantity W as the measurable indications that go with the eigenvectors of subject value matrix $PR_V$. For example, the measurable indications (or eigenvalues in our representation) in the secondary contextualization could be denominated in physical action(s) and not money (i.e., buying or selling something). For example, the physical action could involve the tearing up of ticket 302 or exhibiting some other physical reaction or behavior.

FIGS. 6A & 6B illustrate an embodiment for detecting biasing effects that are due to a secondary contextualization resulting from the introduction of a biasing entity 400. The biasing effects are studied on a large sample of subjects instead of just the single subject $S_k$. The arrangement in FIGS. 6A & 6B is related to that found in FIG. 5 and the same reference numerals designate correspondent parts. Once again, time line 300 indicates time increasing in the up-direction with real life events placed on its left and quantum representation on its right. FIGS. 6A & 6B should be considered in conjunction with FIG. 5, which we will refer back to at certain points in the below teachings.

The first part of the embodiment is shown in FIG. 6A. Here a group of like-minded subjects LS is selected by mapping module 115. The selection is performed from among all available subject $S_i$ whose online lives are sufficiently well known and/or documented (e.g., with the aid of data files 112) within network 104 and/or within social network 106 supported by system 100 (see FIG. 2) to allow mapping module 115 to make a reasonably good selection. Like-minded subjects LS are understood herein to be those that have or exhibit the same contextualizations and the same measurable indications in response to a preparatory proposition. In the present case, preparatory proposition 107' introduced in FIG. 5 is chosen. Like-minded subjects LS chosen by mapping module 115 have histories that confirm their most commonly adopted contextualization modulo preparatory proposition 107' to be the "entertainment value" contextualization. As this most commonly adopted contextualization is the same as that of subject $S_k$ we have just studied we will henceforth refer to it as a shared contextualization. Conveniently, the quantum representation of this shared contextualization is the same subject value matrix $PR_V$.

Mapping module 115 also uses the limitation that like-minded subjects LS should be very likely to exhibit the same measurable indication in their shared contextualization. In other words, like-minded subjects LS are all expected to exhibit eigenvalue $\lambda_1$ which stands for "GO" and corresponds to the physical action of buying ticket 302 to see movie 109e. In the present case, mapping module 115 selects all like-minded subjects LS that exhibit the shared contextualization "entertainment value" and shared measurable indication $\lambda_1$ or "GO" modulo preparatory proposition 107' about movie 109e.

The reader is reminded that "thick data" and any available data from real life should be used to estimate and confirm the proper selection of like-minded subjects LS. In fact, the human curator should preferably review the selection made by mapping module 115 prior to proceeding further. The consideration should include similarity of movie 109e at center of preparatory proposition 107' to the prior movies seen by subjects LS and with respect to which they shared the most commonly adopted contextualization and the shared measurable indication. Suitable metrics for the analysis of closeness between movies are known to those skilled in the art. An excellent source of information is provided by Netflix in conjunction with its former challenge to provide better movie recommendations. It is now documented online at www.netflixprize.com and at the links stemming therefrom.

On the quantum representation side of time line 300 we see that at an assignment time $t_a$, which preferably occurs after verification of the selection of like-minded subjects LS by mapping module 115, all subjects chosen are assigned their quantum states by assignment module 116. FIG. 6A calls out three specific subjects explicitly, namely $S_c$, $S_k$ and $S_x$ in the group of like-minded subjects LS. This is done to facilitate the explanation of subsequent steps.

For all like-minded subjects LS the most likely quantum subject states are those that go with the eigenvector $|sv_1\rangle$ of shared subject value matrix $PR_V$. In other words, all subjects exhibit the same quantum state. Showing this explicitly for subjects $S_c$, $S_k$ and $S_x$ we have: $|S_c\rangle_V = |sv_1\rangle$; $|S_k\rangle_V = |sv_1\rangle$; $|S_x\rangle_V = |sv_1\rangle$. All three are illustrated with the aid of our familiar Bloch sphere 10 in FIG. 6A. It is important to note that these are the same states but not joint states. In other words, we are considering all like-minded subjects LS separately or individually. In treating joint contextualizations and consequent measurable indications of like-minded subjects LS (e.g., in pairs, larger tuples or even as a whole) it is necessary to construct the appropriate joint states as dictated by the F-D anti-consensus and B-E consensus statistics for each one of like-minded subjects LS. The effect of the Spin-Statistics Theorem on joint quantum states of subjects has been previously introduced and discussed in U.S. application Ser. No. 14/224,041.

The group of like-minded subjects LS thus posited and given its individual quantum representations by assignment module 116 is ready for exposure or introduction to a test proposition. Advantageously, however, several more steps are performed prior to that exposure. First, it is preferable that network monitoring unit 120 be deployed to collect measurable indications from like-minded subjects LS prior to actually confronting like-minded subjects LS with the test proposition that is similar to preparatory proposition 107'. This step is shown in FIG. 6A at a formal preparation time $t_p$ when unit 120 collects information about actual ticket sales.

In the present case, we see the particular instance of sale of ticket 302 for movie 109e to subject $S_k$. The sales to other subjects in the group of like-minded subjects LS are also monitored by unit 120 (not shown). Any subject who does not purchase ticket 302 by a certain time prior to screening of movie 109e is excluded from the group of like-minded subjects LS. In this way, proper selection of subjects into the group of like-minded subjects LS is re-confirmed by quantum measurement of the eigenvalue of shared subject value matrix $PR_V$. This validates that subject states assigned by assignment module 116 through follow-on observation by network monitoring unit 120 of eigenvalue $\lambda_1$ or "GO" modulo preparatory proposition 107' about movie 109e from the subjects. Differently stated, the ticket purchase action is ultimately used to confirm the formal selection or preparation of the group of like-minded subjects LS for the upcoming test proposition.

A key to the proper performance of our quantum representation is that the test proposition be closely related to preparatory proposition 107'. In our present example, this close relationship between the propositions is virtually assured. That is because we choose the test proposition to be actually or de facto going to see movie 109e after having purchased ticket 302 to see it in response to preparatory proposition 107'. Note, however, that this choice is made for simplicity of explanation and best possible results. In general, the relationship between the preparatory proposition and the test proposition does not need to be that close. Nevertheless, it is advantageous to choose propositions that are very closely related for reasons of performance and tractability of computational results.

In the present embodiment, another important step is performed prior to presenting the subjects with the test proposition. Namely, the group of like-minded subjects LS is first split into two subgroups. This is done in order to be able to perform bias detection due to biasing entity 400. The action of splitting is executed during a splitting step 402 indicated on the real life events side of time line 300. The mechanism to determine which subjects to place in which subgroup is arbitrary. It may even be a "coin toss" type mechanism. Preferably, the split is fairly even so that we end up with about the same number of subjects in each subgroup.

In the present example, the splitting step 402 is executed by random event mechanism 124 (see FIG. 2) in conjunction with assignment module 116 or with graphing module 119 (again, see FIG. 2). A first subgroup NLS and a second subgroup ELS are thus formed, as shown. A person skilled in the art will appreciate that the inter-module connections and programming steps required can be implemented in any convenient and effective manner.

First subgroup NLS is not treated in any special manner prior to exposure to the test proposition, which is instantiated herein by the screening of movie 109e. This fact is represented on the real life event side of time line 300 by the large nil sign 401.

Second subgroup ELS is introduced to biasing entity 400 at an exposure time $t_{exp}$ sufficiently long for the subjects to apprehend biasing entity 400. The introduction can be accomplished via any suitable means, apparatus and/or communications and/or presentation mechanism(s) that work individually for the subjects within second subgroup ELS. For example, exposure may involve presentation or introduction of biasing entity 400 visually via a visualization component 404 belonging to network 104 or even to individual networked devices 102 of the particular subjects (see FIG. 2). In other words, biasing entity 400 can be introduced to the subjects in second subgroup ELS individually via the screens or other viewing affordances of their own devices 102. Of course, the exposure to biasing entity 400 can also be performed in real life, e.g., at an event to which only second subgroup ELS is invited or via communication channel(s) to which only second subgroup ELS is privy.

Individual presentations, however, are the preferred method of introducing biasing entity 400, since presentation to entire second subgroup ELS in a common or group setting would necessitate the deployment of joint quantum states. That, in turn, would require deployment of the full-fledged quantum representation that reflects F-D anti-consensus and B-E consensus statistics of the subjects amongst themselves. Irrespective of the exact type of introduction and whether it is done in individual or group settings, it is preferred that it take place within the affordances of network 104. This enables better tracking and accrues the network advantages associated with "big data", "thick data" and other factors already discussed above. In fact, most preferably all like-minded subjects LS are members of social group 106 and can thus be introduced to biasing entity 400 within the more structured environment afforded by social network 106. Knowledge of any additional affiliations with the already enumerated sites that may promote special products related to movie 109e are also valuable in this context and for follow-on marketing purposes (e.g., marketing of replicas or toy models of biasing entity 400 after the test proposition or after seeing movie 109e).

In order to provide a more concrete example, the present movie 109e is an action adventure based interview depicting the trials and tribulations of a world-class dictator. This very dictator himself is chosen as biasing entity 400 to be introduced to second subgroup ELS prior to the screening of movie 109e. In general, of course, biasing entity 400 can be a subject, an object or an experience that is relatable to subjects in second subgroup ELS or any combination of these. It is understood that a message is a subset of possible experiences. In that sense, a message can be embodied by an experience that like-minded subjects LS are expected to be able to relate to or apprehend. The message can also be instantiated by any proxy of understanding or else a mark that holds meaning to like-minded subjects LS. For example, in the western world the mark of a "swastika" has a special meaning given shared history and experiences from the Second World War.

In our example, another suitable biasing entity in accordance with the above explanation is embodied by a personal letter 400' from dictator 400 urging each subject in second subgroup ELS to some action and/or transmitting some message or gesture relevant to the screening of movie 109e. Dictator 400 personally considers movie 109e offensive and disparaging of his person. Therefore, letter 400' is in the form of a personalized e-mail to every subject in second subgroup ELS urging them not to go to the screening of movie 109e in strong terms. (Notice that letter 400' shown in FIG. 6A indicates a propagation backward along time line 300, which is counterfactual but shown here for purposes of illustration only.) Persons familiar with the movie industry and world affairs will be familiar with analogous situations arising in real life.

From the point of view of the quantum representation, introduction to biasing entity 400 is treated as the placement of the affected subject state in a field generated by biasing entity 400. This field may act on the quantum states of subjects in second subgroup ELS. In order for the field to be effective, biasing entity 400 has to register to the subject (formally, it needs to exist in the Hilbert space of the quantum state of the subject being exposed). Given, however, that the present invention strives to detect the biasing effects in general, we will not attempt to model the biasing field in detail (e.g., with a corresponding external field or dipole). For corresponding teachings the reader is referred to U.S. application Ser. No. 14/324,127. Those teachings address tracking the evolution and possibly collapse or measurement that an external field or another dipole may induce on a subject state. The principles of unitary evolution governed by the Schroedinger differential equation (a.k.a. type I evolution) and measurement or collapse of state vector (a.k.a. type II evolution) may be deployed for the purpose of modeling the action of the field representing biasing entity 400 on susceptible subjects in second group ELS.

Meanwhile, first subgroup NLS is presumed to not experience any evolution due to biasing entity 400 since they are not introduced to it. Still, some random background state evolution and potentially even collapses or measurements may happen to subjects in first subgroup NLS. For the purposes of the present invention we will attempt to keep these random effects of background evolution and measurement to a minimum. This can be accomplished by ensuring that a relatively short time expires between formal preparation time $t_p$ when tickets are purchased and the time when movie 109e is screened. Furthermore, if practicable, subjects in first subgroup NLS can be blocked from viewing any news that may relate to biasing entity 400 embodied by the dictator or biasing entity 400' embodied by the dictator's personal letter prior to the screening of movie 109e.

FIG. 6B illustrates the steps after exposure or introduction of dictator 400 to second subgroup ELS. On the left side of time line 300 we see the quantum representation of subjects in first subgroup NLS that was not exposed to biasing entity 400 personified by the dictator. These states are presumed unchanged under the assumption of negligible background evolution and measurement effects. Hence, subject states for all subjects in first group NLS remain what they were before. Referring specifically to the example of subject $S_x$ we see that the same state vector still describes their state, namely: $|S_x\rangle_V = |sv_1\rangle$. We further presume that subject $S_x$ will apply their most common and shared contextualization of "entertainment value" at the time of confrontation with test proposition 107".

Subjects in second subgroup ELS to whom biasing entities 400, 400' in the form of the dictator and their personalized letter were introduced are expected to exhibit the biasing effects on contextualization. That is because after exposure to the fields due to biasing entities 400 and 400' are expected to have affected their quantum states. For example, we see on the left side that the quantum state of our exemplary subject $S_k$ in second subgroup ELS has undergone some significant evolution and possibly even a wave function collapse (measurement). Their quantum state is no longer what it was, namely: $|S_k\rangle_V \neq |sv_1\rangle$. Subject $S_k$ is now definitely not in an eigenstate of shared subject value matrix $PR_V$ expressing the shared contextualization of "entertainment value" most likely to be adopted by unaffected subjects in first subgroup NLS.

To be complete, we have to take into account that the effect of dictator 400 and their personal letter 400' on the states of subjects in second subgroup ELS may be so extreme that it could have reversed or flipped their state entirely. In other words, they may now consider movie 109e a "DON'T GO" in the shared contextualization of "entertainment value". This would mean that their state has actually flipped to $|sv_2\rangle$. As a result, there could be a significant decrease in attendance among the subjects in second subgroup ELS. The attrition effect by itself should be considered a measurement on subjects of second subgroup ELS. In the extreme case of a state flip for all subjects in second subgroup ELS after introduction to dictator 400 and their personal letter 400' none of them at all may show up at the screening of movie 109e. However, to be complete, we also need to consider the possibility of F-D anti-consensus and B-E consensus statistics for every subject in second subgroup ELS modulo dictator 400 and personal letter 400'.

We refer to FIG. 7 to review the impact of spin statistics on the biasing effect produced by dictator 400 and the dictator's personal letter 400' in context 202 of test proposition 107" about the screening of movie 109e. Specifically, we find that subject $S_k$ of second group ELS exhibits the F-D anti-consensus statistic modulo dictator 400 in context 202 (and possibly even in all contexts, if subject $S_k$ has a personal antipathy and/or aversion to dictator 400). The same statistic holds for dictator 400 in context 202 of test proposition 107" involving movie 109e depicting their own person as a dubious and unappreciated hero. Thus, when assigning subject $S_k$ to a corresponding dipole $\mu_{S_k}$ we denote it with the F-D anti-consensus mark (see the teachings of U.S. application Ser. No. 14/324,127 including FIGS. 8A-D in particular for additional teachings about assigning quantum states of subjects to dipoles). When assigning dictator 400 to a corresponding dipole $\mu_{B_d}$ we also denote it with the F-D anti-consensus mark.

Given these spin statistics dipole $\mu_{B_d}$ representing dictator 400 has to anti-align with dipole $\mu_{S_k}$ representing subject $S_k$. The state of alignment as shown in FIG. 7 is thus expressly precluded, as indicated by sign 406, due to the F-D anti-consensus between dictator 400 and subject $S_k$. The relative strength and proximity of dipoles $\mu_{B_d}$, $\mu_{S_k}$ not explicitly modeled at this point will play a major role in the dynamics of achieving the permitted anti-alignment. In human terms, the tendency to anti-align means that introduction of subject $S_k$ to dictator 400 at exposure time $t_{exp}$, which is prior to test proposition 107" about screening of movie 109e, would tend to induce subject $S_k$ to do the opposite of the action or behavior that dictator 400 wants to induce in subject $S_k$. Thus, introduction to dictator 400 urging subject $S_k$ to not see movie 109e would accomplish the opposite effect. Subject $S_k$ would be even more convinced to see it. In other words, the state of subject $S_k$ would tend to remain $|S_k\rangle_V = |sv_1\rangle$.

On the other hand, the spin statistics are different with respect to personal letter 400'. We discover that subject $S_k$ of second group ELS exhibits the B-E consensus statistic modulo personal letter 400' in context 202 (possibly because subject $S_k$ has a soft spot in their heart for anyone who sends them a personal e-mail or letter, even if the author is an arch-enemy). This change in statistic is represented by the corresponding change of mark on dipole $\mu_{S_k}$ assigned to subject $S_k$ in context 202 that is augmented by letter 400' shown below dictator 400 in FIG. 7. Consequently, a state of alignment between dipole $\mu_{B_l}$ representing personal letter 400' and dipole $\mu_{S_k}$ exhibiting the B-E consensus statistic representing subject $S_k$ with letter 400' added to context 202 is now allowed. In human terms the tendency to align means that introduction of subject $S_k$ to dictator's personal letter 400' at exposure time $t_{exp}$ prior to test proposition 107" about screening of movie 109e would tend to induce subject $S_k$ to perform the action or behavior that dictator 400 wants to induce in subject $S_k$. Thus, introduction of personal letter 400' urging subject $S_k$ to not see movie 109e would accomplish its intended effect. Subject $S_k$ could be convinced not to see it. In other words, the state of subject $S_k$ would tend to flip to $|S_k\rangle_V = |sv_2\rangle$.

We now return to FIG. 6B to review the final step prior to collecting measurable indications from subjects in response to test proposition 107" of screening of movie 109e at venue 304 at test time $t_r$. Preferably, all subjects from first and second subgroups NLS and ELS are held separate prior to the screening of movie 109e. This is indicated by arrows 408A and 408B. The reason for keeping subgroups NLS and ELS separate and keeping all subjects separated to the extent possible is to avoid the formation of groups and their consequent discussions of test proposition 107". Inclusion of the additional biasing effects of such discussions in various subgroups of subjects possibly even subgroups crossing between first and second subgroups NLS, ELS would necessitate a full treatment of all possible joint states with the attendant spin statistics and other group effects. Such treatment would become computationally challenging for even relatively small numbers of subjects, as will be appreciated by those skilled in the art and familiar with the methods of quantum statistical mechanics and/or quantum chemistry.

However, if these effects are negligible or if the user of system 100 wishes to include them, then all subjects in first and second subgroups NLS, ELS are permitted to mix, as indicated by arrow 410.

The step of collecting measurable indications from subjects in response to test proposition 107" of seeing movie 109e at venue 304 is performed by network monitoring unit 120. This step is preferably performed right after test time $t_t$ when the subjects see movie 109e. Most preferably, the measurable indications are gathered via their personal networked devices 102 (see FIG. 2).

Given that the shared contextualization of "entertainment value" is the most likely to be used by the subjects given the preparation, any questions asked of the subjects should be in that context. Thus, appropriate questions to elicit measurable indications from the subjects are of the type "was movie 109e entertaining?". The expected measurable indications are the two mutually exclusive responses of "YES" and "NO" corresponding to eigenvalues $\lambda_1$, $\lambda_2$ that go with eigenvectors $|sv_1\rangle$, $|sv_2\rangle$ of shared subject value matrix $PR_V$, respectively. In the most preferred embodiment where data collection by network monitoring unit 120 is made unobtrusive a simple indication of "thumbs up" for "YES" and "thumbs down" for "NO" can be implemented.

The measurable indications or eigenvalues from first subgroup NLS are not expected to show any changes assuming movie 109e was all that it was advertised to be to the subjects. In other words, the quantum mechanical expectation values in the shared context of "entertainment value" collected from all subjects of first subgroup NLS are expected to be equal to "YES" or "thumbs up". These correspond to the expectation value of "1" obtained as follows: $\langle S_x|PR_V|S_x\rangle = 1$. The specific computation of the expectation value for subject $S_x$ from first subgroup NLS in accordance with the quantum representation is shown on the right side of time line 300.

Deviations from the expectation value of unity in subjects from first subgroup NLS could signal two general effects. The first is that movie 109e really was not what it was advertised to be. In other words, it was actually not entertaining in accordance with social conventions adhered to by subjects $S_i$. The second is that the background effects due to state evolution and measurement (type I and type II changes in quantum states of the subjects) were not negligible.

In situations where it is possible to separate these background effects from other effects, e.g., that movie 109e was a bad and not entertaining film, the background effect is preferably computed. Once it is known, mitigation techniques such as background subtraction can be used to obtain more accurate results reflective of the entertainment value of movie 109e. In fact, knowing the background can be useful in offsetting its effects when moving on to the measured indications collected by unit 120 from subjects in second subgroup ELS. It is noted that corresponded mathematical techniques are well known to those skilled in the art.

The measurable indications or eigenvalues collected by network monitoring unit 120 from subjects in second subgroup ELS that attend the screening of movie 109e at venue 304 at test time $t_t$ are expected to exhibit a biasing effect on their contextualization. At least a portion of the biasing effect is due to introduction of the biasing entity embodied by dictator 400 and his personal letter 400' to subjects in second subgroup ELS. The remainder may be due to the background effects mentioned above or the fact that movie 109e may really not be the entertaining film it was originally advertised to be. Preferably, the background effects are mitigated (e.g., by any suitable background subtraction technique) and the adjustment for poor movie 109e is also made. It is duly noted that in cases where movie 109e is so poor as to not legitimately qualify as entertaining according to the social metrics accepted by the subjects, it may be impossible to detect the biasing effect altogether. A repetition of the biasing effect detection run should be performed in new settings (e.g., using a different movie) in such failed cases.

In the present case, we proceed under the assumption that the background effects were either really negligible and/or successfully mitigated and that movie 109e was actually entertaining. The quantum mechanical expectation values in the shared context of "entertainment value" collected from all attending subjects of second subgroup ELS are thus expected to be somewhere between "YES" or "thumbs up" and "NO" or "thumbs down" due to the biasing effect of the subjects' contextualizations. In the present case, we find that the most common expectation value is "0.1" obtained as follows: $\langle S_k|PR_V|S_k\rangle = 1$. The specific computation of the expectation value is shown for subject $S_k$ from second subgroup ELS in accordance with the quantum representation on the right side of time line 300.

The actual computations and comparisons of expectation values as well as mitigation of any background effects and other data processing functions are performed by statistics module 108. For this reason, network monitoring unit 120 is connected to module 108 directly in the present embodiment, as shown on the real life events side of time line 300 in FIG. 6B. In the present example, statistics module 108 can determine the biasing effect by subtracting the average expectation value of subjects in the first subgroup NLS and the second subgroup ELS. Given the exemplary values for subjects $S_x$ and $S_k$ and assuming no significant deviations, the biasing effect on contextualization found by comparison of eigenvalues is rather large. In terms of the expectation value it is 0.9. Thus, the detected biasing effects among like-minded subjects due to secondary contextualization(s) adopted modulo test proposition 107" that follows preparatory proposition 107' are quite significant in this case. Note that the largest possible biasing effect on contextualization corresponds to a complete flip and is equal to 2.0.

Statistics module 108 can now use measurable indications collected at various times to make the comparison leading to the estimation of the biasing effect. For example, when the background effects that are note of interest are negligible and movie 109e is entertaining (as it was expected to be) then module 108 may use the originally obtained measurable indications from subjects in first subgroup NLS. On the other hand, since it is the objective of the present invention to detect the biasing effect on the contextualization by studying the exposed subjects in second subgroup ELS, module 108 has to use the measurable indications obtained after exposure to biasing entity 400 (and 400') for subjects in second subgroup ELS. More precisely, it has to use the measurable indications collected by unit 120 after the test represented by the screening of movie 109e. In this way, module 108 can always compare the measurable indications collected from first subgroup NLS that was not exposed to biasing entity 400 (400') with the measurable indications collected from second subgroup ELS that was exposed.

When possible, it is desirable to also estimate, using statistics module 108, a change in the quantum representation of like-minded subjects LS due to the biasing effects. In other words, it is useful to estimate the change to the quantum states of subject in subgroup ELS due to exposure of biasing entity 400. Such adjustment can then be used in other cases to adjust states of subjects that are not part of the tracking and detecting method.

Figure 1G:
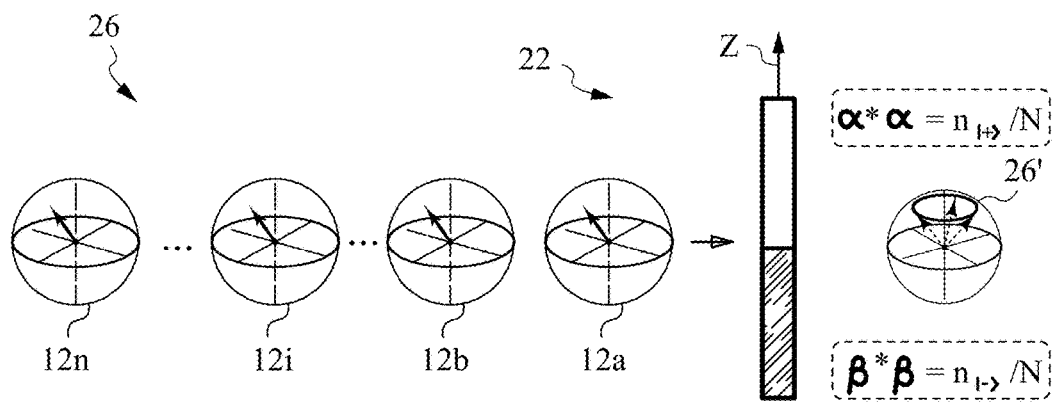
FIG. 1G (Prior Art) is a diagram illustrating the fundamental limitations to finding the state vector of an identically prepared ensemble of spinors with single-axis measurements.

Referring back to FIG. 6B, we see a drawn in estimate of quantum state $|S_k\rangle$ for subjects $S_k$ in a dashed line to indicate the speculative nature of this estimate. In general, the best estimation is obtained from the expectation values collected by module 108 in the previous step and any additional input from the expert or human curator. Methods for doing that are well known to those skilled in the art. It is duly noted, however, that while being limited to collecting measurable indications in only one contextualization, e.g., the shared contextualization in this case, it is impossible to bound the quantum states to more than orbits in Hilbert space (see Background section and FIG. 1G). Advantageously, the estimating step should therefore take advantage of cases in which additional questions or propositions can be posed to the subjects in subgroup ELS to obtain a better estimate of their states.

The preferred approach consists of presenting at least one additional proposition to like-minded subjects LS in order to obtain additional measurable indications. These additional measurable indications will help in estimating the state of like-minded subjects LS of subgroup ELS that was introduced to biasing entity 400. This is true both in the case studied above, where the states are reasonable pure and can be expressed by state vectors, and in the case where one has to resort to the quantum representation of subject states by density matrices.

Based on the rules of commutator algebra, it is most advantageous when the additional proposition is chosen to be incompatible with the test proposition. This means that in the present example the additional proposition should correspond to a contextualization that induces a secondary subject value matrix $PR_{SV}$ that does not commute with the shared subject value matrix $PR_V$. Clearly, to obtain good estimates the number of subjects available and willing to yield measurable indications modulo the additional proposition should be reasonably large. The general rules for using commutator algebra to obtain estimates of quantum states, whether represented by pure sates of density matrices, are well known to those skilled in the art and will not be discussed herein.

We now turn to embodiments of the invention that deal with perturbing a known contextualization of an underlying proposition about an original item. For clarity of explanation, we will relate this embodiment to the previously introduced example that involved the screening of a movie to various like-minded subjects as well as subgroups of such subjects. We will also refer to parts and modules introduced in earlier embodiments. To the extent practicable, the same reference numbers will refer to analogous parts.

FIG. 8A is a diagram of an embodiment that induces a perturbation to a known contextualization 202 of an underlying proposition 107 about an original item here again represented by movie 109e. This diagram uses time line 300 to divide the real life events on the left from their quantum representation on the right. Time increases in the up direction, as before. The choices made in this example are specific for the purposes of a clear and lucid explanation and are not to be construed as limiting in any way.

To commence, mapping module 115 selects a subject from among all available subjects $S_i$ known to network 104 of computer system 100 (see FIG. 2). The criteria used for choosing a given subject $S_k$ as shown is based on that subject exhibiting or using the known contextualization of "entertainment value", as discussed above. The quantum representation of the "entertainment value" contextualization of underlying proposition 107 about original item embodied by movie 109e is encapsulated in subject value matrix $PR_V$, as already introduced and explained above.

Furthermore, to be selected by mapping module 115 subject $S_k$ also needs to have or exhibit a known measurable indication in the known contextualization expressed by subject value matrix $PR_V$. In the example shown in FIG. 8A, the measurable indication exhibited by subject $S_k$ corresponds to eigenvalue $\lambda_1$ or "GO". As in the previous example, eigenvalue $\lambda_1$ manifests when the quantum state of subject $S_k$ is the eigenvector $|sv_1\rangle$ of subject value matrix $PR_V$. In other words, mapping module 115 selects subject $S_k$ because, based on historical data and any curator confirmation, this subject is highly likely to deploy the contextualization expressed by subject value matrix $PR_V$, and their state is highly likely to be the eigenvector of that matrix that goes with eigenvalue $\lambda_1$ or "GO". As we have seen above, this eigenvalue can find physical expression in the act of purchasing of ticket 302 for movie 109e.

Preferably, mapping module 115 selects many subjects in addition to subject $S_k$ that is explicitly shown in FIG. 8A. Again, the selection criteria are that the chosen subjects exhibit known contextualizations and known measurable indications in those contextualizations. The contextaulizations can clearly be different than "entertainment value". For example, mapping module 115 can select subjects that freely choose to deploy some other contextualization expressed in alternative subject value matrix $PR_{AV}$. Mapping module 115 can also select subjects that use secondary contextualization described by a secondary subject value matrix $PR_{SV}$ that they do not freely choose to deploy. The number of distinct additional contextualizations beyond "entertainment value" is not limited to these two.

It is duly noted that the various contextualizations will correspond to value matrices that are likely to not commute and hence encode for incompatible contextaulizations. Differently put, subject value matrix $PR_V$, alternative subject value matrix $PR_{AV}$, secondary subject value matrix $PR_{SV}$ and any other value matrices are likely to stand for contextualizations that are incompatible with each other. Another way to say it is that these value matrices cannot be simultaneously diagonalized because they have different eigenvectors, even if their eigenvalues are the same. For example, in the present case all the eigenvalues can be shared and correspond to "GO" and "DON'T GO" to see movie 109e, but because the contextualizations are incompatible the reasons cited by each subject as their personal reasons for buying ticket 302 will be different. The key, however, is that each subject selected by mapping module 115 exhibit a known contextualization and the measurable indication for that subject in their known contextualization also be known.

Once again, it is assignment module 116 that makes the formal quantum assignments. For clarity of explanation we now turn our attention back to subject $S_k$. Assignment module 116 assigns subject $S_k$ subject state $|S_k\rangle_V = |sv_1\rangle$ and subject value matrix $PR_V$. This assignment is shown being made at an assignment time $t_o$ on the right side of time line 300.

The correctness of the assignment made by assignment module 116 is contingent on good historical data and proper categorization of movie 109e. In other words, it matters whether movie 109e really qualifies as entertaining in the mind of subject $S_k$. This point can be evaluated by using like-minded subjects that form a peer group or a group that provides social validation or vetting of movie 119e. For these reasons, it is advantageous for assignment module 116 to seek further validation of the chosen state from "thick data" and "big data" about subject $S_k$ in particular and about any groups of like-minded subjects as well. Most preferably, the groups of like-minded subjects should include those that have already seen movie 109e and voiced their opinion about its entertainment value online.

The task of collecting the requisite data to validate the assignments made by assignment module 116 is preferably performed by network monitoring unit 120. Suitable information includes, among others, any data files 112 that indicate subject's $S_k$ state $|S_k\rangle$ modulo underlying proposition 107 about movie 109e or a closely comparable proposition about a comparable item. Once again, a human curator should help determine what propositions and items are sufficiently comparable for this purpose based on their understanding of subjects $S_j$ in general and of subject $S_k$ in particular. Similar rules apply to data from like-minded subjects.

One advantageous way of confirming the correct assignment of subject state $|S_k\rangle$ is through observation of an actual measurement of the eigenvalue that corresponds to the assigned state under conditions that corroborate the presumably known contextualization. In the present case, the eigenvalue $\lambda_1$ or "GO" finds its physical expression in the purchase of ticket 302 to see movie 109e. Confirmation that the purchase by subject $S_k$ is made in the expectation that movie 109e will be entertaining, since presumed contextualization is "entertainment value", is confirmed in a purchasing context 500. Specifically, context 500 touts or otherwise makes prominent in the mind of subject $S_k$ that movie 109e is indeed entertaining rather than, e.g., educational, innovative, horrifying or still some other type as may be appreciated by subject $S_k$ or by any of the other subjects while not in the "entertainment value" contextualization. Those skilled in the art of advertising will appreciate the myriad different ways in which a specific aspect, such as entertainment value of a film, can be communicated to a group of like-minded subjects or potential viewers.

Network monitoring unit 120 is duly connected to ticket sales equipment operating in context 500 to register the purchase of ticket 302 by subject $S_k$ acting in the known contextualization of "entertainment value" and report this fact to assignment module 116. Purchasing context 500 can be a physical sales location, or an online site, depending on the implementation. In the present case such transaction is indeed recorded by unit 120 at an online site 500. This observation confirms that assignment module 116 of made the correct assignment of contextualization and state to subject $S_k$.

In the next step assignment module 116 or another module of computer system 100 (see FIG. 2) performs a further confirmatory step. This step is optional. It consists of exposing or presenting subject $S_k$ with one or more confirmatory items 502. Item or items 502 are chosen such that their contextualization by subject $S_k$ is expected to be confirmatory of their state $|S_k\rangle_{j'}=|sv_1\rangle$ modulo underlying proposition 107 about original item 109e.

It is important to note that consensus or anti-consensus statistics of subject $S_k$ in contextualizing such confirmatory propositions using confirmatory items for an already contextualized proposition modulo original item 109e should be checked prior to this step. This is because some F-D anti-consensus subjects may react negatively to "over-selling" of a proposition by exposure to confirmatory items that attempt to re-confirm their already measured state. Such F-D anti-consensus subjects could indeed flip and decide they are no longer "GO" modulo underlying proposition about original item 109e due to any perceived "over-selling". In the present case it will be assumed that subject $S_k$ exhibits B-E consensus statistic modulo additional confirmatory propositions using confirmatory items and will therefore not change its state modulo underlying proposition 107 about original item 109e as a result of confrontation with any confirmatory proposition(s).

FIG. 8A shows on real life side of time line 300 a confirmatory item 500 being presented to subject $S_k$ at time of confirmatory exposure $t_{con}$. In the present example confirmatory item 500 is a follow-on advertisement for movie 109e. The exposure involves presentation or introduction of confirmatory item 500 visually via a visualization component 404 belonging to network 104 or even to individual networked device 102k belonging to subject $S_k$ (see FIG. 2). In other words, confirmatory item 500 is introduced to subject $S_k$ individually via the screen or other viewing affordances of their own device 102. Of course, exposure to confirmatory item 500 can also be performed in real life, e.g., at an event to subject $S_k$ is invited. Note, however, that presentation of confirmatory item 500 to subject $S_k$ individually rather than in a group is preferred. That is because individual states can be treated without the need to deploy the more complex set of quantum tools required when tracking joint quantum states. As already remarked above, the full formalism can be deployed in case subject $S_k$ cannot be truly considered in isolation. Furthermore, additional eigenvalues that may be obtained upon presenting subject $S_k$ with confirmatory item 500 to confirm their expectation that they have just purchased ticket 302 for an entertaining film can be gathered. Preferably, such eigenvalues are also collected by network monitoring unit 120. They may include simple affirmations of interest in going to see movie 109e and/or other measurable indications.

FIG. 8B illustrates the important step of altering at least one perceptible attribute of original item 109e that is at the center of underlying proposition 107. In the present case original item or movie 109e about dictator 400 is altered by introducing a second hero 400* into the altered item represented by altered movie 109e*. Hero 400* which is a perceptible attribute in this example, may be another dictator or someone who may even be perceived by subject $S_k$ to be opposite of a dictator. For example, hero 400* could be a person fighting for democratic freedom for all mankind. The act of replacement of original movie 109e that was mostly about dictator 400 by altered movie 109e* that also partly features second hero 400*, as further elaborated below, is indicated by arrow R.

The key is that altered item, in this case altered movie 109e* be changed from the expected original movie 109e by the alteration or modification in a manner perceptible to subject $S_k$. In the present case, subject $S_k$ was expecting to be amused by entertaining aspects of the expected original movie 109e about the trials and tribulations of dictator 400. Injection of strong hero 400* who may at times fight or even sideline dictator 400 is expected to generate ambiguity about the film in the mind of subject $S_k$. It is the tuning of the amount of such ambiguity that corresponds herein to adjusting the magnitude of the perturbation to the subject's known contextualization of underlying proposition 107 about original item 109e. Stated differently, the perturbation of contextualization we are interested in is caused by changing, morphing, or substituting original item 109e with increasingly altered item 109e* that may even in an extreme case be the opposite of original item 109e. For example, altered movie 109e* could be about strong hero 400* and dictator 400 could be a minor character used to make the strong hero's 400* point.

Very small alterations will be imperceptible. In other words, minute perturbation will not be noticeable to subject $S_k$, e.g., because altered item 109e* is too similar to original item 109e expected by subject $S_k$. In the present example, such minor alteration of original movie 109e might correspond to a short and cursory reference to hero 400* without this hero actually making any appearance on screen. However, with increasing changes in altered movie 109e* as compared to original movie 109e perturbation to known contextualization of "entertainment value" exhibited by subject $S_k$ will become progressively more apparent. Extreme amounts of alteration could reverse the measurable indication without changing the contextualization. They could also change the contextualization or even suspend any contextualization at all. In the last case subject $S_k$ will stop conceiving or apprehending altered movie 109e* in the context of "entertainment value" or indeed any other movie related context (e.g., "educational value" or "horror value") altogether. For example, subject $S_k$ might consider the entire process of screening altered movie 109e* as an attempt at propagandizing him or her or otherwise misleading them or abusing their trust given the original proposition and any confirmatory advertisement(s) to which they may have been exposed.

In the present example, strong hero 400* is a character in altered movie 109e* that makes a few on-screen appearances. The alteration is judged by the human curator and/or by other like-minded subjects (e.g., during test runs of altered movie 109e*) to be sufficiently large to considerably perturb the known contextualization exhibited by subject $S_k$. In other words, the perturbation is sufficiently large to result in a substantial probability that subject $S_k$ will be upset in their mind and may stop considering altered movie 109e* in their known contextualization of "entertainment value".

It is very important to reiterate here, that the present method of introducing perturbation to a known contextualization extends to altering original items that may be represented by objects, subjects, or experiences and any combinations thereof that may be at the center of the underlying propositions under study. Consequently, the altered items can also be represented by any combination of one or more subjects, objects and experiences. As appropriate, the step of altering can involve either changing the original item to derive the altered item or replacing the original item with a new item. This last action is a simple item substitution. Alteration of the original item is also considered herein to involve morphing the original item to derive the altered item in any way perceptible to the subject. The alteration may be performed prior to presentation of altered item or even during the presentation (i.e., real-time alteration or morphing into the altered item as the original item is being perceived by the subject). The altering of the original item can be accomplished by making changes to the entire item, one or more of its features or attributes or morphing/changing any or all of its aspects in still some other manner.

FIG. 8B illustrates on the real life events side of time line 300 the presentation of altered movie 109e* containing second hero 400* to subject $S_k$ at a screening time or test time $t_t$. We note that due to proposition 107 now being about the unexpected and altered movie 109e*, subject $S_k$ experiences a perturbation to his or her contextualization that is visualized by their upset internal state 110k.

In accordance with the invention, a collecting step is performed by network monitoring unit 120 that has access to information about subject $S_k$. Specifically, network monitoring unit 120 monitors subject $S_k$ and is also informed about the state of screening of altered movie 109e*. Unit 120 collects measurable indications from subject $S_k$ as soon as available. These could be generated during or shortly after exposure to altered item here embodied by screening at test time $t_t$ of altered movie 109e*. Although even a single altered measurable indication from subject $S_k$ is sufficient for further analysis according to the invention, it is preferable to obtain a few altered measurable indications to be able to better determine the effects of the perturbation.

In the preferred embodiment, statistics module 118 is in communication with network monitoring unit 120. Thus, statistics module 118 receives from unit 120 the one or more altered measurable indications generated by subject $S_k$. As mentioned above, the most minimal altered measurable indications could be represented by a "thumbs up" or "thumbs down" vote with some indication of the contextualization in which this vote is given. It is duly noted that we proceed here under the assumption that any background effects and other noise sources are negligible. Should they be non-negligible but known, the mitigation strategies outlined above can be deployed. In cases where the background effects are not tractable and/or cannot be mitigated for any reason then a new perturbation run should be performed.

In the present case, we proceed under the assumption that the background effects were either really negligible and/or successfully mitigated and that altered movie 109e* was actually watched by subject $S_k$ to a sufficient extent to generate the perturbation. Under these conditions, statistics module 118 uses the quantum mechanical expectation value in the known context of "entertainment value", i.e., the unperturbed contextualization to quantify the change in contextualization. Specifically, subject $S_k$ is asked to respond in the known contextualization to the question: "Was movie 109e* entertaining?" with the possible altered measurable indications between "YES" and "NO", or "thumbs up" and "thumbs down".

To quantify the perturbation to the known contextualization it is preferable that statistics module 118 compare facts. In other words, it is preferred that module 118 use the known measurable indication that was originally obtained for subject $S_k$ with the altered measurable indication collected after altered movie 109e*. Alternatively, statistics module 118 could use the likely measurable indication based on historical data prior to the act of purchase of ticket 302 by subject $S_k$. In still another alternative, statistics module 118 could use the measurable indication collected during the re-confirmation step discussed above.

In the event of no perceptible perturbation, subject $S_k$ is expected to exhibit an altered measurable indication that is identical to the known measurable indication of "YES" or "thumbs up" with certainty when value matrix $PR_V$ is applied. In other words, when asking the question in the known contextualization we expect to obtain again eigenvalue $\lambda_1$. That is because their state has not been changed and remains clearly articulable with no uncertainty in the known contextualization of "entertainment value". In other words, it is still described by the first eigenvector of subject value matrix $PR_V$ or $|S_k\rangle_V = |sv_1\rangle$, for sure. The corresponding expectation value is: $\langle S_k|PR_V|S_k\rangle = 1$. This is the situation under point a) on the right side of time line 300 showing the salient aspects of our quantum representation of real life events occurring on the left side of time line 300.

With some perturbation to the known contextualization subject $S_k$ will change their state. In other words we will find that $|S_k\rangle_{V} \neq |sv_1\rangle$ by progressively larger amounts as the perturbation increases. The altered measurable indication will thus start diverging from the known measurable indication. Under point b) we see that a significant perturbation can yield a zero expectation value for subject $S_k$ in the known contextualization. In other words: $\langle S_k|PR_V|S_k\rangle = 0$. This means that subject $S_k$ has been perturbed to a state that is orthogonal to the eigenvectors of matrix $PR_V$. Still differently said, subject $S_k$ is contextualizing altered movie 109e* in eigenvectors of a value matrix that is incompatible with (or does not commute with) subject value matrix $PR_V$.

The experience of a more pronounced perturbation may even cause a flip while subject $S_k$ continues to exhibit the known contextualization modulo altered movie 109e*. In this case the altered measurable indication is opposite of the known measurable indication that was originally found. The situation is illustrated under point c) where the expectation value is found to be $\langle S_k|PR_V|S_k\rangle$ 1. The ellipsis in FIG. 8B indicate that some other results that nonetheless do produce measurable indications in the known contextualization may be obtained for still larger perturbations.

Finally, for a perturbation so severe as to break the known contextualization altogether, no measurable indication in that contextualization may be obtained. For example, subject $S_k$ may refuse to answer any questions about altered movie 109e*. Instead, unit 120 may ascertain data files generated by subject $S_k$ that indicate disgust with the producers of altered movie 109e* or even indications of open suspicion that the entire movie-going experience was gamed and/or used for other purposes. Other indications of broken trust, including unpredictable actions due to disappointment and/or anger may also be ascertained in real life as the selected subject $S_k$ interacts with other subjects $S_j$ after having experienced the perturbation to their contextualization of underlying proposition 107.

A person skilled in the art will have noted early on in the discussion of the present embodiment that running context perturbation on a single subject $S_k$ is not sufficient to obtain high quality quantum mechanical results and learn more about the nature of the perturbation. Hence, as already indicated above, it is important that mapping module 115 select a large number of subjects that exhibit known contextualizations with known measurable indications and run the above-described process with each one of them to obtain the altered measurable indications for comparison in statistics module 118. Of course, detection of the perturbation effects for each subject will have to use the corresponding subject's personal subject value matrix. It is also possible to use in the perturbation test one of the subgroups of like-minded subjects, as in the previous embodiment dealing with context biasing effects due to exposure to biasing entities. In that case the same value matrix applies for the known contextualization to all of the subjects. Furthermore, they all exhibit the same known measurable indication at the onset thus simplifying the test.

Given the statistics made available by having many subjects, and most preferably by having many like-minded subjects, it is advantageous to use statistics module 118 to estimate the change in the quantum representation of subject $S_k$ and in the quantum representations of the other subjects (i.e., the new subject state $|S_k\rangle$ in the case of subject $S_k$) due to altered item 109e*. More advantageously still, the change in the subject value matrix $PR_V$ for each subject should be detected as well. This will allow computer system 100 to further quantify the new contextualization in terms of the new eigenbasis. Equivalently, this corresponds to the estimation of the new value matrix (or matrices) chosen to contextualize proposition 107 about altered movie 109e* by the subjects due to the perturbation. In cases where the subjects yield without any additional effects (i.e., evolution of wave function or collapse) one of the eigenvectors in this new eigenbasis then the computation can be speeded up significantly, as will be appreciated by those skilled in the art. This last point, however, cannot be presumed to hold and should be tested with large number statistics in any given case.

Estimation of the new states and the new value matrix can be accomplished under conditions in which the subjects provide the additional measurable indications and indicate in an unambiguous manner in which contextualization their additional measurable indications are being provided. In other words, if the perturbation due to altered movie 109e* featuring additional hero 400* is such as to place the subject into contextualization of "educational value" with an eigenvector corresponding to eigenvalue "NO" (or "not educational"), then the subjects should communicate both the contextualization and their state in this contextualization. For reasons having to do with commutator algebra and as discussed above, it is preferable that any additional propositions with which the subjects are confronted in estimating their new states and new value matrices be incompatible with proposition 107 about altered movie 109e*.

It is further useful to supplement the estimations with measurable indications to additional propositions that are about original item 109e. This will help in better understanding the transition caused by the perturbation. The same holds as in the case of confronting the subjects with additional propositions about altered item 109e*. Namely, in confronting the subjects with additional propositions about original item 109e, it is advantageous to make sure that these additional propositions are incompatible with the initial or underlying proposition 107 about original item 109e.

In most practical application the full quantum representation of the subjects will involve density matrices. Only in the case of reasonably pure states can the state vector representation used herein for explanatory purposes be safely deployed. The steps outlined above will enable the practitioner to estimate adjusted or altered state vectors or adjusted density matrices, as the case may be.

Furthermore, computer system 100 is considered to include altered item 109e* to be presented to the selected subjects. In some embodiments computer system 100 may even include the requisite mechanism or modules for performing the alteration on original item 109e to generate altered item 109e*. In the present case, given that items 109e and 109e* are movies, the requisite editing capabilities are clearly within the resources that can be made available to computer system 100 or integrated into it. Of course, input from a skilled artisan in the field of movie production and editing will be required to properly complete the alteration process.

In the preferred embodiment, computer system 100 is implemented in network 104 as shown in FIG. 2. Thus the original and altered items 109e, 109e* are conveniently presented to the subjects within network 104, or even within social network 106 if they are members thereof. Individual showings are preferred to the extent that they eliminate the need to keep track of joint states. However, although these add considerable computational complexity, keeping track of them is entirely within the capabilities of those possessed of standard skill levels in this art.

It will be evident to a person skilled in the art that the present invention admits of various other embodiments. Therefore, its scope should be judged by the claims and their legal equivalents.

The invention claimed is:

1. A computer implemented method for perturbing a known contextualization of an underlying proposition about an original item, said method comprising:
   a) selecting by a mapping module a subject using said known contextualization and having a known measurable indication modulo said underlying proposition about said original item;
   b) assigning by an assignment module a subject value matrix $PR_v$ used by said subject in said known contextualization;
   c) altering said original item to generate an altered item;
   d) collecting by a network monitoring unit from said subject at least one altered measurable indication after said subject is exposed to said altered item;
   e) detecting by a statistics module a perturbation effect on said known contextualization of said underlying proposition by said subject; and
   f) estimating by said statistics module a change in a quantum representation of said subject due to said altered item.

2. The computer implemented method of claim 1, wherein said step of estimating comprises comparing said known measurable indication and said at least one altered measurable indication.

3. The computer implemented method of claim 2, wherein said quantum representation comprises a density matrix.

4. The computer implemented method of claim 2, wherein said step of estimating further comprises presenting at least one additional proposition about said altered item to said subject.

5. The computer implemented method of claim 2, wherein said step of estimating further comprises presenting at least one additional proposition about said original item to said subject.

6. The computer implemented method of claim 1, wherein said step of altering comprises changing an attribute of said original item, said attribute being perceptible to said subject.

7. The computer implemented method of claim 6, wherein said original item is selected from a group consisting of a combination of at least one of a subject, an object and an experience.

8. The computer implemented method of claim 1, wherein said step of altering comprises replacing said original item with said altered item.

9. The computer implemented method of claim 8, wherein said altered item is selected from a group consisting of a combination of at least one of a subject, an object and an experience.

10. A computer system for perturbing a known contextualization of an underlying proposition about an original item, said computer system comprising:
    a) a mapping module for selecting a subject using said known contextualization and having a known measurable indication modulo said underlying proposition about said original item;
    b) an assignment module for assigning a subject value matrix $PR_v$ used by said subject in said known contextualization;
    c) an altered item to be presented to said subject;
    d) a network monitoring unit for collecting from said subject at least one altered measurable indication after said subject is presented with said altered item; and
    e) a statistics module for detecting a perturbation effect on said known contextualization of said underlying proposition by said subject, and for estimating a change in a quantum representation of said subject due to said altered item.

11. The computer system of claim 10, wherein said statistics module is configured to detect said perturbation effect through a comparison of said known measurable indication and said at least one altered measurable indication.

12. The computer system of claim 10, wherein said altered item is selected from any one or more members of a group consisting of subjects, objects and experiences.

13. The computer system of claim 12, further comprising a network and wherein said altered item is presented to said subject within said network.

14. The computer system of claim 13, wherein said network is selected from a group consisting of the Internet, the World Wide Web, a Wide Area Network (WAN) and a Local Area Network (LAN).

15. The computer system of claim 13, wherein said subject is a member of a social group.

16. The computer system of claim 15, wherein said social group is selected from any one or more of a group of social networks accessible on the Internet, the World Wide Web, a Wide Area Network (WAN) and a Local Area Network (LAN).

17. The computer system of claim 15, wherein said social group manifests an affiliation with one or more product sites.

* * * * *